(12) United States Patent
Shim et al.

(10) Patent No.: US 11,592,968 B2
(45) Date of Patent: *Feb. 28, 2023

(54) USER TERMINAL APPARATUS AND MANAGEMENT METHOD OF HOME NETWORK THEREOF

(71) Applicant: SAMSUNG ELECTRONICS CO., LTD., Suwon-si (KR)

(72) Inventors: Jung-hyun Shim, Suwon-si (KR); Chang-won Kim, Suwon-si (KR); Ga-hyun Joo, Suwon-si (KR); Jin-sung Kim, Suwon-si (KR); Jong-youb Ryu, Suwon-si (KR); Chang-hyun Lee, Suwon-si (KR); Yong-hyun Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,957

(22) Filed: Oct. 10, 2021

(65) Prior Publication Data

US 2022/0027025 A1    Jan. 27, 2022

Related U.S. Application Data

(63) Continuation of application No. 16/723,950, filed on Dec. 20, 2019, now Pat. No. 11,163,425, which is a
(Continued)

(30) Foreign Application Priority Data

Jun. 18, 2014    (KR) .................. 10-2014-0074580

(51) Int. Cl.
*G06F 3/0483*    (2013.01)
*G06F 1/16*    (2006.01)
(Continued)

(52) U.S. Cl.
CPC .......... *G06F 3/0483* (2013.01); *G06F 1/1694* (2013.01); *G06F 3/0346* (2013.01);
(Continued)

(58) Field of Classification Search
CPC .... G06F 3/0483; G06F 1/1694; G06F 3/0346; G06F 3/04817; G06F 3/0482;
(Continued)

(56) References Cited

U.S. PATENT DOCUMENTS 7,958,272 B2    6/2011    Ko et al.
8,762,988 B2    6/2014    Kong et al.
(Continued)

FOREIGN PATENT DOCUMENTS

CN    1941729    4/2007
CN    1985471    6/2007
(Continued)

OTHER PUBLICATIONS

International Search Report for PCT/KR2014/005385 dated Sep. 30, 2014, two pages.
(Continued)

*Primary Examiner* — Nicholas Ulrich
(74) *Attorney, Agent, or Firm* — Nixon & Vanderhye, P.C.

(57) ABSTRACT

An example user terminal apparatus includes communication circuitry configured to be connected to a home network comprising a plurality of devices; a display configured to display a UI screen for managing the home network; a sensor configured to sense a user manipulation of the UI screen; and processing circuitry configured to change the UI screen displayed on the display according to the user manipulation. The UI screen is one of a plurality of service pages that are changeable according to a user manipulation in a first direction, the plurality of service pages being pages
(Continued)

for respectively providing different home network management services. At least one of the plurality of service pages comprises an area that is displayable on the display according to a user manipulation in a second direction.

19 Claims, 82 Drawing Sheets

Related U.S. Application Data continuation of application No. 14/900,082, filed as application No. PCT/KR2014/005385 on Jun. 18, 2014, now Pat. No. 10,564,813.

(60) Provisional application No. 61/836,251, filed on Jun. 18, 2013.

(51) Int. Cl.
*G06F 3/0346* (2013.01)
*G06F 3/04817* (2022.01)
*G06F 3/0482* (2013.01)
*G06F 3/04847* (2022.01)
*G06F 3/04883* (2022.01)
*H04L 12/28* (2006.01)

(52) U.S. Cl.
CPC ........ *G06F 3/0482* (2013.01); *G06F 3/04817* (2013.01); *G06F 3/04847* (2013.01); *G06F 3/04883* (2013.01); *H04L 12/2803* (2013.01); *H04L 12/2809* (2013.01); *H04L 12/2816* (2013.01); *G06F 2200/1614* (2013.01); *G06F 2200/1637* (2013.01)

(58) Field of Classification Search
CPC ............. G06F 3/04847; G06F 3/04883; G06F 2200/1614; G06F 2200/1637; G06F 3/0485; G06F 3/0488; G06F 3/04886; G06F 3/04842; G06F 3/04845; G06F 3/0486; G06F 2203/04806; H04L 12/2803; H04L 12/2809; H04L 12/2816; H04L 12/2814; H04L 12/12; H04W 88/02
See application file for complete search history.

(56) References Cited

U.S. PATENT DOCUMENTS

| | | | |
|---|---|---|---|
| 8,914,071 | B2 | 12/2014 | Chang et al. |
| 8,918,738 | B2 | 12/2014 | Yoshitomi et al. |
| 9,021,393 | B2 | 4/2015 | Kim et al. |
| 9,241,064 | B2 | 1/2016 | Slaby et al. |
| 9,898,163 | B2 | 2/2018 | Yoshitomi et al. |
| 10,564,813 | B2 | 2/2020 | Shim et al. |
| 2003/0103088 | A1 | 6/2003 | Dresti |
| 2004/0260407 | A1 | 12/2004 | Wimsatt |
| 2004/0260427 | A1 | 12/2004 | Wimsatt |
| 2007/0089055 | A1 | 4/2007 | Ko et al. |
| 2008/0010610 | A1 | 1/2008 | Lim et al. |
| 2009/0100380 | A1 | 4/2009 | Gardner |
| 2009/0144661 | A1 | 6/2009 | Nakajima |
| 2010/0023865 | A1 | 1/2010 | Fulker |
| 2010/0122215 | A1 | 5/2010 | MacGregor |
| 2010/0283573 | A1 | 11/2010 | Yum et al. |
| 2010/0295789 | A1 | 11/2010 | Shin et al. |
| 2011/0106279 | A1 | 5/2011 | Cho et al. |
| 2011/0145812 | A1 | 6/2011 | Kong et al. |
| 2011/0154269 | A1 | 6/2011 | Broniak |
| 2011/0291927 | A1 | 12/2011 | Slaby et al. |
| 2012/0023431 | A1 | 1/2012 | Roth et al. |
| 2012/0036475 | A1 | 2/2012 | Yoshitomi et al. |
| 2012/0313876 | A1 | 2/2012 | Smith |
| 2012/0066630 | A1 | 3/2012 | Kim et al. |
| 2012/0130513 | A1 | 5/2012 | Hao |
| 2012/0167000 | A1 | 6/2012 | Ryu |
| 2012/0188072 | A1 | 7/2012 | Dawes |
| 2012/0291068 | A1 | 11/2012 | Khushoo |
| 2012/0315882 | A1 | 12/2012 | Chang et al. |
| 2012/0316984 | A1 | 12/2012 | Glassman |
| 2013/0076684 | A1 | 3/2013 | Otowa |
| 2013/0113284 | A1 | 5/2013 | Altonen |
| 2013/0254705 | A1 | 9/2013 | Mooring |
| 2014/0059496 | A1 | 2/2014 | White |
| 2014/0232273 | A1 | 8/2014 | Sasaki |
| 2014/0267112 | A1 | 9/2014 | Dunn |
| 2015/0046874 | A1 | 2/2015 | Yoshitomi et al. |
| 2015/0140990 | A1 | 5/2015 | Kim |
| 2015/0332586 | A1 | 11/2015 | Hamm |
| 2015/0341184 | A1 | 11/2015 | Tatzel |
| 2018/0129382 | A1 | 5/2018 | Yoshitomi et al. |

FOREIGN PATENT DOCUMENTS

| | | |
|---|---|---|
| CN | 101012953 | 8/2007 |
| CN | 101047921 | 10/2007 |
| CN | 101834768 | 9/2010 |
| CN | 102388356 | 3/2012 |
| CN | 102882752 | 1/2013 |
| CN | 103019208 | 4/2013 |
| CN | 103023681 | 4/2013 |
| CN | 104486416 | 4/2015 |
| EP | 2 424 264 | 2/2012 |
| EP | 2 469 883 | 6/2012 |
| KR | 10-2004-0071978 | 8/2004 |
| KR | 10-0684158 | 2/2007 |
| KR | 10-2008-0077477 | 8/2008 |
| KR | 10-2010-0124427 | 11/2010 |
| KR | 10-2011-0068477 | 6/2011 |
| KR | 10-2012-0028582 | 3/2012 |
| KR | 10-2012-0073892 | 7/2012 |
| KR | 10-2012-0135720 | 12/2012 |
| KR | 10-2013-0009857 | 1/2013 |
| WO | 2004-107093 | 12/2004 |

OTHER PUBLICATIONS

Written Opinion of the ISA for PCT/KR2014/005385 dated Sep. 30, 2014, six pages.
NovotekEmbedded, Home Automation and Android GUI, Feb. 19, 2012, https://www.youtube.com/watch?v=H7kkDZQiaVO, retrieved Dec. 14, 2018 (Year: 2012).
Extended Search Report dated Nov. 14, 2016 in counterpart European Patent Application No. 14813384.6.
Office Action dated Apr. 2, 2018 in counterpart Chinese Patent Application No. 201480045766.X and English-language translation.
Communication pursuant to Article 94(3) EPC dated Feb. 13, 2019 in counterpart European Patent Application No. 14813384.6.
Examination Report dated Nov. 19, 2019 in counterpart Indian Patent Application No. 201627001422 and English-language translation.
Notice of Allowance dated Aug. 31, 2021 in Chinese Patent Application No. 201811588631.4 and English-language translation.
Notice of Preliminary Rejection dated Jul. 23, 2020 in counterpart KR Application No. 10-2014-0074580 and English-language translation.
Domoticz, Open Source Home Automation System Manual, Feb. 2014 (Year: 2014).
Shim et al, U.S. Appl. No. 14/900,082, filed Dec. 15, 2015.
Shim et al, U.S. Appl. No. 16/723,950, filed Dec. 20, 2019.
Notice of Allowance dated Nov. 15, 2021 in counterpart Korean Patent Application No. 10-2021-0141351 and English-language translation.

FIG. 28B
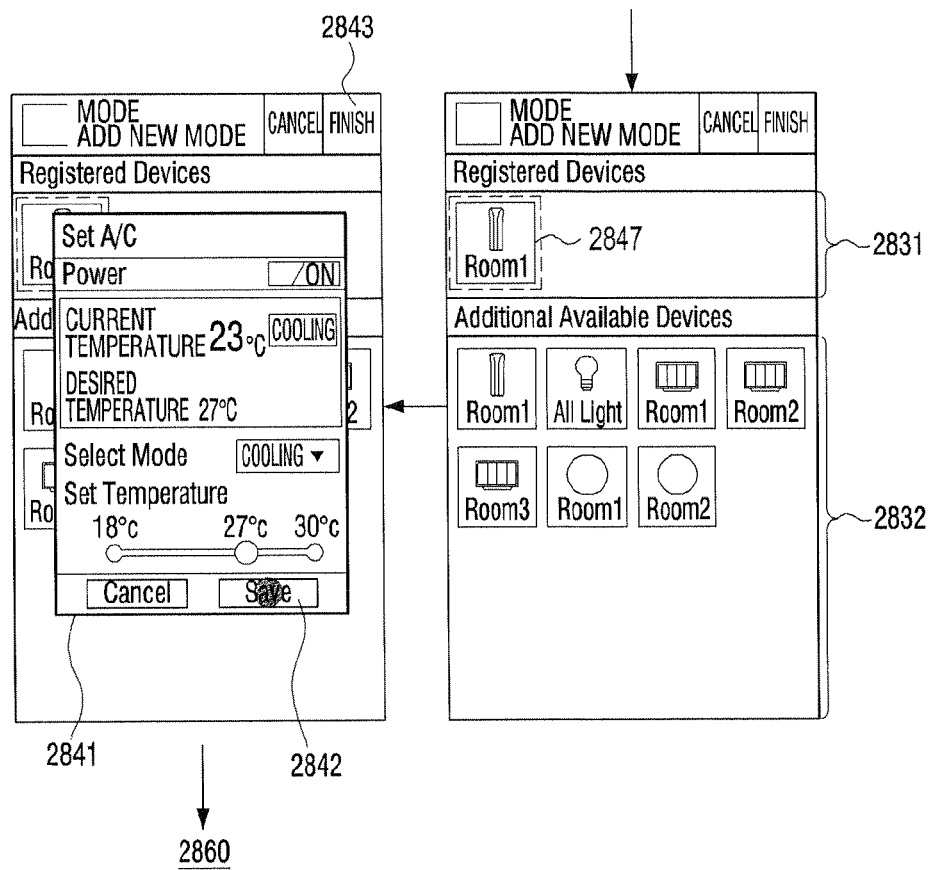
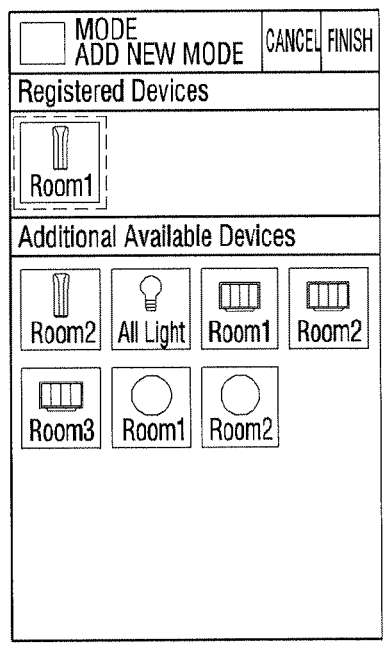

FIG. 31
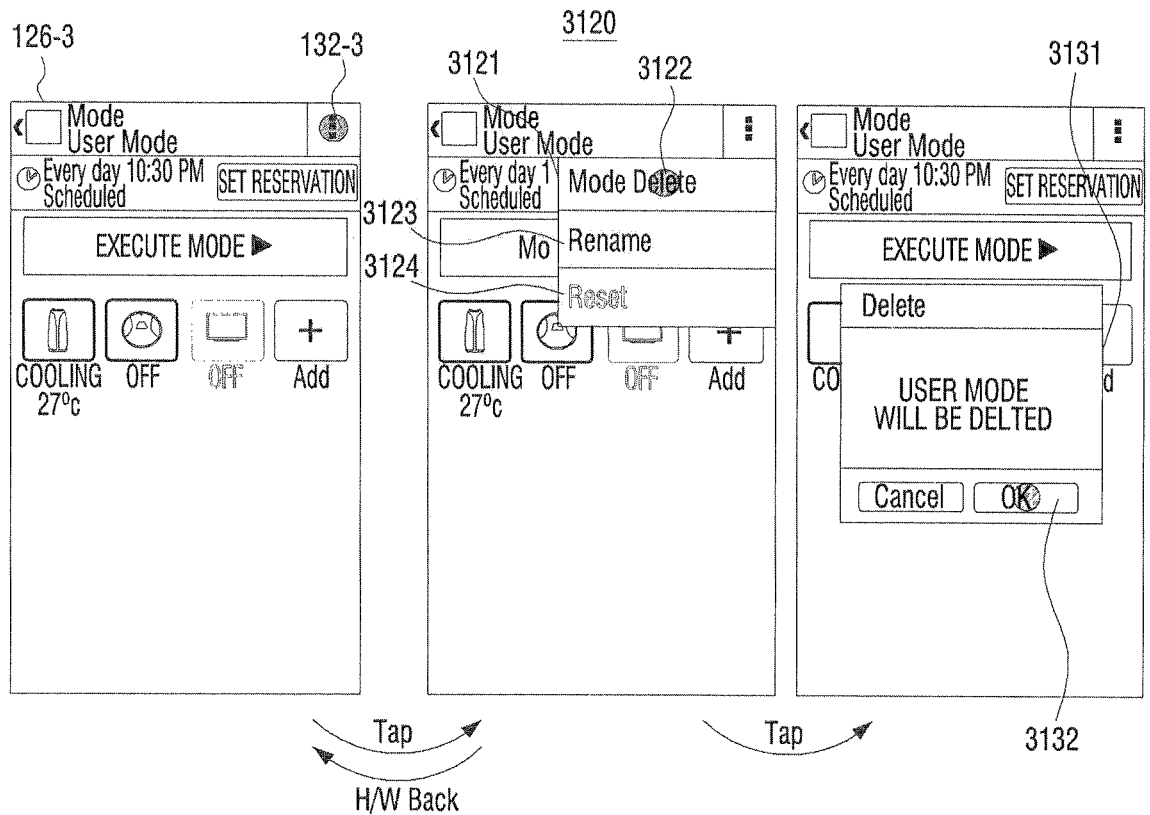
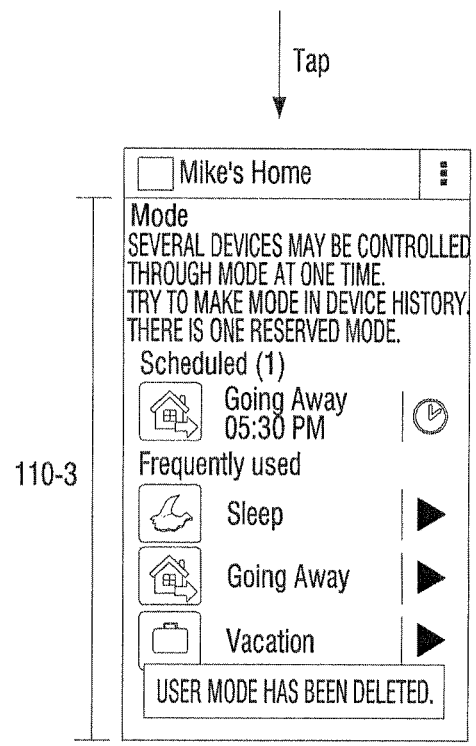

FIG. 32
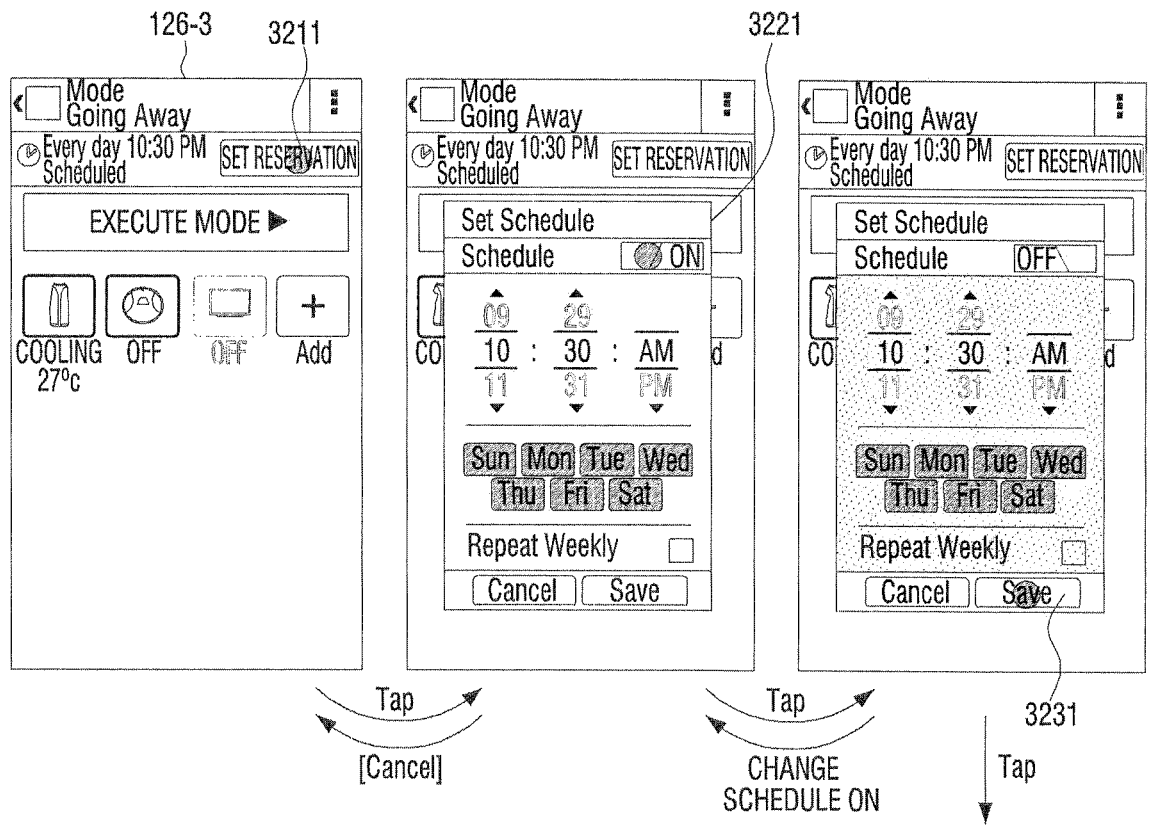
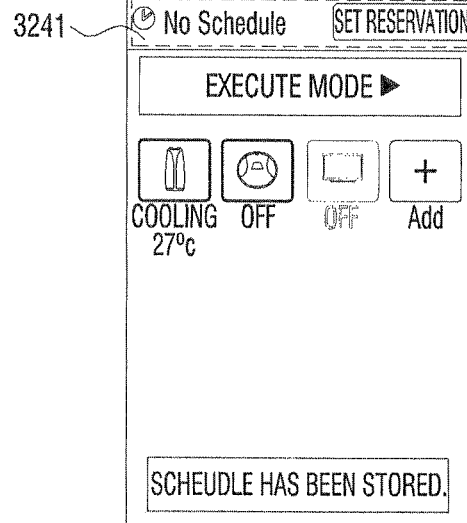

FIG. 38
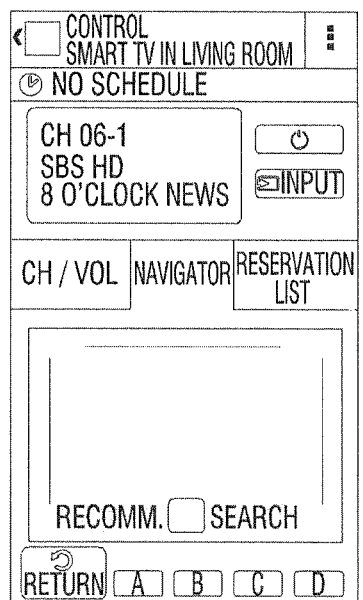
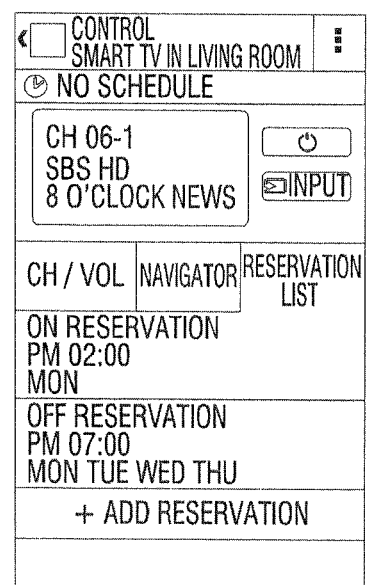

FIG. 39
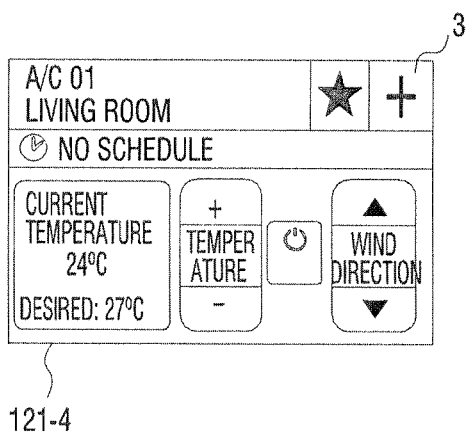
121-4
[WHEN + IS TAPPED]
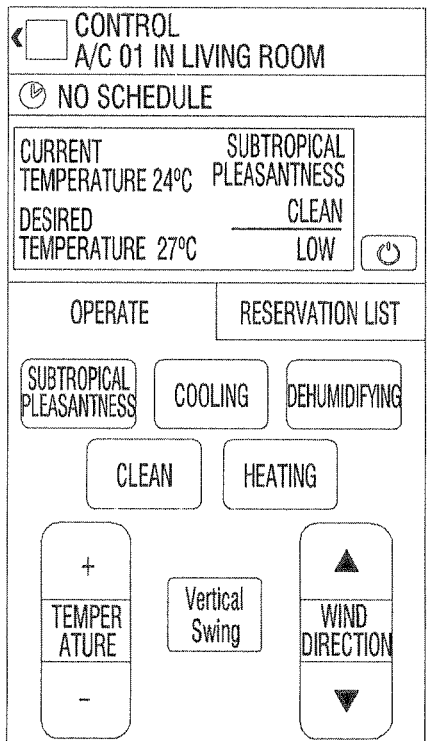
131-4
[WHEN RESERVATION LIST TAP IS SELECTED]
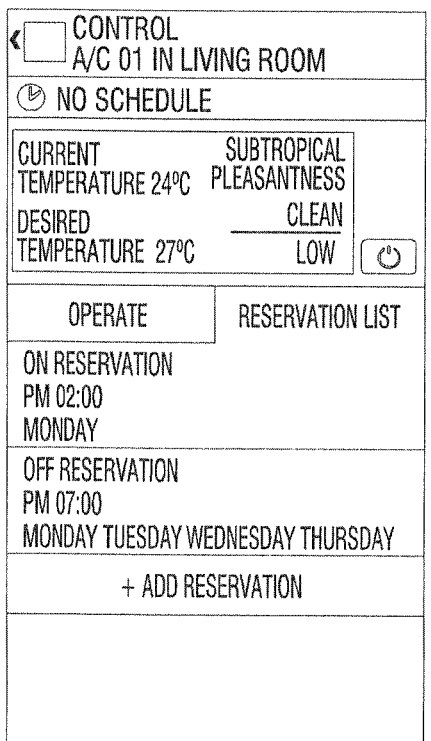
131-4

FIG. 42
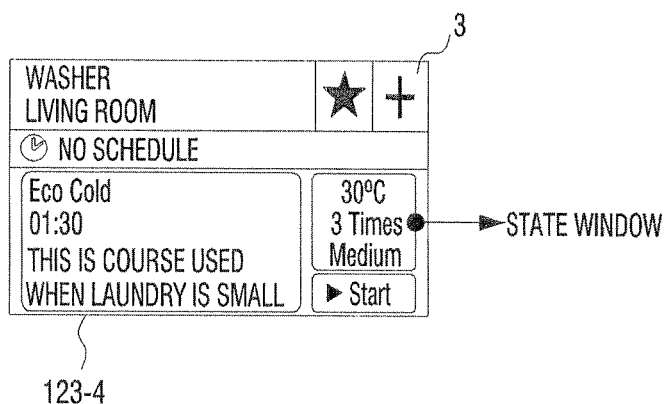
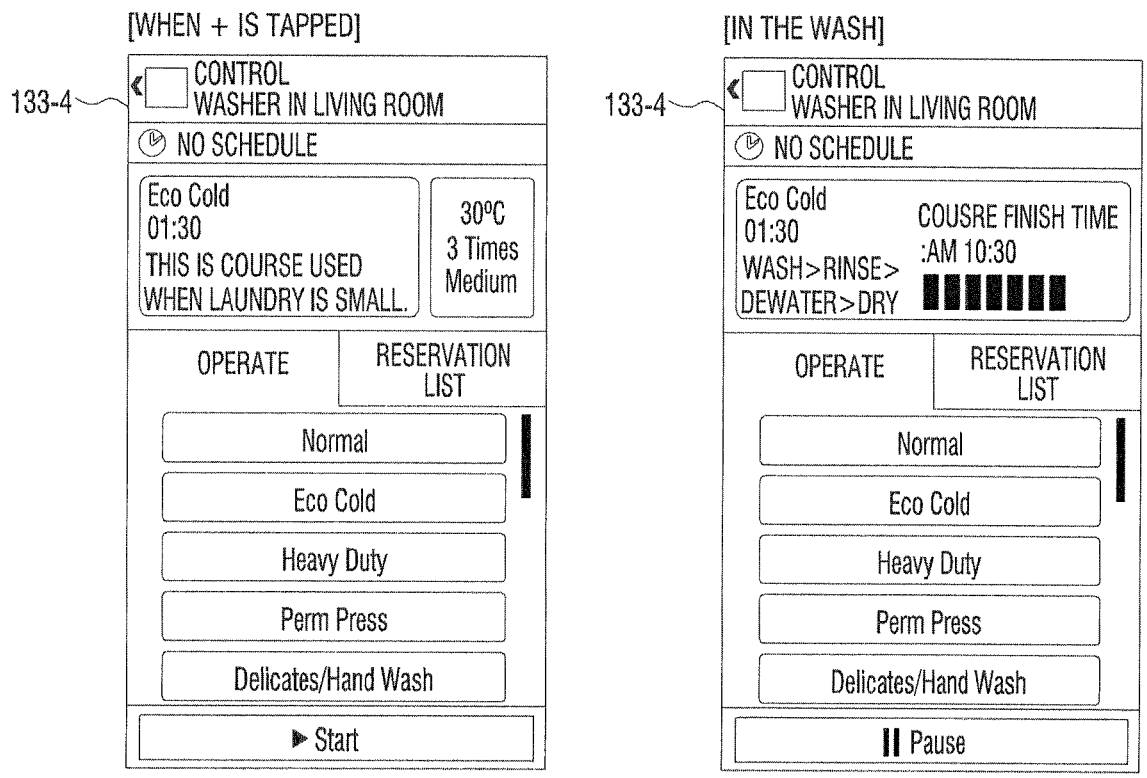

FIG. 46
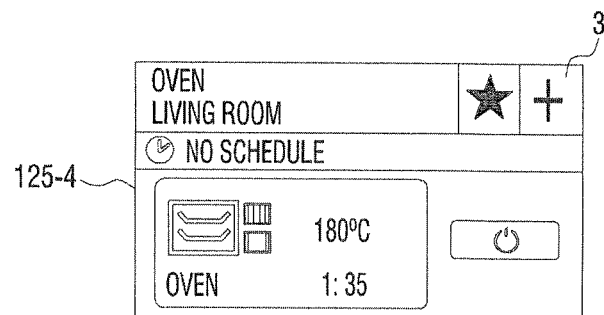
[WHEN + IS TAPPED]
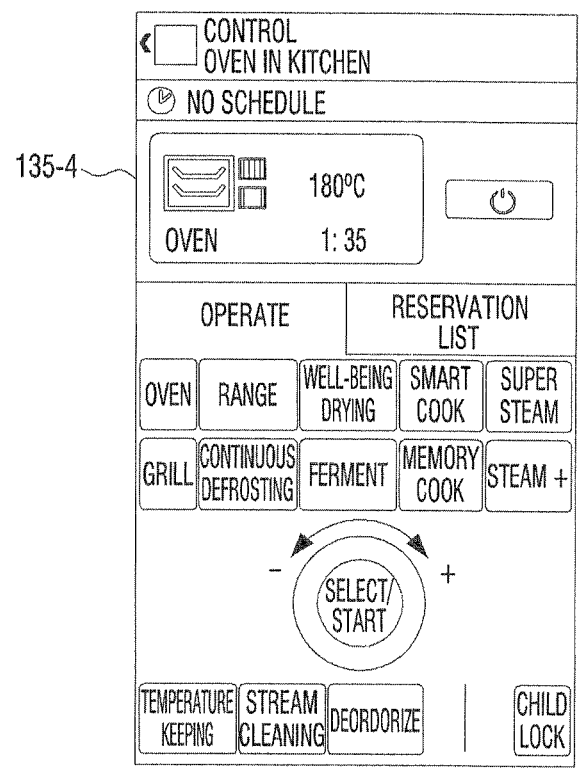

FIG. 48
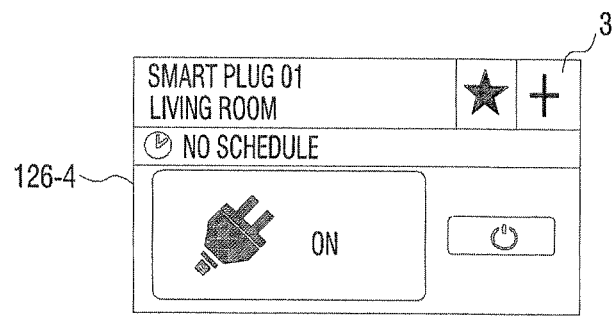
[WHEN + IS TAPPED]
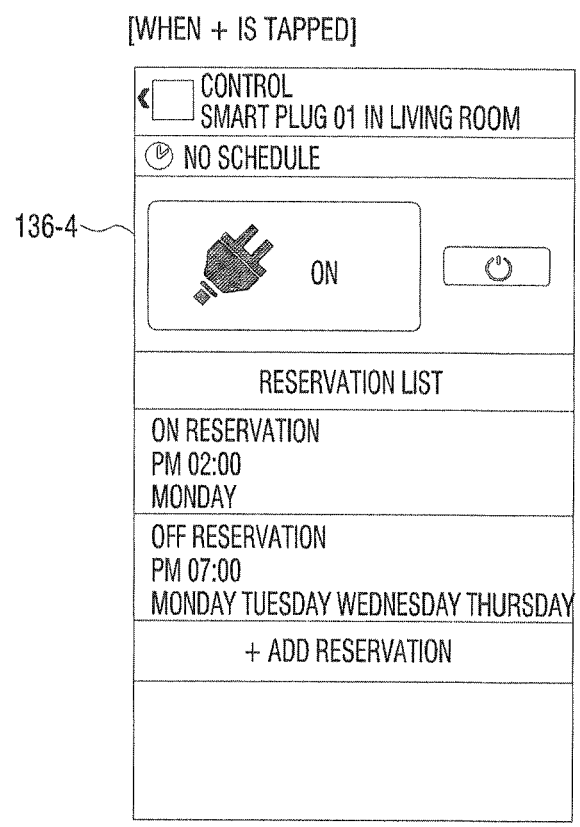

FIG. 50
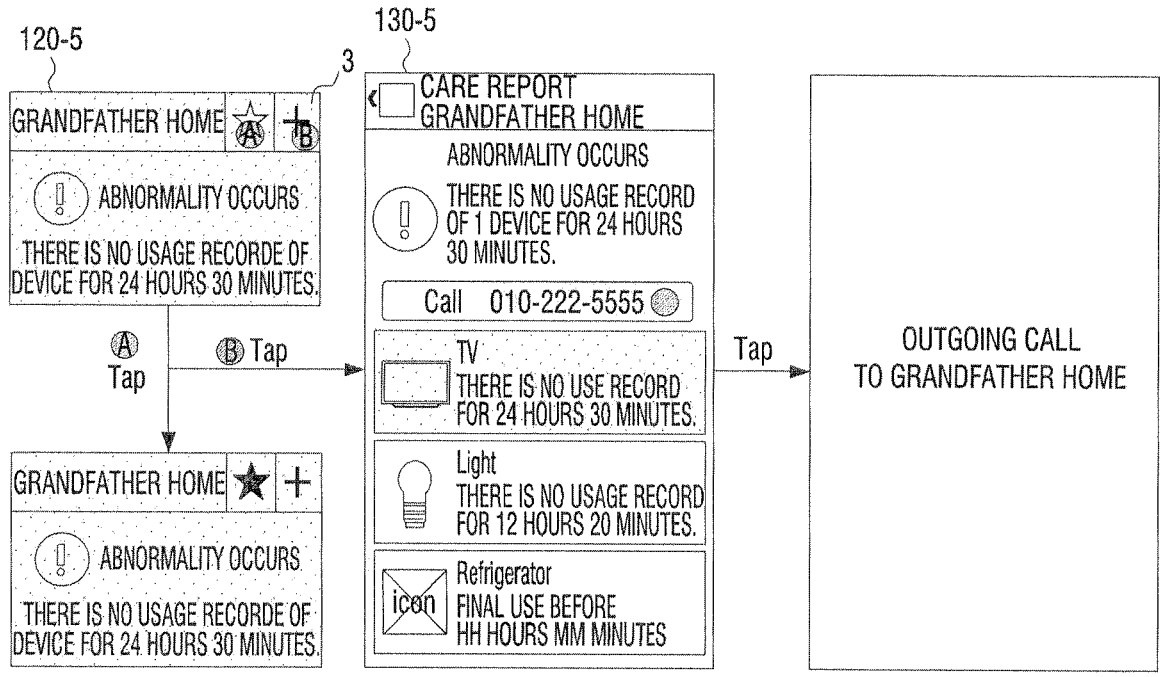
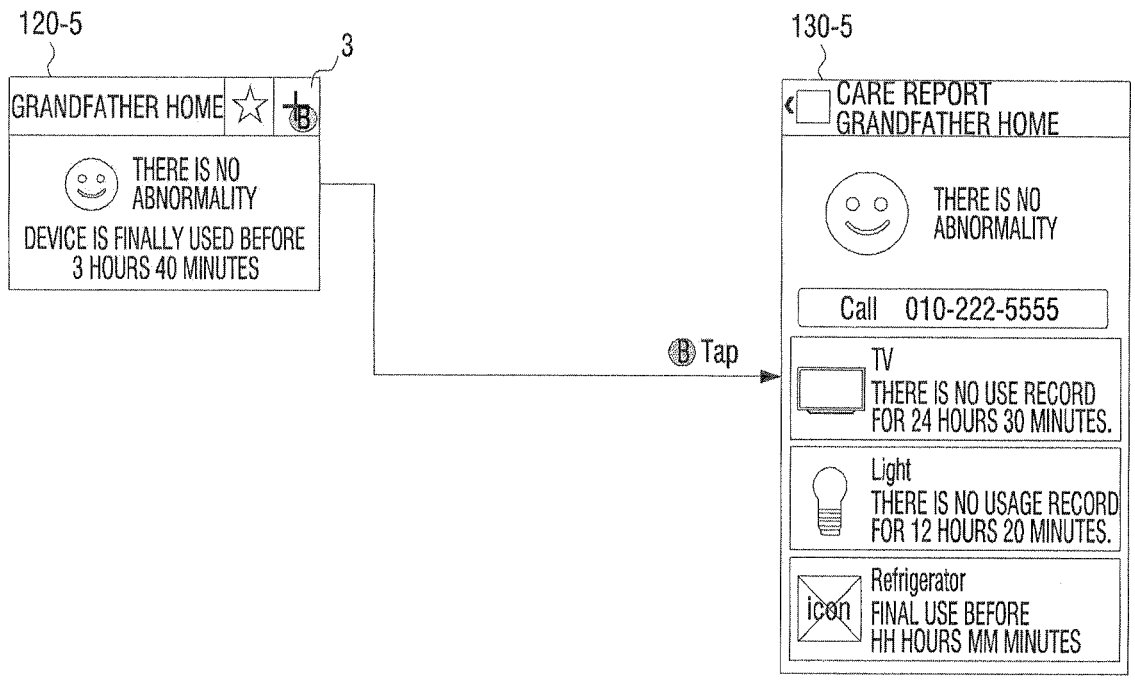

FIG. 57
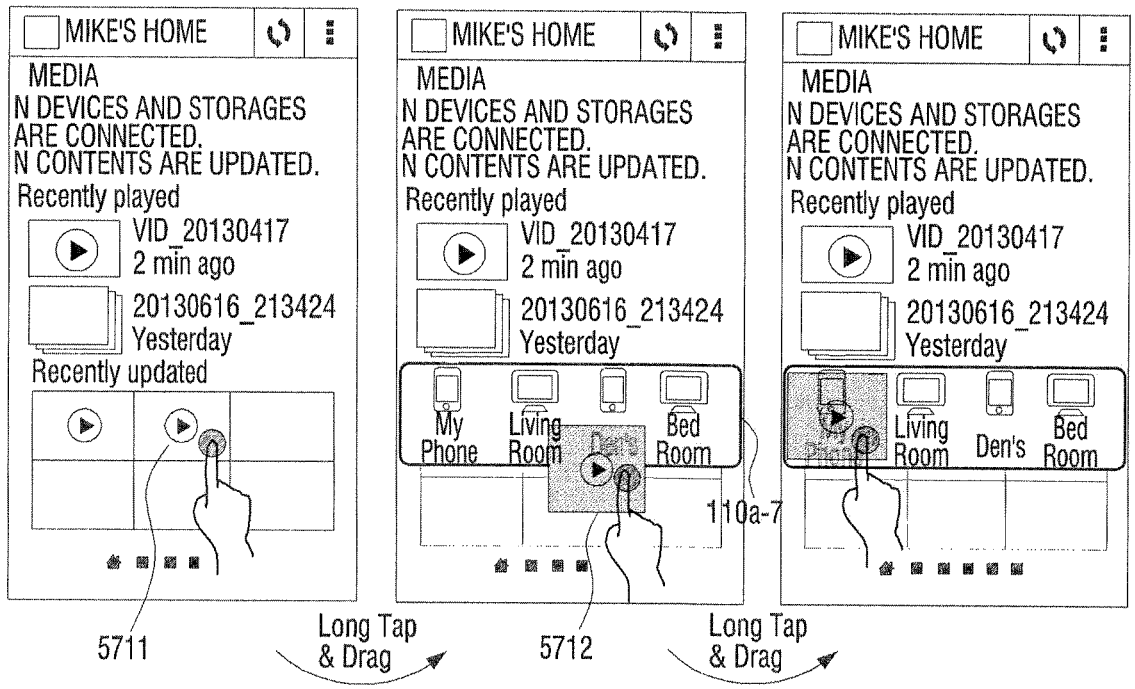
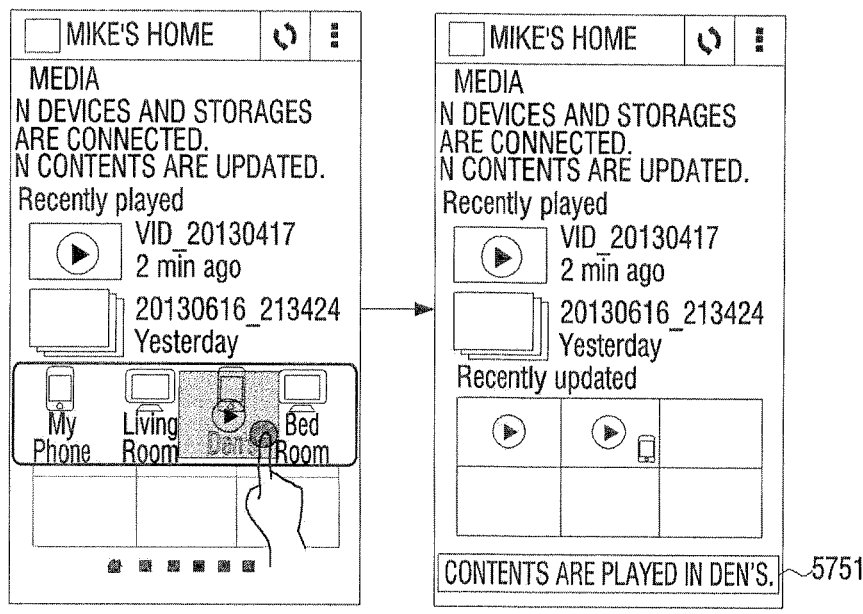

FIG. 65
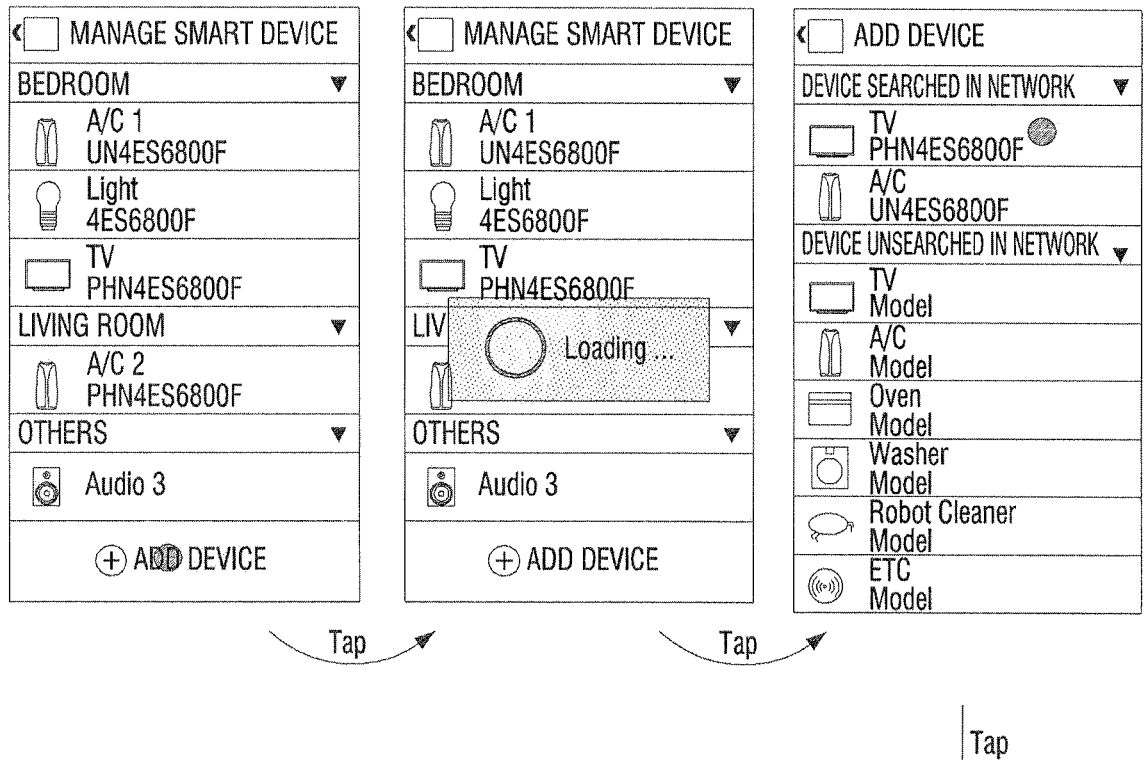
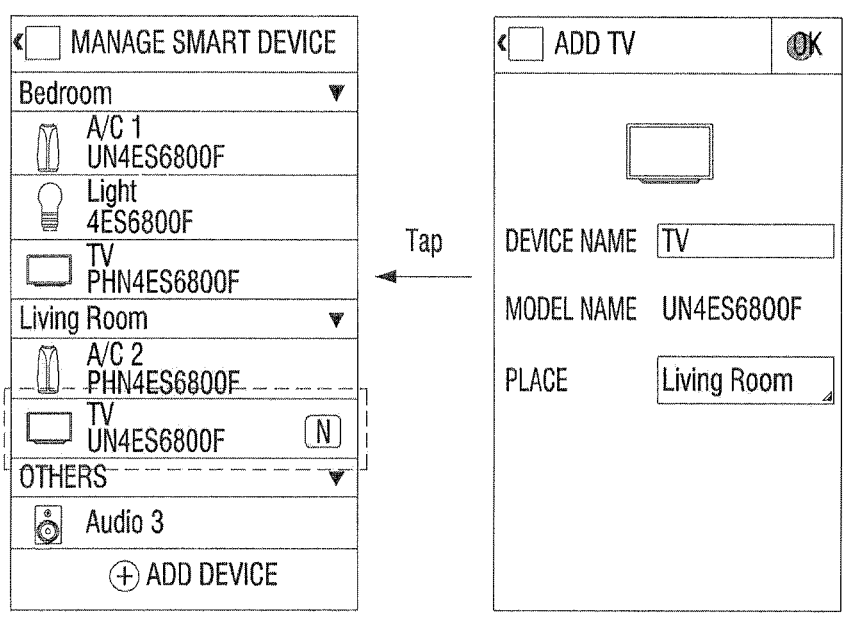

FIG. 73
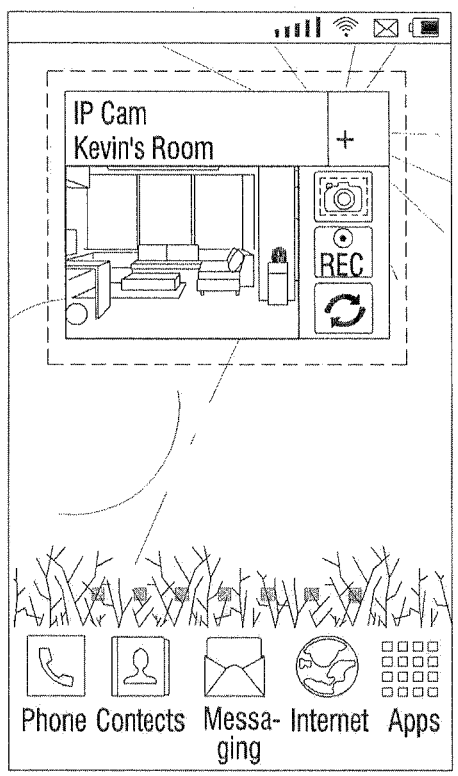
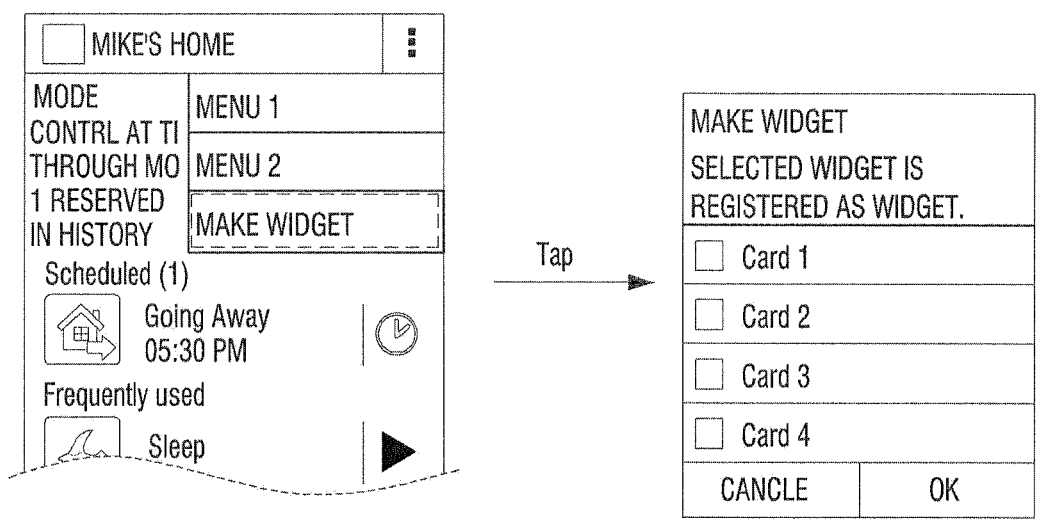

USER TERMINAL APPARATUS AND MANAGEMENT METHOD OF HOME NETWORK THEREOF

CROSS-REFERENCE TO RELATED APPLICATION

This application is a continuation of U.S. application Ser. No. 16/723,950, filed Dec. 20, 2019, now U.S. Pat. No. 11,163,425, which is a continuation of U.S. application Ser. No. 14/900,082, filed on Dec. 18, 2015, now U.S. Pat. No. 10,564,813, which is a national stage application of International Patent Application No. PCT/KR2014/005385, filed on Jun. 18, 2014, which designates the United States, which claims the benefit of U.S. Provisional Application No. 61/836,251, filed Jun. 18, 2013, and which claims priority to Korean Patent Application No. 10-2014-0074580, filed Jun. 18, 2014. The contents of each of these applications are incorporated herein in their entirety.

TECHNICAL FIELD

The present application generally describes a user terminal apparatus and a management method of a home network thereof, and more particularly, a user terminal apparatus that provides various user interface (UI) screens for managing a home network and a management method of a home network thereof.

BACKGROUND AND SUMMARY

With the development of computer technologies, communication technologies, and home electronics technologies, a network management service for managing a home network to which apparatuses and systems in a home are connected has taken center stage as a future-oriented technology.

All types of information electronic appliances that are connected to one another through a home network in a home may transmit data to one another and communicate with various types of user terminal apparatuses. For example, a user may control all types of electronic appliances that are connected to one another through a home network in a home regardless of time and place, by using a UI installed in a user terminal apparatus such as a portable phone, a mobile phone, a smart phone or the like.

However, since ubiquitous service eXchanges (UXs), which are provided according to different types of businesses such as a manufacturer, a communication company, etc., are different, it is still difficult to provide a home network management service. For example, whenever a device is newly added to a home network, the user has no choice but to adapt to a new UI screen design or have the discomfort of a fixed UI screen that may not satisfy various tastes of the user.

Also, various services, such as controls, methods, energy management, and the like of home appliances, are provided in a home network system. However, it can be difficult for the user to check, in one view, various functions provided from various services through only an existing service UI screen.

The present application describes a user terminal apparatus that provides various user interface (UI) screens for managing a home network and a method of managing a home network thereof.

According to a non-limiting aspect of the technology described herein, there is provided a user terminal apparatus including: a communication unit configured to be connected to a home network comprising a plurality of devices; a display unit configured to display a UI screen for managing the home network; a sensing unit configured to sense a user manipulation of the UI screen; and a control unit configured to change the UI screen displayed on the display unit according to the user manipulation. The UI screen may be one of a plurality of service pages that are changeable according to a user manipulation in a first direction, and the plurality of service pages may be pages for respectively providing different home network management services, and at least one of the plurality of service pages may include an area that is displayable on the display unit according to a user manipulation in a second direction.

In response to one of the plurality of service pages being selected, the control unit may display a function area page subordinate to the service page on the display unit.

The first direction may be a horizontal direction, the second direction may be a vertical direction, and the control unit may sequentially display the plurality of service pages page by page in response to a flick or drag manipulation being input in the horizontal direction and display a function area included in the service page in response to a flick or drag manipulation being input in the vertical direction.

One of the plurality of service pages may be a main page, and the main page may include an information display area of the home network and at least one favorite function area that is displayable according to a user manipulation in the second direction.

In response to a new device being added to the home network, the control unit may add at least one of a new service page and a new function area.

The plurality of service pages may include at least one of a control service page providing a control menu for respectively controlling operations of the plurality of devices, an energy service page providing energy usage information of the plurality of devices, a monitoring service page providing a monitoring service by using a photographing device of the plurality of devices, a media service page providing a media service by using a media output device of the plurality of devices, and a mode service page for differently controlling the plurality of devices according to a home network mode.

A function area of the control service page may include the control menu, a function area of the energy service page may include periodical energy usage information of the plurality of devices, a function area of the monitoring service page may include data captured by one of the plurality of devices, a function area of the media service may include a menu for managing a file stored in at least one of the plurality of devices, a function area of the mode service page may include a mode execution menu for executing one mode, and in response to the mode execution menu being selected, the control unit may control devices included in a group corresponding to the mode execution menu at one time.

The plurality of service pages may respectively include service summary areas. In response to a service summary area of one service page being displayed and a user manipulation in the second direction being performed, the control unit may move and display at least one function area connected to the service summary area onto the service summary area.

In response to the at least one function area being displayed on the display unit and an enlarge menu icon of one function area being selected, the control unit may enlarge the one function area to a detailed function area and display the detailed function area in a whole area of the display unit.

In response to the at least one function area being displayed on the display unit and a pinch gesture being input, the control unit may reduce the at least one function area to corresponding objects and display the corresponding objects and, in response to one of the objects being selected, change the selected object to a function area and display the function area.

The user terminal apparatus may further include a rotation sensing unit configured to sense a rotation of the user terminal apparatus. The control unit may display the main page according to a first layout in response to the display unit being oriented in the vertical direction and display the main page according to a second layout in response to the display unit being oriented in the horizontal direction.

The first layout may be a layout in which the information display area of the home network and at least one favorite function area are connected in a second axis direction based on the information display area of the home network, and the second layout may be a layout that includes a plurality of state information areas indicating state information of respective rooms included in an environment managed by the home network.

According to another non-limiting aspect of the technology described herein, a method of managing a home network of a user terminal apparatus includes, in response to an application for managing the home network including a plurality of devices, being executed, displaying a first service page of a plurality of service pages for managing the home network; in response to the first service page being displayed and a user manipulation in a first direction being input, displaying a second service page connected to the first service page; and in response to the first service page or the second service page being displayed and a user manipulation in a second direction, displaying a function area comprised in the first service page or the second service page. The plurality of service pages may be pages for respectively providing different home network management services.

The method may further include: in response to one of the plurality of service pages being selected, displaying a function area subordinate to the service page on a display unit.

The method may further include: in response to a new device being added to the home network, adding at least one of a new service page and a new function area.

The one of the plurality of service pages may be a main page, and the main page may include an information display area of the home network and at least one favorite function area that is displayable on a display unit according to a user manipulation in the second direction.

The plurality of service pages may respectively include service summary areas and at least one function area connected to the service summary areas. The displaying of the at least one function area may include: in response to the at least one function area being displayed and a user manipulation in the second direction being performed, moving and displaying the at least one function area onto the service summary areas.

The method may further include: in response to the at least one function area being displayed and an enlarge menu icon of one function area being selected, enlarging the one function area to a detailed function area and displaying the detailed function area.

The method may further include: in response to at least one function area being displayed and a pinch gesture being input, reducing the at least one function area to corresponding objects and displaying the corresponding objects, and in response to one of the reduced objects being selected, changing the selected object to a function area and displaying the function area.

The method may further include: in response to the main page being displayed and a display unit of the user terminal apparatus being oriented in a vertical direction, displaying the main page according to a first layout, and in response to the display unit being oriented in a horizontal direction, displaying the main page according to a second layout.

According to various example embodiments as described above, a home network service user interface (UI) screen that reflects various needs of a user may be provided. Therefore, the user may further intuitively and efficiently use various services.

BRIEF DESCRIPTION OF THE DRAWINGS

FIGS. 26, 27, 28A, 28B, 29, 30, 31, 32, 33 and 34 illustrate an example second service page according to various non-limiting example embodiments.

FIGS. 35, 36, 37, 38, 39, 40, 41, 42, 43, 44, 45, 46, 47 and 48 illustrate an example third service page according to various non-limiting example embodiments.

FIGS. 49 and 50 illustrate an example fourth service page according to various non-limiting example embodiments.

FIGS. 56, 57, 58 and 59 illustrate an example sixth service page according to various non-limiting example embodiments.

FIGS. 60, 61, 62, 63, 64, 65, 66, 67, 68, 69, 70, 71, 72 and 73 illustrate an example setting screen according to various non-limiting example embodiments.

DETAILED DESCRIPTION

Figure 1:
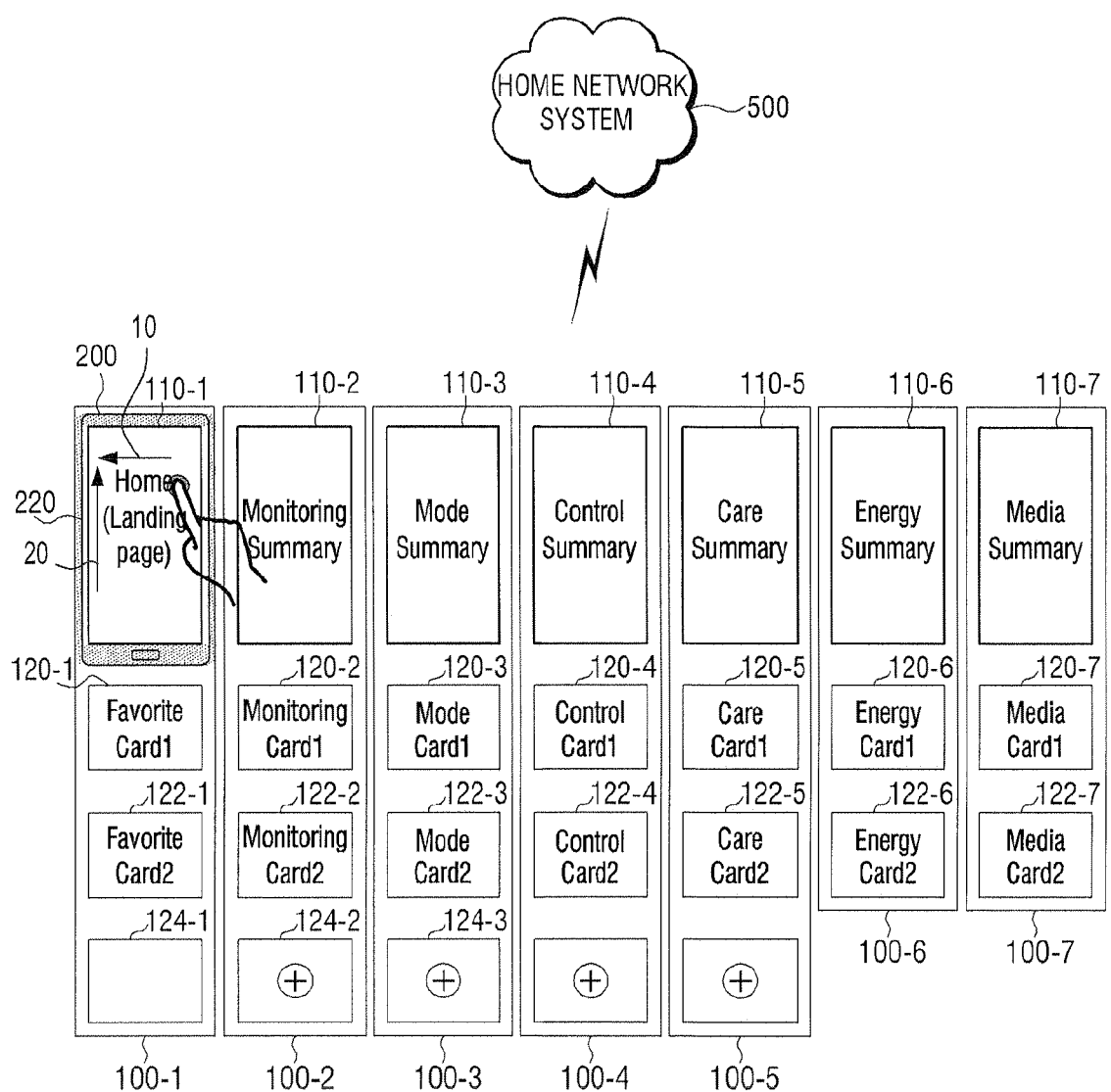
FIG. 1 illustrates an example UI screen for managing a home network according to a non-limiting example embodiment.

Example embodiments are described in greater detail with reference to the accompanying drawings.

In the following description, the same drawing reference numerals are used for the same elements in different drawings. The matters defined in the description, such as detailed construction and elements, are provided to assist in a comprehensive understanding of the example embodiments. Thus, it is apparent that the example embodiments may be carried out without those specifically defined matters. Also, well-known functions or constructions are not described in detail to avoid obscuring the example embodiments with unnecessary detail.

FIG. 1 illustrates an operation of an example user terminal apparatus according to a non-limiting example embodiment. A user terminal apparatus 200 is an element that receives a user manipulation by using various types of input devices or units such as a touch screen, a mouse, a keyboard, a touchpad, a button, a microphone, a camera, etc. and performs a control operation corresponding to the user manipulation. In detail, the user terminal apparatus 200 may be realized as various types of devices or apparatuses such as a portable phone, a mobile phone, a smart phone, a laptop personal computer (PC), a tablet PC, a personal digital assistant (PDA), a PC, a TV, a home network control apparatus, etc. The user terminal apparatus 200 may be variously referred to as a management apparatus, a control apparatus, a display apparatus, etc. but is referred to herein as the user terminal apparatus 200.

A user may manage a home network system 500 by using the user terminal apparatus 200. The user terminal apparatus 200 displays a UI screen that is designed so as to enable the user to manage the home network system 500. Home network management is a concept including control of devices connected to one another through a network in a home, analyses of states of the devices, sensing of dangerous situations in the home, information exchanges between family members, etc. and is possible through the user terminal apparatus 200.

Referring to FIG. 1, a UI screen that is displayed through a display unit 220 of the user terminal apparatus 200 is a part of one of a plurality of service pages 100-1 through 100-7.

A service page may refer to, for example, a page including a service summary area and at least one function area. The plurality of service pages are pages for respectively providing different home network management services. The plurality of service pages may be changed according to a user manipulation in a first direction. Also, at least one of the service pages may include a function area that is displayed according to a user manipulation in a second direction. The service pages may be connected to one another and may be separately displayed on the display unit 220 according to a user manipulation. Also, the first direction may correspond to a horizontal direction, and the second direction may correspond to a vertical direction, but the first and second directions are not necessarily limited in this respect.

A direction may be changed on the display unit 220 according to settings to display the UI screen. For example, the user terminal apparatus 200 may include a gravity sensor, and a control unit may change a direction of the UI screen so as to enable the UI screen to correspond to aspects of an orientation of the user terminal apparatus 200. Therefore, the vertical direction and the horizontal direction may be determined according to a direction of a screen displayed on the display unit 220. The horizontal direction may be a direction displayed from left to right or from right to left on the displayed screen, and the vertical direction may be a direction displayed from top to bottom or from bottom to top.

As shown in FIG. 1, a service summary area 110-1 of a main service 100-1 of a plurality of service pages is currently displayed on the display unit 220. For example, if a user manipulation in a first direction is input, a service summary area 110-2 of a monitoring service page 100-2 connected to (or accessible via) the main page 100-1 may be displayed. As another example, if a user manipulation in a second direction is input when the service summary area 110-1 of the main page 100-1 is displayed, at least one favorite function area 120-1, 122-1, and 124-1 connected to (or accessible via) the service summary area 110-1 may be displayed.

For convenience of description, respective service pages are designated as shown in FIG. 1. However, the arrangement order and designation of service pages is not limited to that shown in FIG. 1, and may involve other types of service pages, designs of service pages, etc.

UI screens having different characteristics may be arranged in the first and second directions. For example, service screens for managing a home network may be arranged in the first direction, and screens for controlling functions of devices included in the home network may be arranged in the second direction. Also, the screens for controlling the functions of the devices used for providing corresponding services on the service screens arranged in the first direction may be respectively arranged in the second direction.

FIG. 1 illustrates a whole structure of a UI screen provided by the user terminal apparatus 200 according to an example embodiment. The UI screen may provide various home network management services and includes screen designs, structures, information, etc. appropriate for service characteristics.

The display unit 220 of the user terminal apparatus 200 may display a part of the whole structure of the UI screen shown in FIG. 1 according to a user manipulation direction.

Referring to FIG. 1, the example UI screen for managing the home network is a screen on which one of a plurality of service pages 100-2 through 100-7 is displayed. Here, the plurality of service pages 100-2 through 100-7 are arranged in the first direction relative to the main page 100-1. In FIG. 1, a horizontal direction may be the first direction based on the display unit 220 of the user terminal apparatus 200, and a vertical direction may be the second direction. However, the first and second directions are not limited to this arrangement. For example, the vertical direction may be set to the first direction, and the horizontal direction may be set to the second direction. Alternatively, a third or fourth direction that is a diagonal direction may be additionally set.

The user inputs a user manipulation to directly touch a surface of the display unit 220 so as to perform flicking or dragging in the first or second direction. However, types of user manipulations are not limited thereto. For example, the user may change a screen by using a touch pen or may change the screen by using a direction button, a wheel button, or the like. Also, the user may manipulate a UI screen by using a motion (e.g. tilting the user terminal apparatus 200) or a voice. Example embodiments where a UI is changed according to a touch manipulation method of directly touching a screen by a user will now be described.

If an icon corresponding to a home network function is selected so as to perform the home network function on the user terminal apparatus 200 or the user terminal apparatus 200 is turned on to be booted-up, the user terminal apparatus 200 may display the main page 100-1. Alternatively, a currently used service page may be displayed.

The main page 100-1 is an initial page that is provided from a home network management service and may include a home network situation, environment information such as time, weather, etc., an external traffic situation, etc. Besides these, other types of information, such as various types of information released in relation to a home network management, news updates, a danger (e.g., extreme weather conditions) guide message, etc. may be displayed on the main page 100-1. The main page 100-1 may alternatively be referred to as an initial page, a home page, a landing page, etc.

Referring to FIG. 1, the main page 100-1 includes an information display area 110-1 for displaying information about a home network and the plurality of favorite function areas 120-1, 122-1, and 124-1 that are sequentially arranged in the second direction under the information display area 110-1.

At least one or more service pages may be connected to the main page 100-1. In FIG. 1, the plurality of service pages 100-2 through 100-7 are connected to the main page 100-1 along the first direction. Information about various services for managing the home network may be respectively displayed on the service pages 100-2 through 100-7.

In detail, referring to FIG. 1, the plurality of service pages 100-2 through 100-7 respectively include service summary areas 110-2 through 110-7 and a plurality of function areas 120-2, 122-2, 120-3, 122-3, 120-4, 122-4, 120-5, 122-5, 120-6, 122-6, 120-7, and 122-7 that are sequentially arranged in the second direction under corresponding service summary areas 110-2 through 110-7.

Here, function areas may refer, for example, to areas that may directly select or control functions respectively provided from service pages. For example, if a third service page 100-4 is used to display control services of devices in a home, an arbitrary function area included in the third service page 100-4 may be a function area for controlling a TV or an air conditioner. When a TV control function area is displayed on the display unit 220, the user may immediately turn a TV on or off or control a volume, a channel, or the like through the TV control function area.

The plurality of service pages 100-2 through 100-7 may respectively further include additional menus (e.g., menus 124-2 and 124-3). The user may select an additional menu to add a new function area into a corresponding service page.

The user of the user terminal apparatus 200 may perform a user interaction by using each UI screen arranged according to the first or second direction. In detail, the user may perform dragging or flicking along the first or second direction to change a UI screen. A user interaction method will now be described in detail.

When a summary area of a service page is displayed, the user may call a function area. A first service page 100-2 will be described by way of example and without limitation. A plurality of function areas included in the first service page 100-2 may sequentially go up onto and be displayed in a summary area 110-2 of a first service according to a user manipulation (e.g., a manipulation for performing dragging or flicking upwards after performing touching) in the second direction. In this case, according to example embodiments, summary areas may be maintained, and function areas may respectively overlap and be displayed on the summary areas or the summary areas may be pushed upwards to gradually display the function areas. Alternatively, a screen change may be immediately performed according to display sizes. In other words, if the user inputs a user manipulation upwards along the second direction when the summary area 110-2 is displayed, the summary area 110-2 may be changed into two function areas 120-2 and 122-2 right under the summary area 110-2. Alternatively, a favorite function area or a function area may be displayed on the display unit 220 in the manner of a card taken out of a wallet. Therefore, a function area may be written as various terms such as a card, a tag, a function section, etc. The word "card" is used in FIG. 1 in consideration of a characteristic of such a function area.

If a user manipulation is input downwards along the second direction when a function area is displayed, the display unit 220 may re-display the summary area 110-2.

A detailed operation performed according to a user input will now be described. For example, if a first user manipulation 10 in the first (horizontal) direction is input when the information display area 110-1 of the main page 100-1 is currently displayed on the display unit 220, the display unit 220 displays a first summary area 110-2 of the first service page 100-2. In this case, the information display area 110-1 may be immediately changed into the first service summary area 110-2 or may be changed to be pushed to the left so as to enable the first service summary area 110-2 to be gradually displayed from the left direction. Alternatively, a screen may be changed so as to enable the first service summary area 110-2 to be overlaid on the information display area 110-1.

As another example, as shown in FIG. 1, if a second user manipulation 20 in the second direction is input when the information display area 110-1 of the home network of the main page 100-1 is currently displayed on the display unit 220, the display unit 220 displays at least one of the plurality of favorite function areas 120-1, 122-1, and 124-1 of the main page 100-1. Here, the plurality of favorite function areas 120-1, 122-1, and 124-1 correspond to function areas of function areas of respective service pages that are registered as bookmarks.

If a user manipulation is input in a left direction along the first direction when a plurality of favorite function areas are displayed, the display unit 220 may immediately display the corresponding function areas 120-2 and 122-2 on the first service page 100-2 or may display the first service summary area 110-2.

As shown in FIG. 1, the main page 100-1 and the service pages 100-2 through 100-7 may be formed in larger sizes than a display size of the display unit 220. Also, in the pages 100-1 through 100-7, a size of the information display area 110-1 or sizes of service summary areas 110-2 through 110-7 may be equal to the display size of the display unit 220. On the contrary, sizes of favorite function areas or function areas may be smaller than the display size of the display unit 220. Therefore, when favorite function areas or function areas are displayed, a plurality of favorite function areas or a plurality of function areas may be displayed within one screen.

The whole structure of the UI screen for managing the home network has been described above with reference to FIG. 1, and a layout of each UI screen for managing a home network will now be described with reference to FIGS. 2 through 4.

Figure 2:
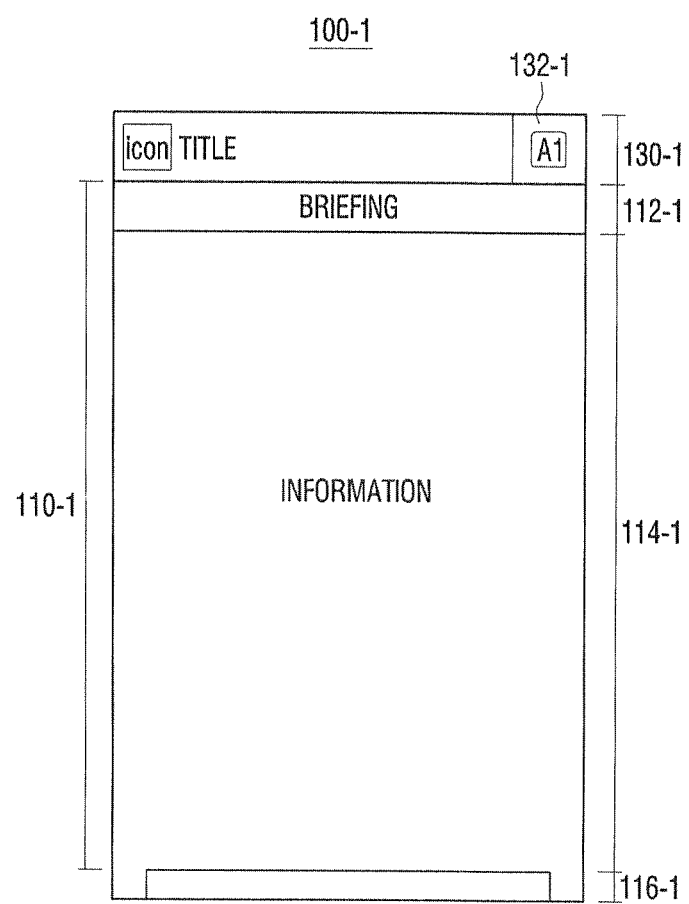
FIGS. 2, 3 and 4 illustrate a layout of an example UI screen for managing a home network according to a non-limiting example embodiment.

FIG. 2 illustrates a layout of a main page according to an example embodiment. Referring to FIG. 2, a main page 100-1 may include a title area 130-1 and an information display area 110-1 of a home network.

A title of a home network may be displayed in the title area 130-1. If a user does not input a particular profile, a default title may be displayed. For example, a title "Smart Home" may be displayed by default in the title area 130-1 of the main page. After that, if the user stores a particular profile, a title may be changed according to, for example, a user name. For example, if the user is a user AAA, a title "AAA's Home" may be displayed in the title area 130-1. Also, title area 130-1 of the main page may include a menu area 132-1, and, if the menu area 132-1 of the main page is selected, a menu may be displayed, which may be provided on the main page 100-1, or may be changed into a history screen. This will be described in more detail with reference to FIGS. 15 and 16.

The information display area 110-1 of the home network may include a briefing area 112-1 that displays briefing contents, an information area 114-1 that displays information provided on the main page 100-1, and a cue area 116-1 of a favorite function area for indicating that at least one of a plurality of favorite function areas 120-1, 122-1, and 124-1 is positioned at the bottom. If the cue area 116-1 of the favorite function area is touched for input of a user manipulation for performing upward dragging, the plurality of favorite function areas 120-1, 122-1, and 124-1 may be sequentially displayed in the information display area 110-1.

Figure 3:
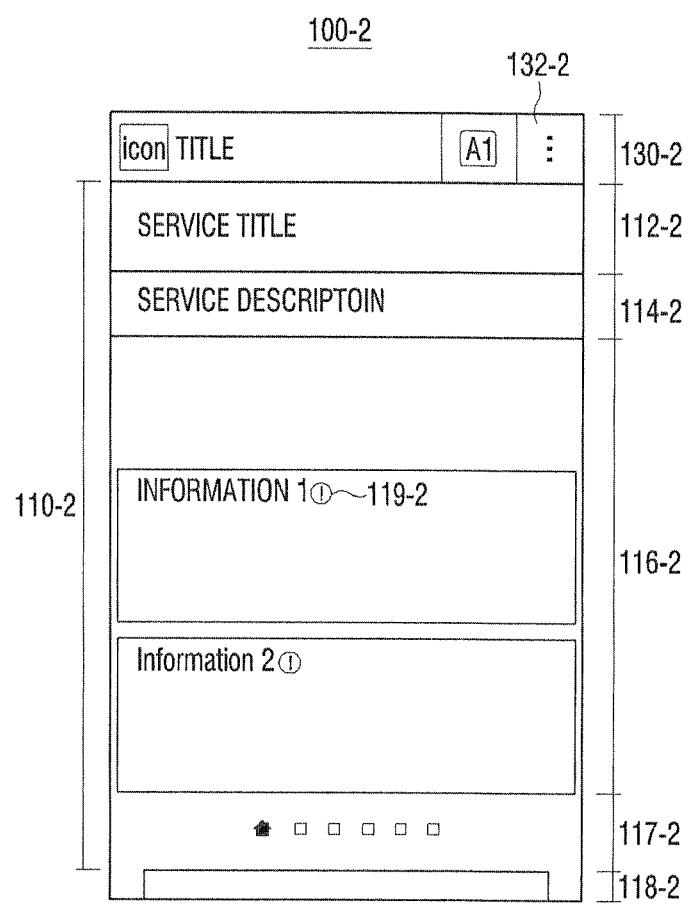

FIG. 3 illustrates a layout of a first service page 100-2 of a plurality of service pages 100-2 through 100-7 according to an example embodiment. Layouts of the other service pages are similar to the layout of the first service page 100-2.

Referring to FIG. 3, the first service page 100-2 may include a title area 130-2 and a service summary area 110-2.

The title area 130-2 of the first service page displays "Smart Home" by default and, if the user stores a profile, may be changed so that "User Name's Home" is displayed. Also, the title area 130-2 of the first service page may include a menu area 132-2 and, if the menu area 132-2 of the first service page is selected, a menu may be provided on the first service page 100-2.

The first service summary area 110-2 may include a first service title area 112-2 that displays a first service name, a first service description area 114-2 that displays description contents or a current state of a first service, and a first service information area 116-2 that displays main information provided on the first service page 100-2. Here, a tip object 119-2 that calls a description of displayed information may be provided in the first service information area 116-2. When the tip object 119-2 is selected, a description of a corresponding function may be displayed.

The first service summary area 110-2 may include an inter-service indicator 117-2 and a cue area 118-2 of a function area of the first service for indicating that at least one of a plurality of function areas 120-2, 122-2, and 124-2 of the first service is positioned below the service page 110-2. When the cue area 118-2 of the function area of the first service is touched to input the second manipulation 20 of the user for performing dragging in the second direction, the plurality of function areas 120-2 and 122-2 of the first service may be overlaid in the first service summary area 110-2 as shown in FIG. 4.

Figure 4:
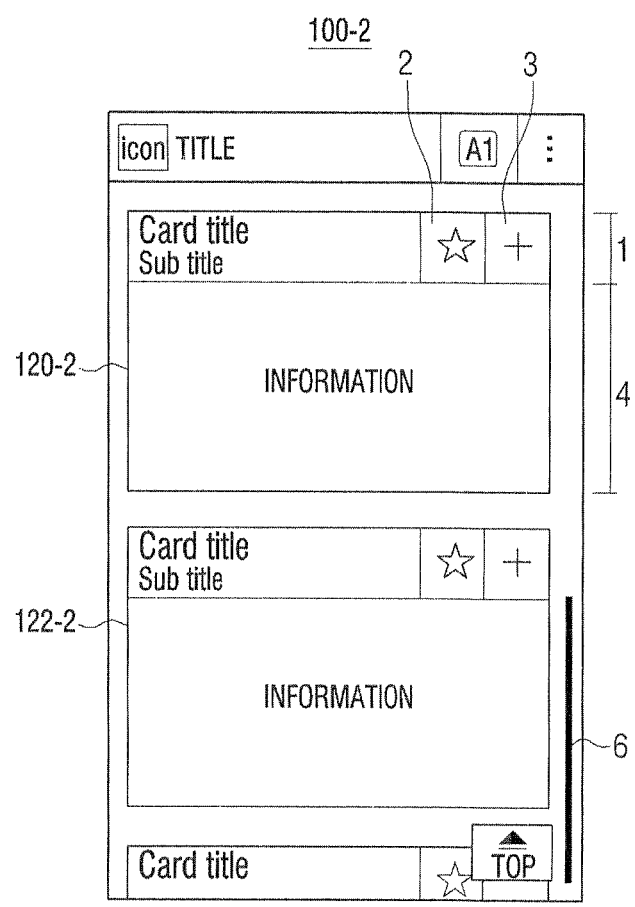

As shown in FIG. 4, the plurality of function areas 120-2 and 122-2 of the first service may include a title area 1 that provides a sub title if a title and an additional content of a function area are needed, an information area 4 that displays contents of the corresponding function area, a bookmark icon 2, and an enlarge menu icon 3. If the bookmark icon 2 is selected, the corresponding function area is added to a new favorite function area of the main page 100-1. In other words, the user may check a function area, which is registered with a bookmark, on the main page 100-1 without passing through the first service page 100-2.

If the enlarge menu icon 3 is selected, the corresponding function area is enlarged, and detailed information of the corresponding function area is displayed.

Also, the plurality of function areas 120-2 and 122-2 of the first service may be moved in the second direction according to a user manipulation in the second direction. Here, a scroll bar 6 may be displayed.

A UI screen according to various example embodiments as described above provides a unifying design of each service. Also, a change between service screens and a detailed function that is provided by a service may be intuitively called according to a user manipulation in the first or second direction.

A structure of a UI screen for managing a home network may be variously changed to be appropriate for a user taste or may be adaptively changed according to a change in an environment of a home network system. This example embodiment will now be described in more detail with reference to FIGS. 5 through 8.

Figure 5:
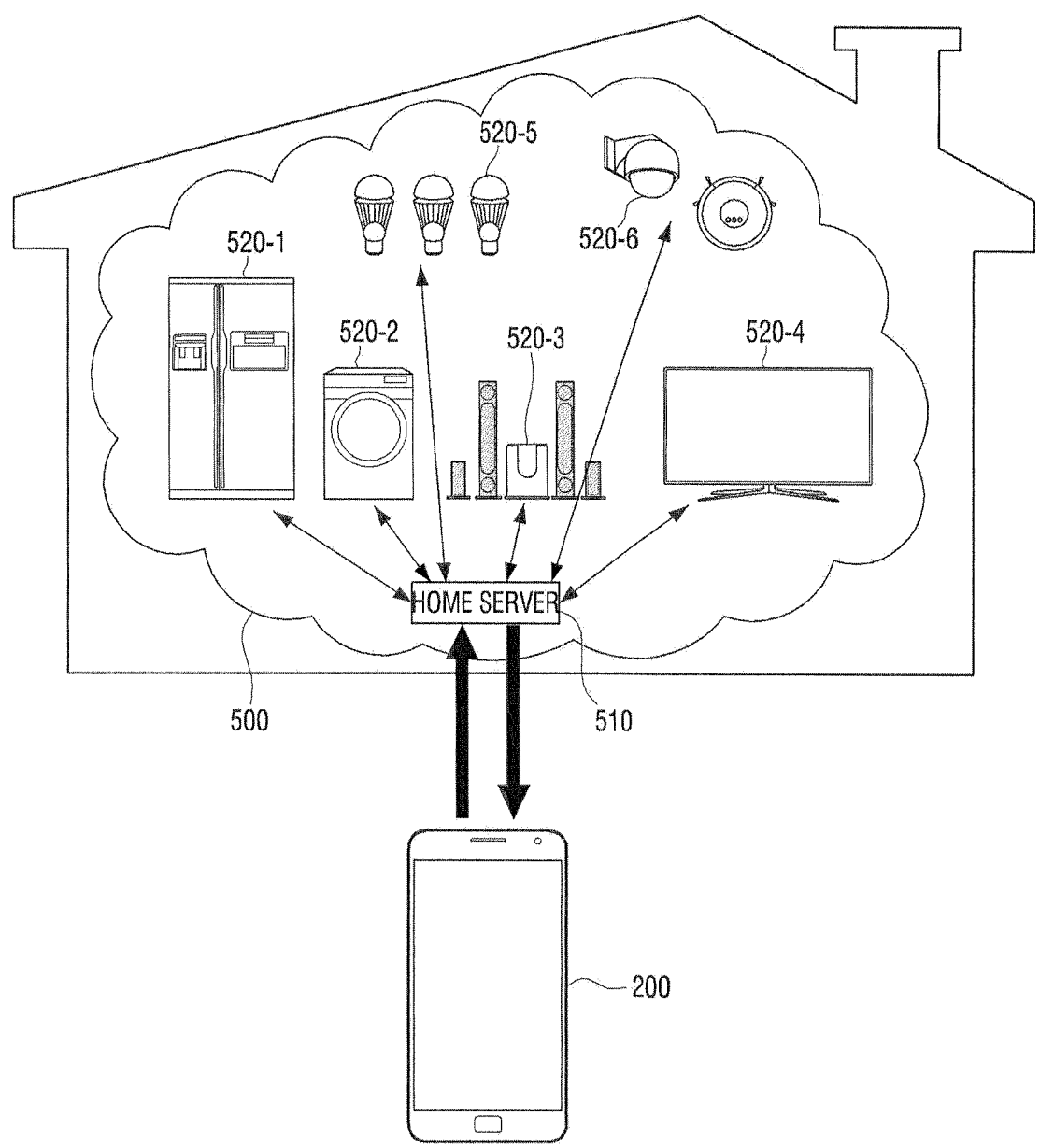
FIGS. 5, 6, 7 and 8 illustrate an example home network system for providing a home network management service according to various non-limiting example embodiments.
Figure 6:
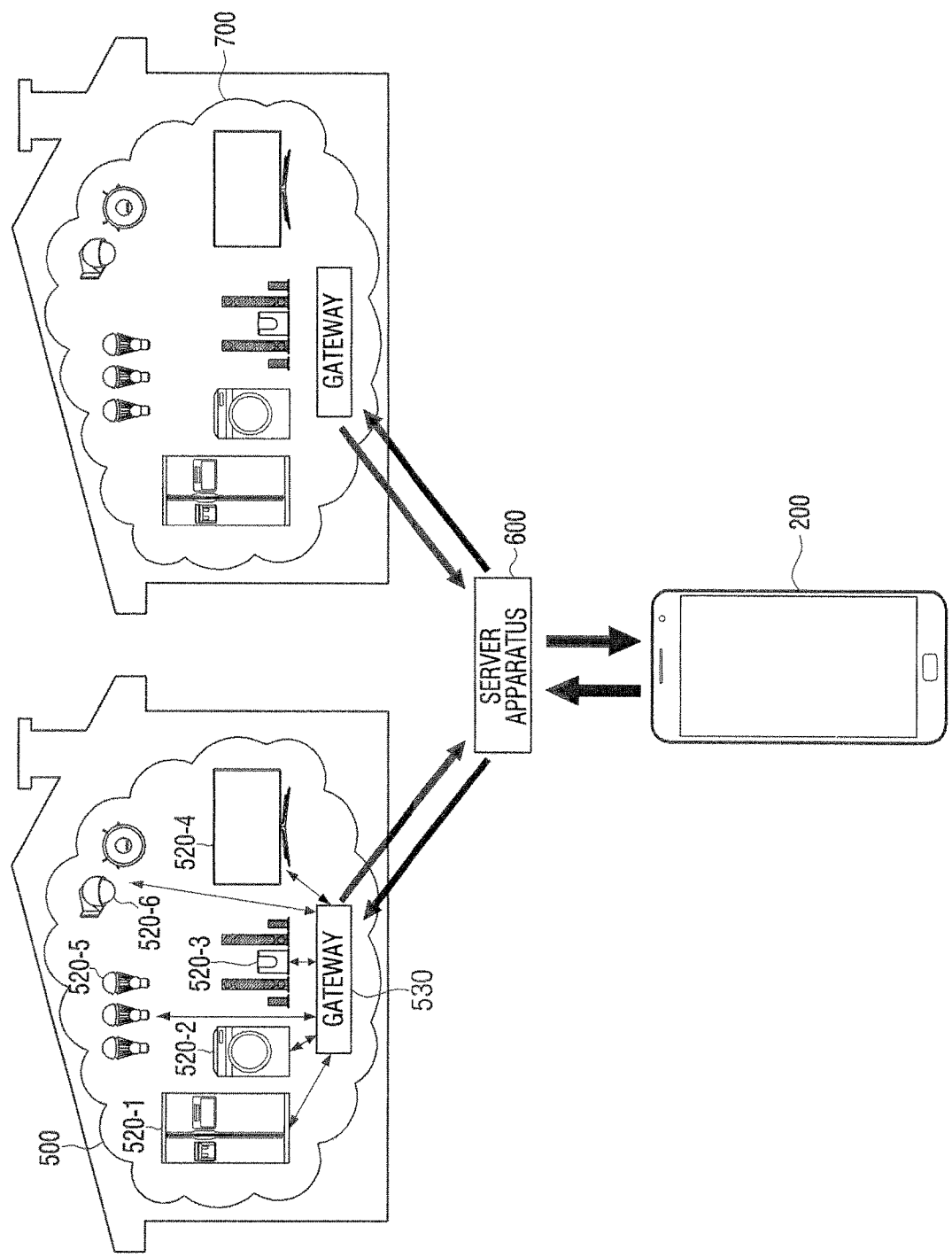

FIGS. 5 and 6 illustrate a home network system according to various example embodiments.

Referring to FIG. 5, a home network system 500 is connected to a user terminal apparatus 200 and includes a home server 510 and a plurality of client devices 520-1, 520-2, 520-3, . . . , and 520-6 connected to the home server 510.

The home server 510 may control and manage the client devices 520-1, 520-2, 520-3, . . . , and 520-6 connected to the home network, and may operate with the client devices 520-1, 520-2, 520-3, . . . , and 520-6. In detail, the home server 510 may take charge of a service remote management function from an external network, audio, video, game, digital broadcasting server, energy management, home automation, and security server functions in a home, etc. The home server 510 may exist as an independent device or may be mounted on another device.

The user terminal apparatus 200 may communicate with the home server 510 to transmit a control command or the like for controlling the plurality of client devices 520-1, 520-2, 520-3, . . . , and 520-6 or receive various types of state information of the plurality of client devices 520-1, 520-2, 520-3, . . . , and 520-6, danger situation sensing information of the home, or the like.

Also, the user terminal apparatus 200 may be provided with a new service page or a template of a new function area UI from the home server 510 to change a UI screen configuration according to a user taste.

According to another example embodiment, the home network system 500 may include a gateway and communicate with an external server apparatus 600. Referring to FIG. 6, in detail, the home network system 500 may include a gateway 530 and a plurality of client devices 520-1, 520-2, 520-3, . . . , and 520-6 connected to the gateway 530.

The gateway 530 is an apparatus that provides an interconnection between a network in a home and an external network and operates as a hub that connects and manages the plurality of client devices 520-1, 520-2, 520-3, . . . , and 520-6. In detail, the gateway 530 may control and manage devices by using wired and/or wireless communication technology and access an external network (e.g., the Internet) to provide various services such as video on demand (VOD), remote control, etc.

In particular, the gateway 530 may transmit a control command, which is provided from the external server apparatus 600, to the plurality of client devices 520-1, 520-2, 520-3, . . . , and 520-6 or may collect state information from the plurality of client devices 520-1, 520-2, 520-3, . . . , and 520-6 and transmit the state information to the server apparatus 600. In this case, the user terminal apparatus 200 may transmit a control command or the like for controlling the plurality of client devices 520-1, 520-2, 520-3, . . . , and 520-6 or may receive various types of state information or the like from the plurality of client devices 520-1, 520-2, 520-3, . . . , and 520-6.

The user terminal apparatus 200 may also be provided with a new service page or a UI template of a new function area from the server apparatus 600 to change a UI screen configuration according to a user taste. In this case, the UI template stored in the server apparatus 600 may be updated by a server manager.

Referring to FIG. 6, the user terminal apparatus 200 may communicate with a second home network system 700 connected to the server apparatus 600. For example, the user may check state information of a parent's home through the user terminal apparatus 200 and receive information such as a message or the like indicating, for example, that a gas range is turned on for a long time in the parent's home. A care report service as described above will be described later in more detail with reference to FIGS. 49 and 50.

A new device that is added to a home network system will now be described with reference to FIG. 7.

Figure 7:
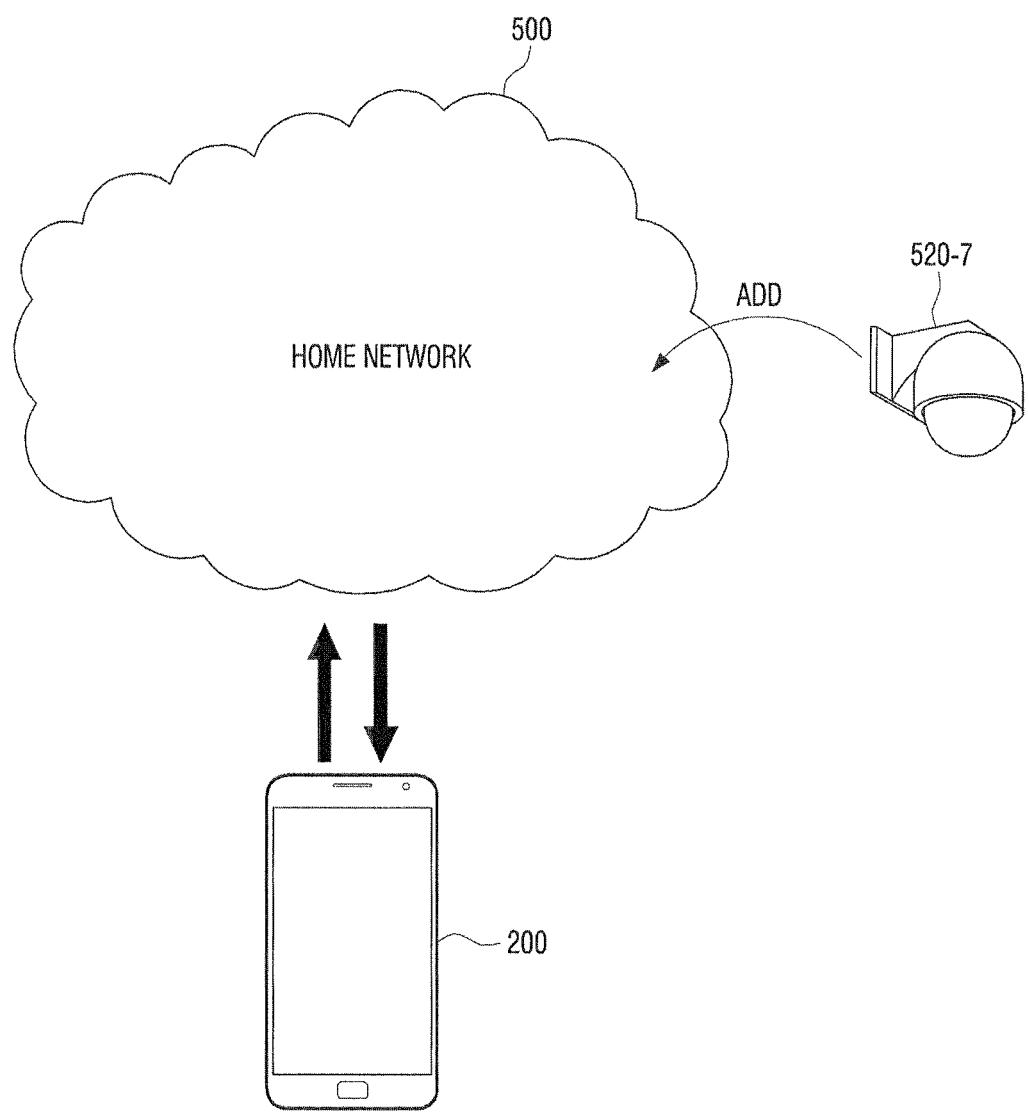

Referring to FIG. 7, if a new device 520-7 is added, the user terminal apparatus 200 that communicates with the home network system 500 may provide device addition information to the user. For example, the home server 510 or the server apparatus 600 may collect meta information about a new device and transmit new device information to the user terminal apparatus 200. Also, a new device may be registered in the home network system 500 according to user settings. In this case, the user terminal apparatus 200 may generate a new UI screen of a new device or change and display an existing UI screen configuration. In detail, the home server 510 or the server apparatus 600 may analyze meta information of a device to transmit a UI template appropriate for a function provided by the device to the user terminal apparatus 200. The user terminal apparatus 200 may configure a new UI screen by using the received UI template.

Figure 8:
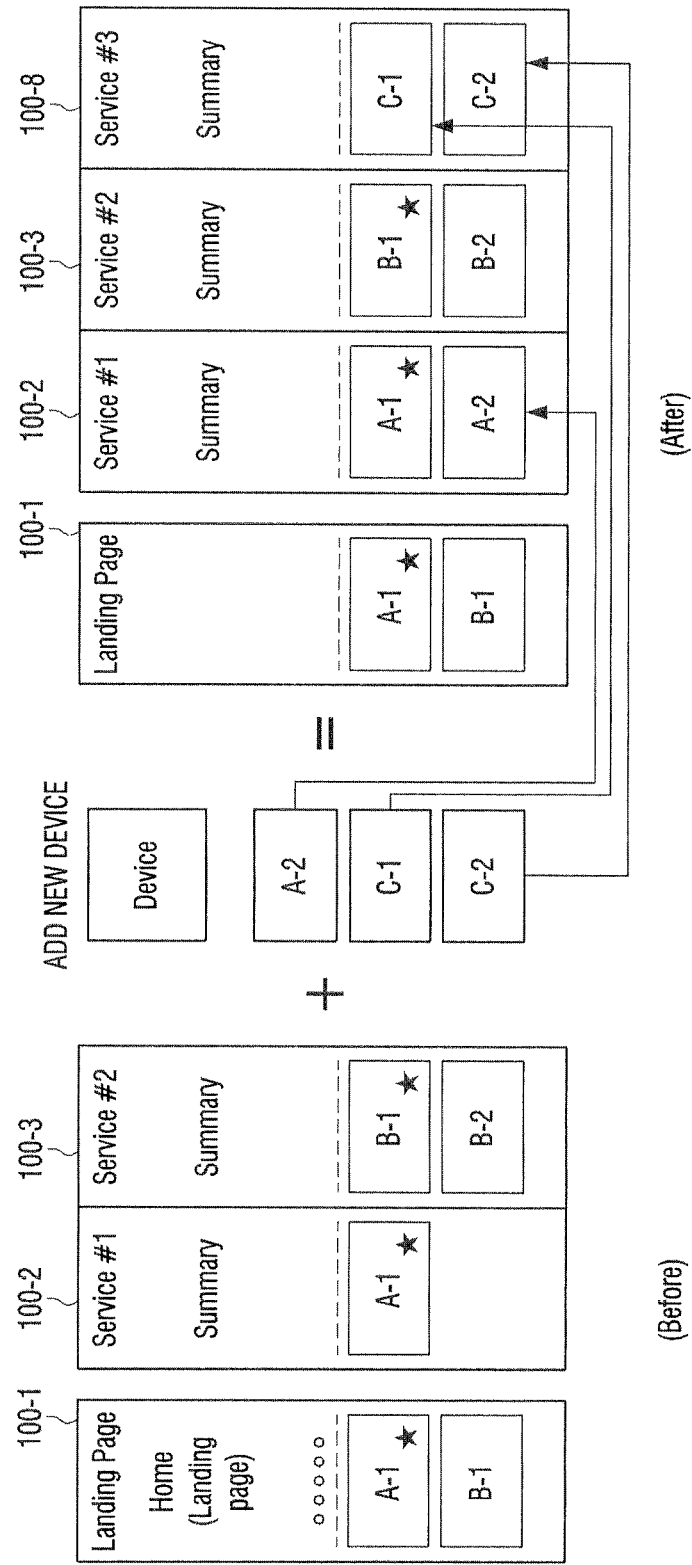

In detail, referring to FIG. 8, a new service page 100-8 corresponding to the new device 520-7 may be generated, and a plurality of function areas A-2, C-1, and C-2 of a plurality of functions that may be performed by the new device 520-7 may be included in existing service pages 100-2 and 100-3 or a new service page 100-8.

For example, as shown in FIG. 7, if the new device 520-7 is a camera, the home network system 500 may newly provide a monitoring service that displays an image captured by the camera 520-7. Therefore, the user terminal apparatus 200 may add the new service page 100-8 associated with the monitoring service onto a UI screen. If a plurality of cameras 520-7 exist and are installed all over environment of a home, the user terminal apparatus 200 may provide images of areas where the cameras 520-7 are respectively installed. In this case, a plurality of function areas for controlling operation of cameras respectively installed in areas may be newly added. For example, a main room monitoring function area C-1 and a baby room monitoring function area C-2 may be included in the new service page 100-8. In this case, if a service provided from a first service page 100-2 is a control service, a function area A-2 for controlling on/off switching of a monitoring camera may be added onto the first service page 100-2.

If an existing device is deregistered on the home network system 500, a service page or an associated function area associated with the existing device may be automatically deleted or a message for inquiring about whether to delete the service page or the associated function area may be displayed through the display unit 220. In other words, a UI screen configuration displayed on the user terminal apparatus 200 may be adaptively changed according to changes in an environment of the home network system 500.

The user terminal apparatus 200 that provides a UI screen for managing a home network as described above will now be described in detail.

Figure 9:
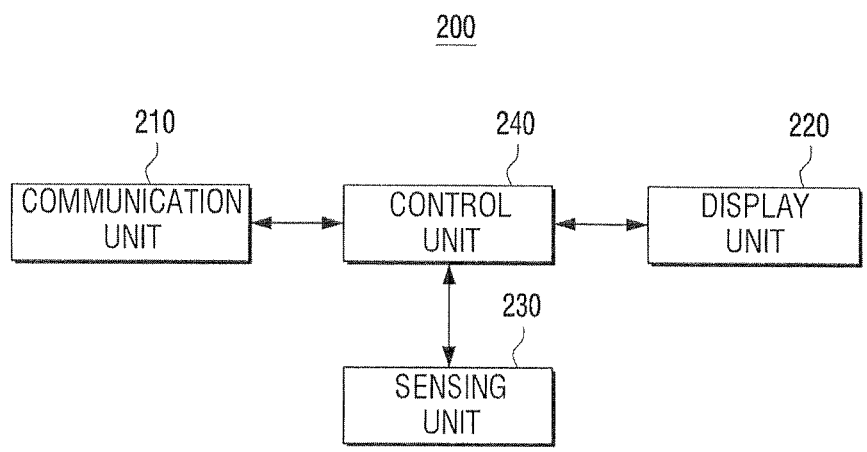
FIG. 9 is a block diagram of an example user terminal apparatus according to a non-limiting example embodiment.

FIG. 9 is a block diagram of a structure of the user terminal apparatus 200 according to an example embodiment. Referring to FIG. 9, the user terminal apparatus 200 includes a communication unit 210, the display unit 220, a sensing unit 230, and a control unit 240.

The communication unit 210 may, for example, be circuitry or some arrangement of hardware, software and firmware configured to enable wired and/or wireless communication with various types of external devices or external servers according to various types of communication methods. In particular, the communication unit 210 may be connected to the home network system 500 to receive information about client devices included in a home network or transmit a control command to the client devices.

If a new device is added to the home network, the communication unit 210 may receive information about the new device and receive a new UI template of the new device.

The display unit 220 may, for example, be one or more displays (e.g., CRT, LCD, OLED and the like) configured to display various types of UI screens as described above. A UI screen refers to a display screen that provides various types of information or menus to a user and performs a user interaction according to an action of the user for the various types of information or menus. As shown in FIG. 1, if a UI screen is formed of various pages, and sizes of the pages are larger than a display size, the display unit 220 may display at least a part of the UI screen for managing a home network.

The sensing unit 230 may, for example, be one or more sensors configured to sense various manipulations such as a touch on the user terminal apparatus 200, a rotation, a slope, and a pressure supplied to the user terminal apparatus 200, an access to the user terminal apparatus 200, etc. In particular, the sensing unit 230 may include a touch sensor (not shown) and a rotation sensor (not shown).

In detail, various touches of the user on the touch sensor may be associated with executions of various functions. For example, the various touches of the user may be classified into an operation (or tap) of pressing (or touching) and withdrawing from a screen, an operation (or a double tap) of consecutively pressing the screen two times and then withdrawing from the screen, an operation (or a long tap) of (long) pressing the screen for a preset time or more or withdrawing from the screen, an operation (or a drag) of pressing a point of the screen for a preset time or more and dragging the point to another point, an operation (or a swipe) of swiping the screen in a preset direction at a preset speed, an operation (pinch in) of pressing the screen with two fingers and closing the two fingers together, an operation (pinch out) of pressing the screen with two fingers and spreading the two fingers apart, etc.

The rotation sensor may include, for example, a geomagnetic sensor, an acceleration sensor, and/or the like for sensing aspects of a rotation state, a movement direction, etc. of the user terminal apparatus 200.

The control unit 240 may, for example, include a processor (e.g., executing appropriate software), an application specific integrated circuit (ASIC), floating point gate array, and/or dedicated circuitry configured to control an overall operation of the user terminal apparatus 200. The control unit 240 may operate with elements such as the communication unit 210, the sensing unit 230, the display unit 220, etc. to perform control operations described above according to various example embodiments.

Figure 10:
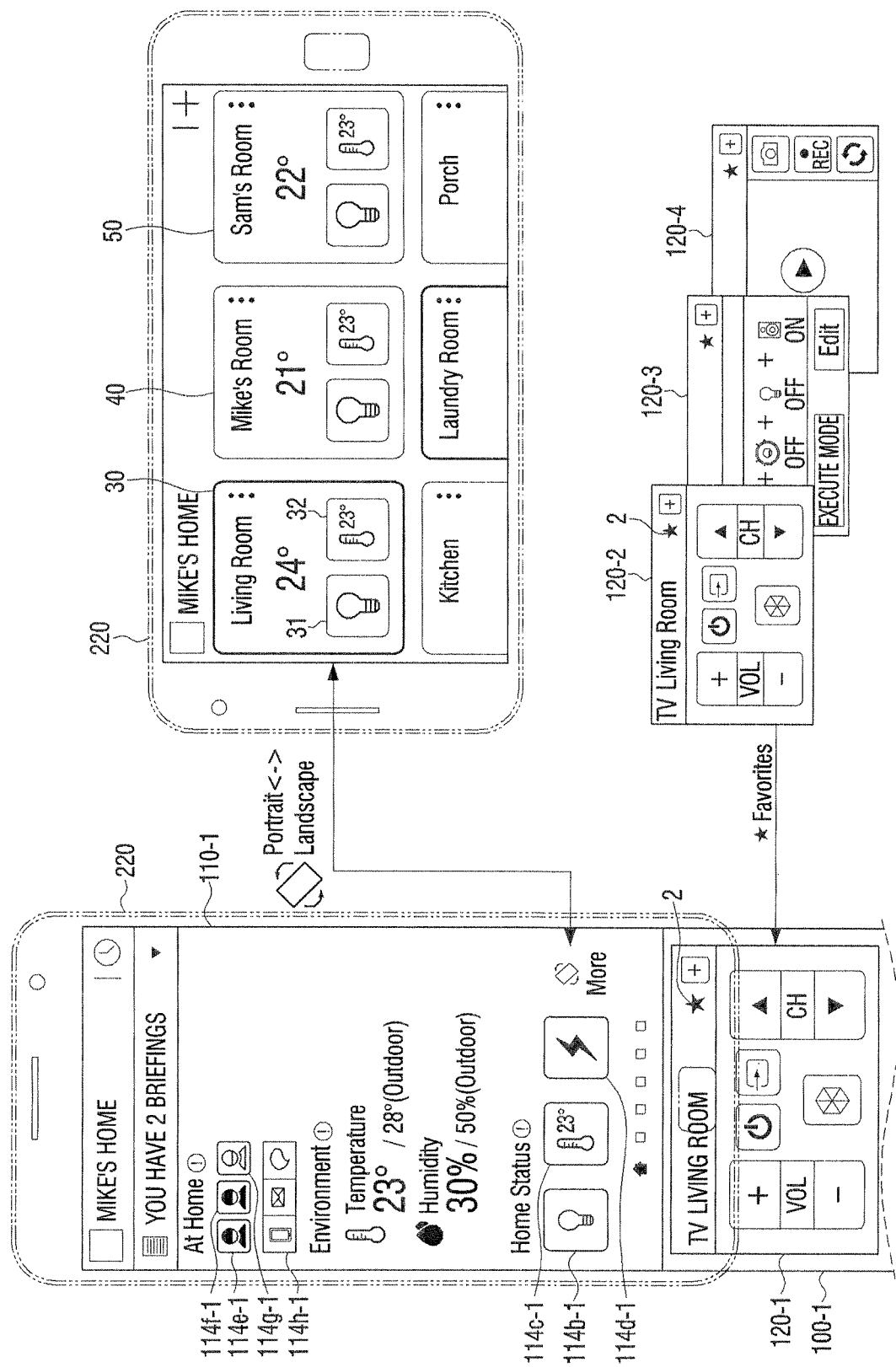
FIG. 10 illustrates a main page of an example UI screen for managing a home network according to a non-limiting example embodiment.

If an application for managing the home network is executed, the control unit 240 controls the display unit 220 to display a UI screen as shown in FIG. 10. If a user manipulation is sensed by the sensing unit 230 in this state, the control unit 240 may change the UI screen or control the home network according to the user manipulation. In detail, the control unit 240 may control the display unit 240 to sequentially display the main page 100-1 and a plurality of service pages 100-2, 100-3, 100-4, . . . , and 100-7 page by page according to the first user manipulation 10 performed sequentially in the first direction. The control unit 240 may also control the display unit 220 to display a plurality of function areas according to the second user manipulation 20 performed in the second direction.

If a home network management is started, the control unit 140 may first control display unit 220 to display the main page 100-1. The main page 100-1 may provide various types of information. For example, the main page 100-1 may include a light button 114*b*-1, a temperature button 114*c*-1, and a standby power button 114*d*-1. If an arbitrary button is selected from these buttons, a detail control window may be displayed in a pop-up form.

For example, if the standby power button 114*d*-1 is selected, a message window "Do you want to cut off standby power in your home (excluding a monitoring device and a refrigerator)?" may be displayed. Also, if a selection button included in the message window is selected, an operation of cutting off power in a home may be performed.

As another example, referring to FIG. 10, the main page 100-1 may include a plurality of user icons 114*e*-1, 114*f*-1, and 114*g*-1 respectively corresponding to family members in a family member current state area. If one of the plurality of user icons 114*e*-1, 114*f*-1, and 114*g*-1 is selected, a message pop-up window 114*h*-1 for sending a message to a corresponding family member may be output. Here, if one of a phone button, a message button, and a chatting button is selected, the control unit 240 may place a phone call to a corresponding family member or output a window or a chatting window for sending a message based on a phone directory stored in a storage unit (not shown).

According to another example embodiment, if a vertical rotation of the user terminal apparatus 200 is sensed by the sensing unit 230 when the main page 100-1 is displayed, the control unit 240 displays the main page 100-1 according to a layout different from a layout of the displayed main page 100-1.

For example, referring to FIG. 10, when the display unit 220 is oriented in a portrait direction, the control unit 240 displays the main page 100-1 in a layout where the information display area 110-1 of the home network and the first favorite function area 120-1 are connected to each other in a second direction based on the information display area 110-1 of the home network. When the display unit 220 is oriented in a landscape direction, the control unit 240 may display the main page 100-1 in a layout so as to include a plurality of state information areas 30, 40, and 50 indicating state information about respective rooms included in an environment managed by the home network. A rotation operation of the user terminal apparatus 200 as described above may be sensed by the sensing unit 230.

If the main page 100-1 is displayed in a second layout as shown in FIG. 10, for example, the user may select a light button 31 of a first room to switch on/off lights in that room. If a light for a respective room is switched on or off, background colors of the corresponding state information areas 30, 40, and 50 may be changed. The user may also select a temperature button 32 of the first room to control temperature of that room. For example, if the temperature button 32 of the first room is selected, a screen may be changed into one for setting a temperature level. Here, an animation effect may be applied to turn the first state information area 30 corresponding to the first room from a front side to a back side.

Also, at least one favorite function area of the main page 100-1 corresponds to at least one of function areas registered with bookmarks, among function areas included in each service page. The bookmark registration may be performed through a selection of the bookmark menu icon 2 provided in each function area as described above with reference to FIG. 4.

Figures 11A, 11B, 11C, 11D:
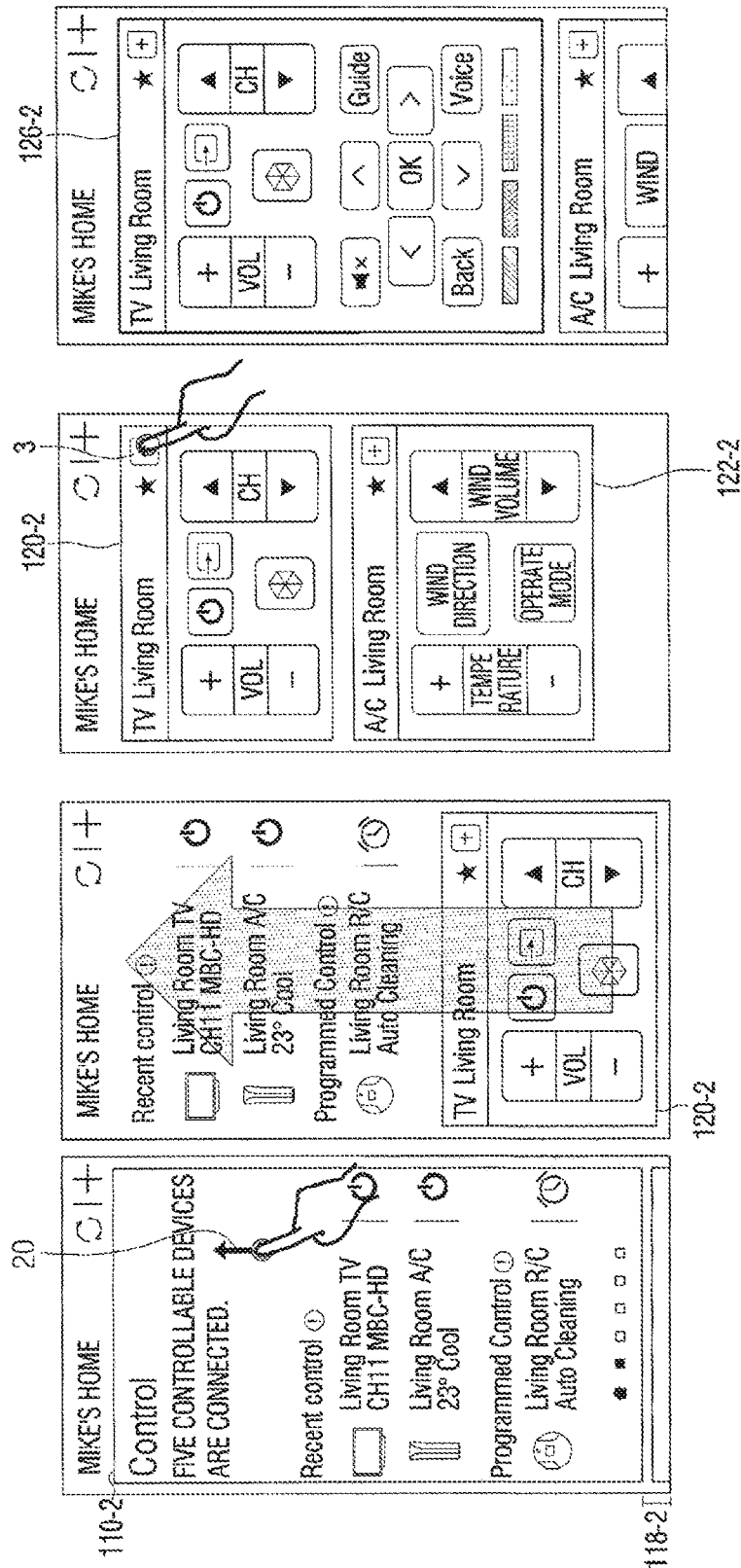
FIGS. 11A, 11B, 11C, 11D, 12A, 12B and 12C illustrate a function area that is included in an example home network management service page according to various non-limiting example embodiments.

For example, if the second user manipulation 20 is input when the first service summary area 110-2 of the first service page 100-2 is displayed as shown in FIG. 11A, the control unit 240 may move and display at least one function area connected to the first service summary area 110-2 onto the first service summary area 110-2 as shown in FIG. 11B. Here, the second user manipulation 20 may be an operation of dragging a cue area 118-2 of a function area of a first service for indicating that at least one of a plurality of function areas 120-2 and 122-2 exists, upwards.

If the cue area 118-2 of the function area of the first service is dragged upwards as shown in FIG. 11D, the plurality of function areas 120-2 and 122-2 of the first service may be sequentially moved onto the first service summary area 110-2 along with the dragging operation. Here, if the enlarge menu icon 3 provided in each of the plurality of function areas 120-2 and 122-2 of the first service is selected, the control unit 240 may enlarge the first function area 120-2 of the corresponding first service into a first detailed function area 126-2 of the first service and display the first detailed function area 126-2 on a front surface of the display unit 220 as shown in FIG. 11D.

Figures 12A, 12B, 12C:
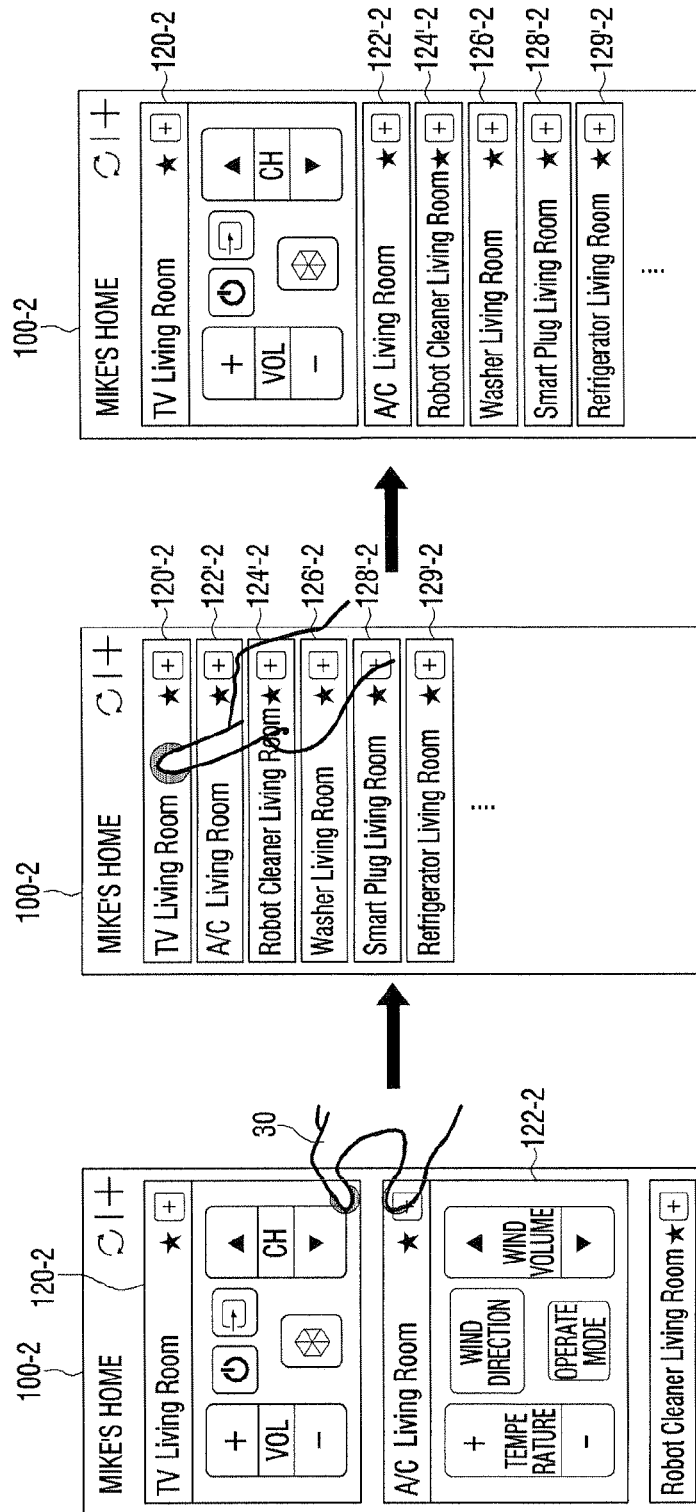

According to another example embodiment, if a pinch gesture 30 is input in a state in which a plurality of function areas 120-2, 122-2, and 124-2 of a first service are displayed as shown in FIG. 12A, the control unit 240 may reduce the plurality of function areas 120-2, 122-2, and 122-3 of the first service to a plurality of corresponding first function area objects 120'-2, 122'-2, 124'-2, 126'-2, 128'-2, and 129'-2 and display the plurality of the corresponding first function area objects 120'-2, 122'-2, 124'-2, 126'-2, 128'-2, and 129'-2 as shown in FIG. 12B. If a method as described above is used, the user may check a plurality of function areas in one view.

Here, if one of the reduced first function area objects is selected as shown in FIG. 12B, the control unit 240 may change the selected first function area object 120'-2 back into the first function area 120-2 of the first service and display the first function area 120-2 as shown in FIG. 12C.

Also, if a new device is added to the home network, the control unit 240 may add at least one of a new service page and a new function area. As described above with reference to FIG. 8, the control unit 240 may generate a new service page or a new function area by using a new UI template.

The user terminal apparatus 200 may be realized in various manners and types of devices to perform a method of managing a home network according to various example embodiments as described above.

Figure 13:
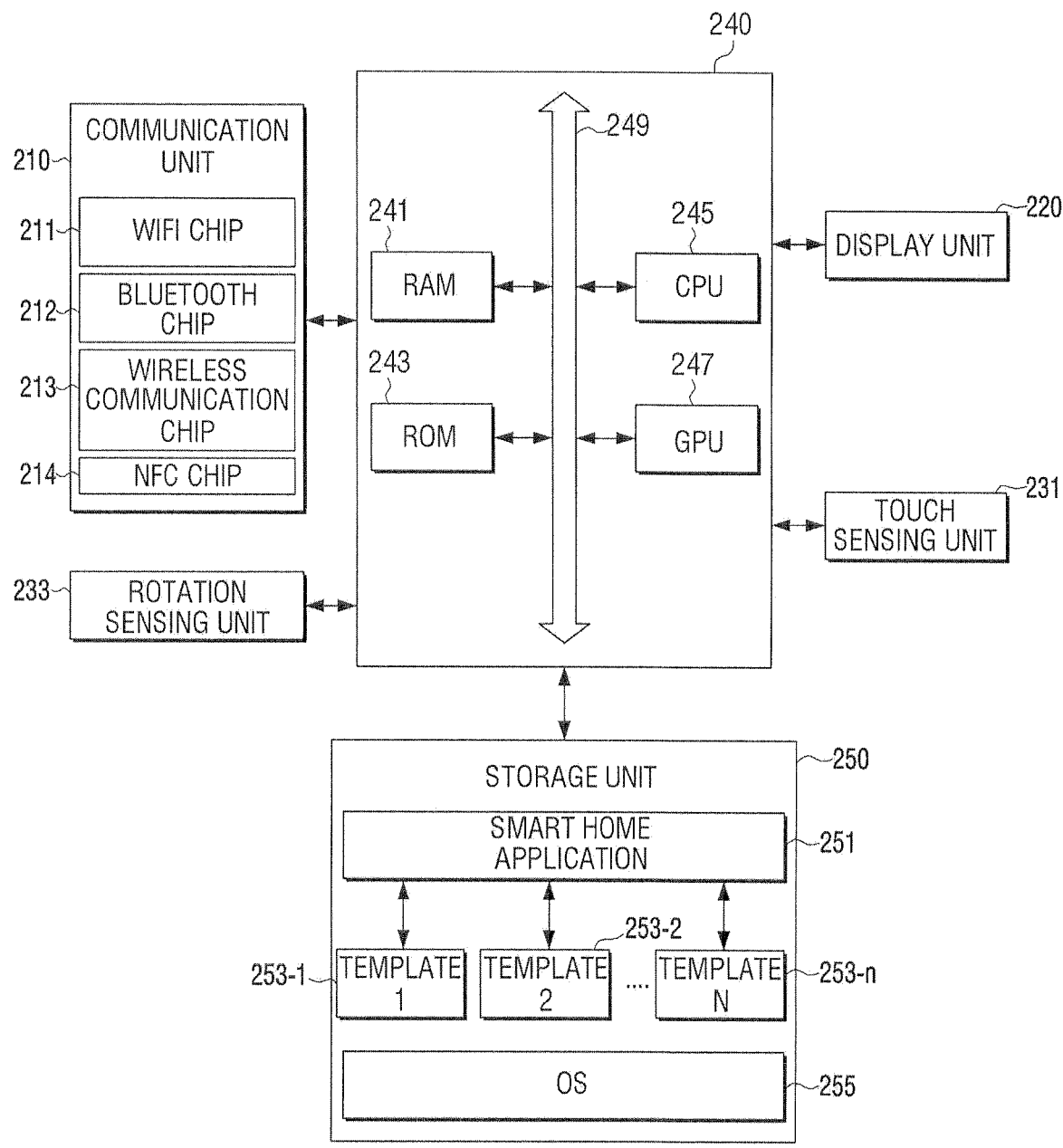
FIG. 13 is a block diagram of a detailed structure of an example user terminal apparatus according to a non-limiting example embodiment.

FIG. 13 is a block diagram of a detailed structure of the user terminal apparatus 200 according to an example embodiment. Referring to FIG. 13, the user terminal apparatus 200 includes a communication unit 210, a display unit 220, a touch sensor 231, a rotation sensor 233, a control unit 240, and a storage unit 250.

The communication unit 210 is an element for communicating with various types of external devices or external servers according to various types of communication methods. The communication unit 220 may include various types of communication chips (or integrated circuits) such as a WiFi chip 211, a Bluetooth chip 212, a wireless communication chip 213, an NFC chip 214, and the like. The WiFi chip 211, the Bluetooth chip 212, and the NFC chip 214 respectively perform communications according to a WiFi method, a Bluetooth method, and an NFC method. The NFC chip 214 refers to a chip that operates in a Near Field Communication (NFC) method using a band of 13.56 MHz among various types of RF-ID frequency bands such as 135 kHz, 13.56 MHz, 433 MHz, 860-960 MHz, 2.45 GHz, etc. If the WiFi chip 211 or the Bluetooth chip 212 is used, the communication unit 210 may transmit and receive various types of connection information such as an SSID, a session key, etc., and connect communications by using the various types of connection information, and transmit and receive various types of information. The wireless communication chip 213 refers to a chip that performs communications according to various types of communication standards such as IEEE, Zigbee, $3^{rd}$ Generation (3G), $3^{rd}$ Generation Partnership Project (3GPP), Long Term Evoloution (LTE), and the like.

In particular, the communication unit 210 is connected to the home network system 500 to receive information about client devices in a home network and/or transmit a control command to the client devices. Also, if a new device is added to the home network, the communication unit 210 may receive meta information about the new device or a new UI template appropriate for the new device.

The user terminal apparatus 200 may communicate with various types of external devices, such the home server 510, the server apparatus 600, etc., through the communication unit 210.

The display unit 220 is one or more displays for displaying a screen including at least one object. Here, the screen refers to an image frame that is provided through the display unit 210 in the user terminal apparatus 200. In detail, a home screen, an icon screen, a list screen, an application execution screen, a web browser screen, a content play screen, etc. may be included in the screen. Also, object icons refer to various shapes that are displayed in the screen like a text, a photo, a widget, etc. In particular, the display unit 220 may display various types of UI screens for managing a home network as described above.

The touch sensor 231 may sense a user manipulation that is performed on the display unit 220. If the user touches the screen with a finger or a pen to perform drawing, the touch sensor 231 may sense a place where the drawing is performed and a trajectory of the drawing. The touch sensor 231 may be realized using various types of touch sensors such as a capacitive type, a decompressive type, a piezoelectric type, and the like. The capacitive type is a method of sensing micro-electricity excited into a body of the user to calculate touch coordinates by using a dielectric coated on a surface of the display unit 220 when a part of the body of the user touches the surface of the display unit 220. The decompressive type is a method of sensing a current flowing due to a contact between upper and lower electrode plates of the display unit 220 at a point of the screen touched by the user to calculate touch coordinates.

The touch sensor 231 may sense a user manipulation that is performed by using an input unit such as a pen, in addition to a finger of the user. If the input unit is a stylus pen including a coil, the touch sensor 231 may include a magnetic field sensor that may sense a magnetic field changed by the coil of the stylus pen. Therefore, the touch sensor 231 may sense a touch manipulation and a proximity manipulation, i.e., hovering.

If a user manipulation is sensed, the touch sensor 231 provides the control unit 240 with the sensing result. For example, if the user touches a point of the screen with the finger or the pen, the touch sensor 231 provides the control unit 240 with x, y coordinate values of the touch point. If the user moves the touch point when touching the screen, the touch sensor 231 provides the control unit 240 with touch coordinate values, which are changing, in real time. As described above, the touch sensor 231 may sense a close approach rather than a direct touch.

The rotation sensor 230 senses aspects of a rotation state, a movement direction, orientation, and the like of the user terminal apparatus 200. A geomagnetic sensor, an acceleration sensor, a gyro sensor, and/or the like may be used as a sensor for sensing the rotation state, the movement direction and/or the orientation. The acceleration sensor outputs a sensing value corresponding to acceleration changing according to an orientation of an apparatus or device to which the acceleration sensor is attached. The gyro sensor is a sensor that, if a rotation motion occurs, measures a Coriolis force acting in a speed direction of the rotation motion to sense an angular speed. The geomagnetic sensor is a sensor for sensing an azimuth angle. If the rotation sensor 230 senses the rotation state of the user terminal apparatus 200, the control unit 240 may differently display a layout of the main page 100-1 according to the rotation state as described above with reference to FIG. 10.

The storage unit 250 may store an O/S 255 or programs such as various types of applications and various types of data such as user setting data, data generated in a process of executing an application, a multimedia content, etc. In particular, the storage unit 250 may store an application 251 for managing a home network. In FIG. 13, the application 251 is referred to as a smart home application. If the smart home application is selected by the user or automatically executed according to a default setting value, the control unit 240 generates a UI screen as described in the above-described various example embodiments and displays the UI screen on the display unit 220. The storage unit 240 may also store a plurality of templates 253-1, 253-2, . . . , and 253-n. A template refers to data that defines a layout, a text, a menu, an icon, or the like for expressing a service page or a function area as described above.

The control unit 240 may generate various types of UI screens as described above by using the plurality of templates 253-1, 253-2, . . . , and 253-n. For example, if a new device is connected to the home network system 500, the control unit 240 may determine a new service that may be provided by the new device. If the new service is determined, the control unit 240 may generate a new service page UI corresponding to the new device by using the template 1 and generate a new function UI by using the template 2. This is described in detail with reference to FIGS. 7 and 8, and thus a repeated description is omitted.

The storage unit 250 may also store a template that is updated in the home server 510 or the server apparatus 600. In detail, the control unit 240 may store a new template in the storage unit 250 or delete an existing template from the storage unit 250 by using received information so as to efficiently manage a storage space of the storage unit 250.

The control unit 240 displays various types of UI screens for managing the home network on the display unit 220 by using the programs and the data stored in the storage unit 250.

The control unit 240 includes a RAM 241, a ROM 243, a CPU 245, a Graphic Processing Unit (GPU) 247, and a bus 249. The RAM 241, the ROM 243, the CPU 245, and the Graphic Processing Unit (GPU) 247, and the like may be connected to one another through the bus 249.

The CPU 245 accesses the storage unit 250 to perform booting up by using the O/S 255 stored in the storage unit 250. Also, various operations are performed by using the smart home application 251, the plurality of templates 253-1, 253-2, . . . , and 253-*n*, and the like stored in the storage unit 250.

The ROM 243 stores a command set and the like for booting up a system. If a turn-on command is input to supply power, the CPU 245 copies the O/S 255 stored in the storage unit 250 into the RAM 241 and executes the O/S 255 to boot the system according to a command stored in the ROM 243. If the booting up is completed, the CPU 245 copies various types of programs stored in the storage unit 250 into the RAM 241 and executes the programs copied into the RAM 241 to perform various types of operations.

If booting up of the user terminal apparatus 200 is completed, the GPU 247 displays a UI screen. In detail, the GPU 247 may generate a screen including various types of objects such as an icon, an image, a text, and the like by using an operator (not shown) and a renderer (not shown). The operator calculates attribute values, such as a coordinate values, shapes, sizes, colors, and/or the like, at which the objects are to be respectively displayed according to a layout of the screen. The renderer generates a screen having various layouts including objects based on the attribute values calculated by the operator. The screen generated by the renderer is provided to the display unit 220 to be displayed.

Besides this, although not shown in FIG. 13, according to example embodiments, the user terminal apparatus 200 may further include various types of external input ports for connections to various types of external terminals such as a USB port into which a USB connector may be connected, a headset, a mouse, an LAN, etc., a DMB chip for receiving and processing a Digital Multimedia Broadcasting (DMB) signal, various types of sensors, etc.

As described above, the user terminal apparatus 200 may be realized in various shapes and structures. The control unit 240 of the user terminal apparatus 200 may display a UI screen for managing various types of home networks according to various example embodiments.

A UI screen for managing a home network according to various example embodiments will now be described in detail with reference to the drawings.

<Main Page 100-1>

Figures 14A, 14B, 14C:
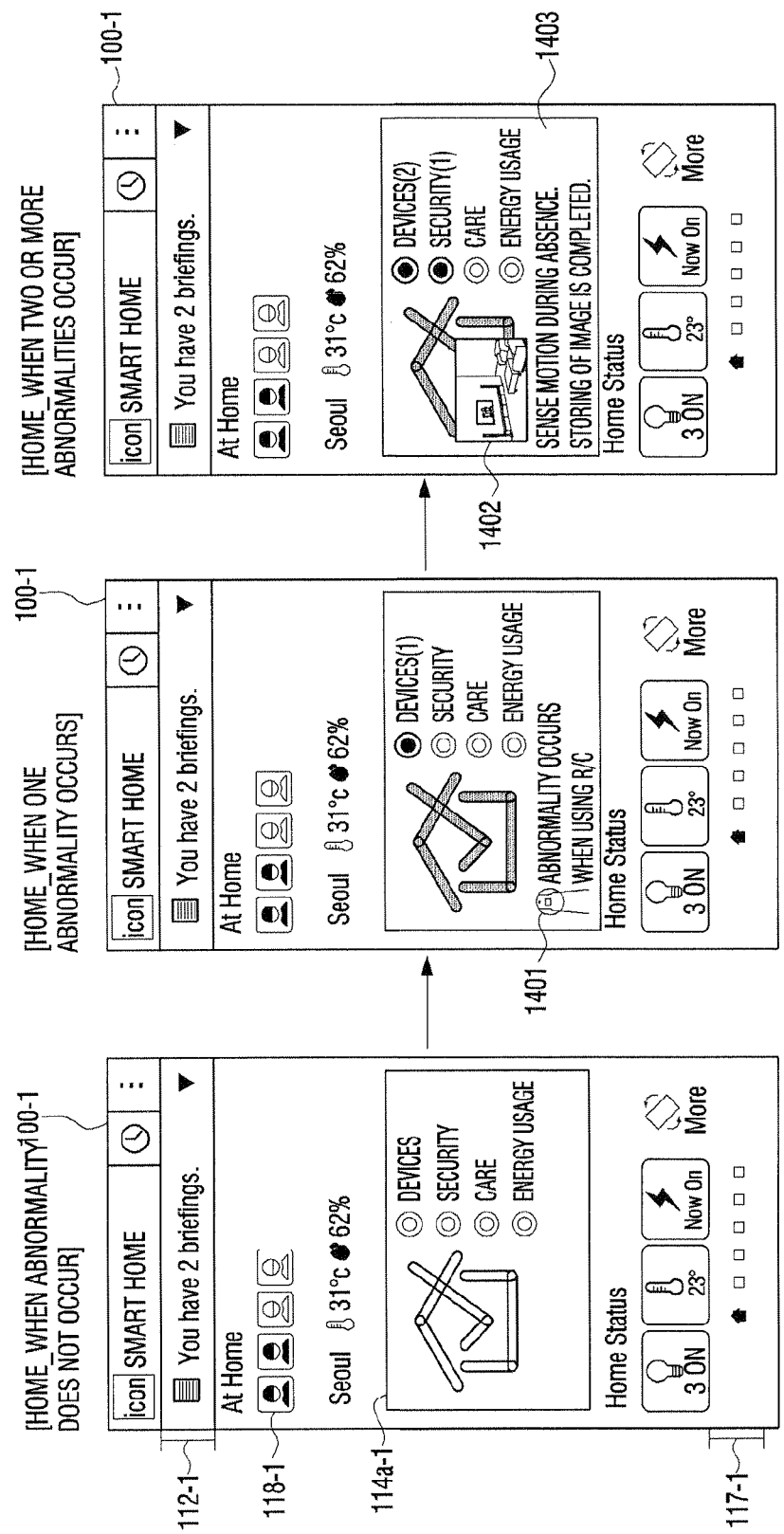
FIGS. 14A, 14B, 14C, 15A, 15B, 16 and 17 illustrate an example main page according to various non-limiting example embodiments.

FIGS. 14A-14C illustrate the main page 100-1 according to an example embodiment.

The main page 100-1 is an initial page that is provided from a home network management service and may include environment information, such as an overall home network situation, time, weather, etc., external traffic situations, etc.

For example, referring to FIGS. 14A through 14C, the main page 100-1 may include a briefing area 112-1 that provides various types of notifications of a home network management, a family user current state area 118-1 that displays whether each family member is at home or out, an area 114*a*-1 that provides notifications of abnormal situations occurring in a home such as a device abnormality occurrence, a security problem occurrence, an excessive energy usage, and the like, an indicator 117-1 for immediately moving onto a next service page, and the like.

If an abnormality occurs in a robot cleaner (R/C) that is a device as shown in FIG. 14B as an example of a display state of the main page 100-1, the control unit 240 may display an error message 1401 that includes a robot cleaner icon and an abnormality situation in the area 114*a*-1 that provides a notification of the abnormality situation. As another example, if a security problem and a device abnormality problem occur together, the control unit 240 may display an image 1401 captured from an intruder in the area 114*a*-1 providing a notification of an abnormality situation and alternately display a message 1403 such as "Sense Motion During Absence. Storing of Image is Completed" and "Abnormality occurs when using R/C" every n seconds.

Figures 15A, 15B:
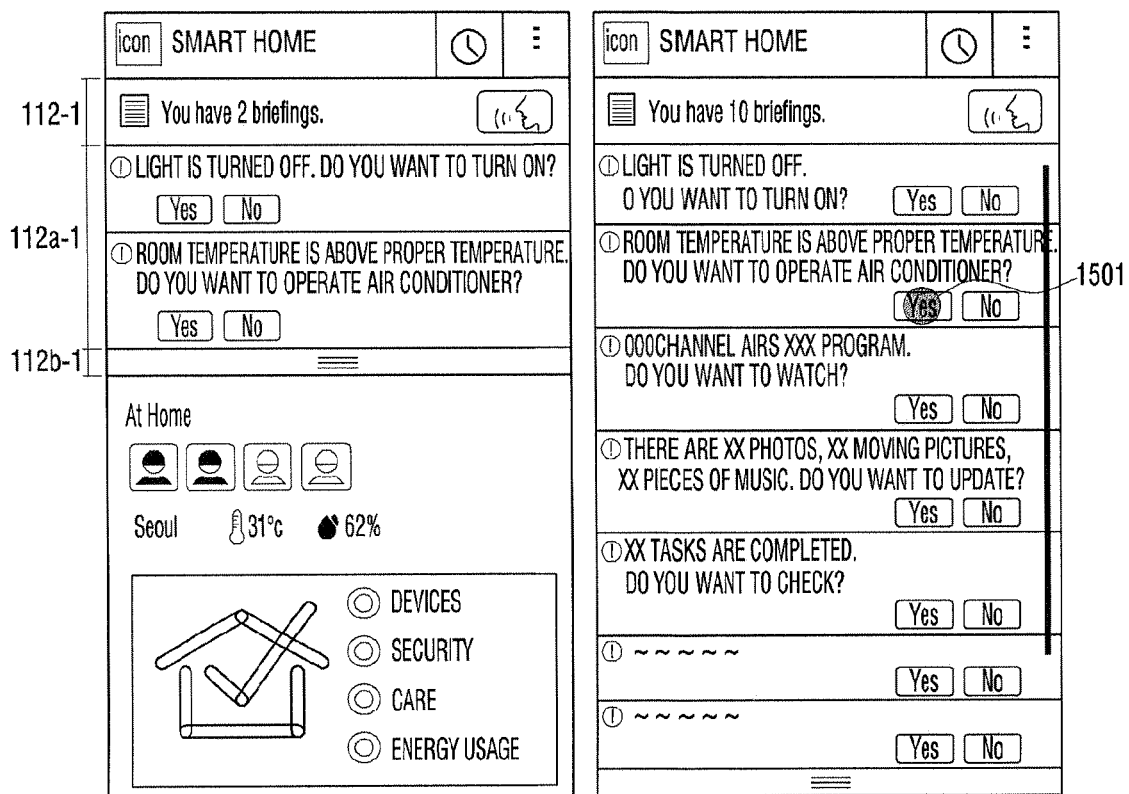

FIGS. 15A and 15B illustrate a briefing area of a main page according to an example embodiment.

Referring to FIG. 15A, if a briefing area 112-1 of the main page 100-1 is selected, a briefing list 112*a*-1 is displayed under the briefing area 112-1. If a briefing close bar 112*b*-1 is dragged upwards, the briefing list 112*a*-1 is closed. Even if the briefing list 112*a*-1 is long, the briefing list 112*a*-1 may be displayed on a front surface of the display unit 220 as shown in FIG. 15B. In this case, the briefing list 112*a*-1 may be scrolled up and down.

As shown in FIGS. 15A and 15B, the briefing list provides a menu of various types of notification messages and user selections such as a device control, a channel notification, an update notification, a job performance notification, etc. For example, as shown in FIG. 15B, if an air conditioner operating selection 1501 is input in the briefing list 112*a*-1, an air conditioner may be controlled to be turned on. If any selection of the briefing list 112*a*-1 is not input for a preset time, the briefing list 112*a*-1 may be automatically closed.

Figure 16:
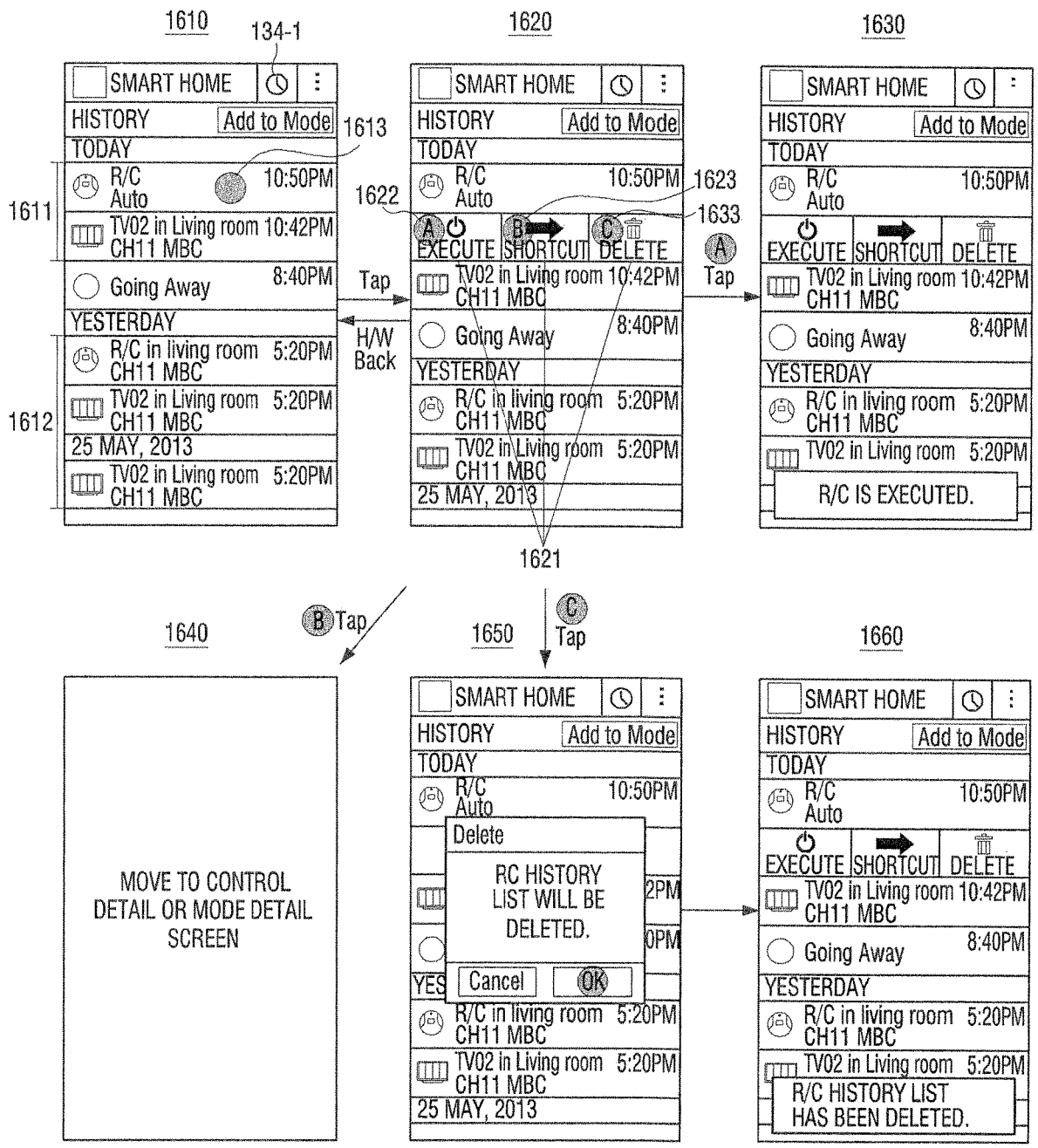
Figure 17:
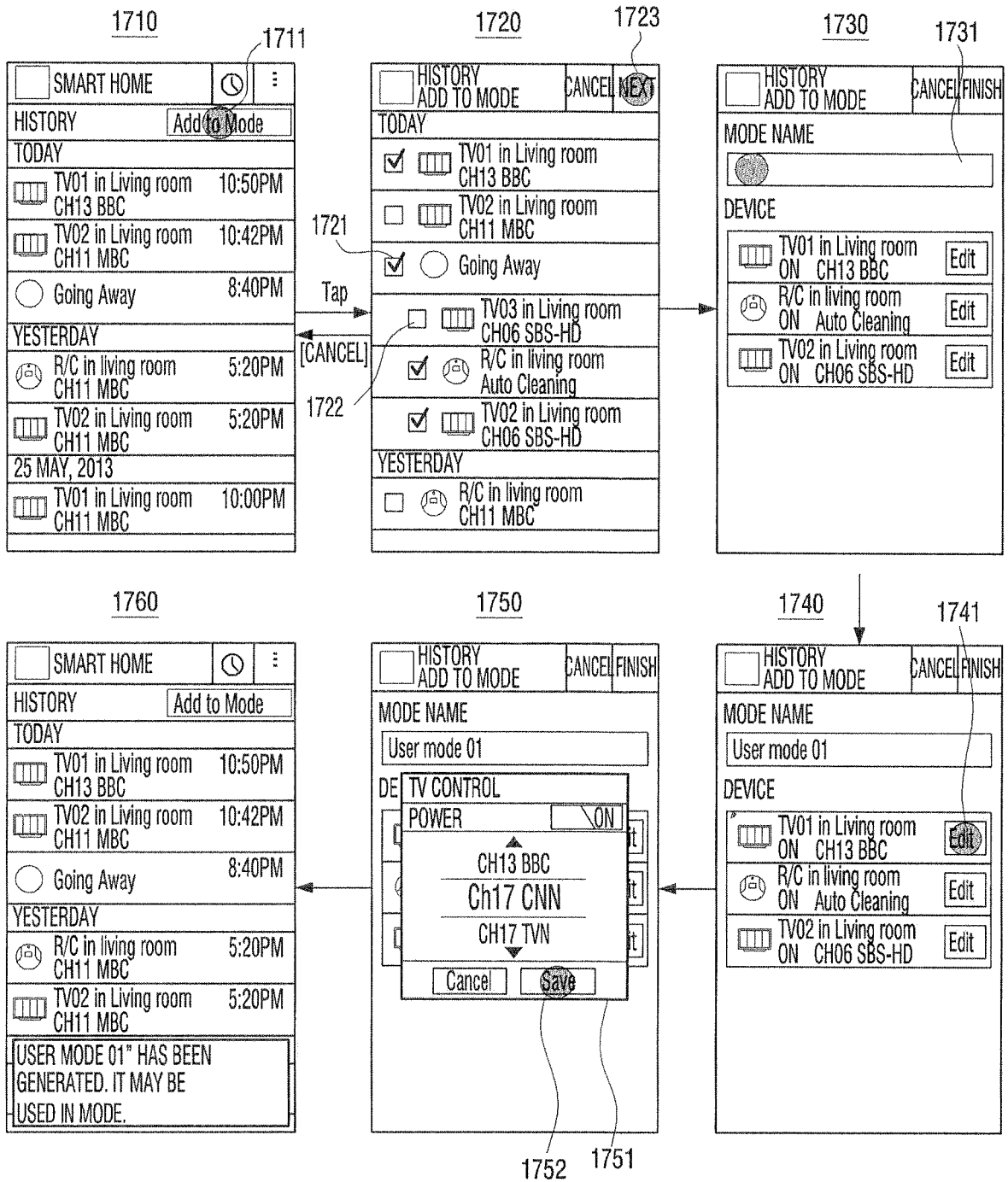

FIGS. 16 and 17 illustrate an output of a history screen on a main page according to an example embodiment.

Referring to FIG. 16, if a history button 134-1 of the main page 100-1 is selected, the control unit 240 displays a history screen 1610 on which a list of use logs of all devices of a home network is arranged according to date. The history screen 1610 may be divided into various areas such as a display area 1611 displaying a device having a history of being used on the same day (i.e., today) and a display area 1612 displaying a device having a history of being used on another day (e.g., yesterday).

A user may select an object that the user wants to control on the history screen 1610. As shown on 1610 of FIG. 16, if a robot cleaner that has a history of being used today is selected (1613), the control unit 240 additionally displays (1620) various menu options 1621 within the screen 1610. Here, if an execution menu option 1622 is selected, the robot cleaner may be controlled to be turned on. In this case, the robot cleaner may be executed in an auto mode that is used today (1630).

If the user selects a shortcut menu option 1623 on the history screen 1610, a control service page or a detailed function control area provided on all service pages may be displayed for the robot cleaner (1640). The detailed function area may provide various menus for controlling a corresponding device. The detailed function area will be described in more detail later.

If the user selects a delete menu option 1633 on the history screen 1610, a corresponding history list is deleted (1650). After deleting, a message for indicating that the history list is deleted may be displayed at a bottom of the history screen (1660).

A case where the history button 134-1 is selected on the main page 100-1 is described with reference to FIG. 17.

Referring to FIG. 17, if an Add to Mode button 1711 is selected on a history screen 1710, the control unit 240 displays a screen 1720 for selecting a device that is to be included in a mode that is to be newly generated. The user may check a box provided beside a device icon of the screen 1720 to select a device that is to be included in a mode. If a preset "Going Away" mode is selected (1721), devices that are included in the mode so as to be controlled are all displayed in a checked state. Here, the user may cancel the check (1722). If a selection of a device to be included in a mode to be newly added is selected, the user may select a next button 1723. Thereafter, a screen 1730 for inputting a name of the new mode may be displayed, and the user may input a desired mode name into a mode name input box 1731. Also, the user may select an edit menu provided for each device to change a device state setting when executing a mode. For example, as shown with 1740 of FIG. 17, if the edit menu 1741 for a TV01 is selected (1741), the control unit 240 may display an edit window 1751 in a middle of the display unit 220 (1750). If the user changes and stores settings for the TV01 through the edit window 1751 (1752), a message indicating that a mode is completely added may be displayed at bottom of a screen (1760).

"User mode 01" set as described above may be checked on a mode service page that will be described later. In detail, in an environment where a newly generated "User mode 01" is executed, TV01 located in a living room is turned on to CH15, an automatic cleaning function of a robot cleaner (R/C) located in the living room is executed, and TV02 located in the living room is turned on to CH15. In other words, controls of all these devices may be simultaneously performed with an execution of "User mode 01". A mode service as described above will be described in more detail later with reference to FIGS. 26 through 34.

The user may be provided with overall information about a home network through the main page 100-1 described above and may execute functions provided on each service page without entering each service page. The first service page 100-2 among a plurality of pages connected to the main page 100-1 in a first direction will now be described.

<First Service Page 100-2-Monitoring>

Among a plurality of service pages, the first service page 100-2, which provides a monitoring service by using a photographing apparatus of a plurality of devices included in a home network, will now be described. Hereinafter, a first service will be referred to as a monitoring service.

Figure 18:
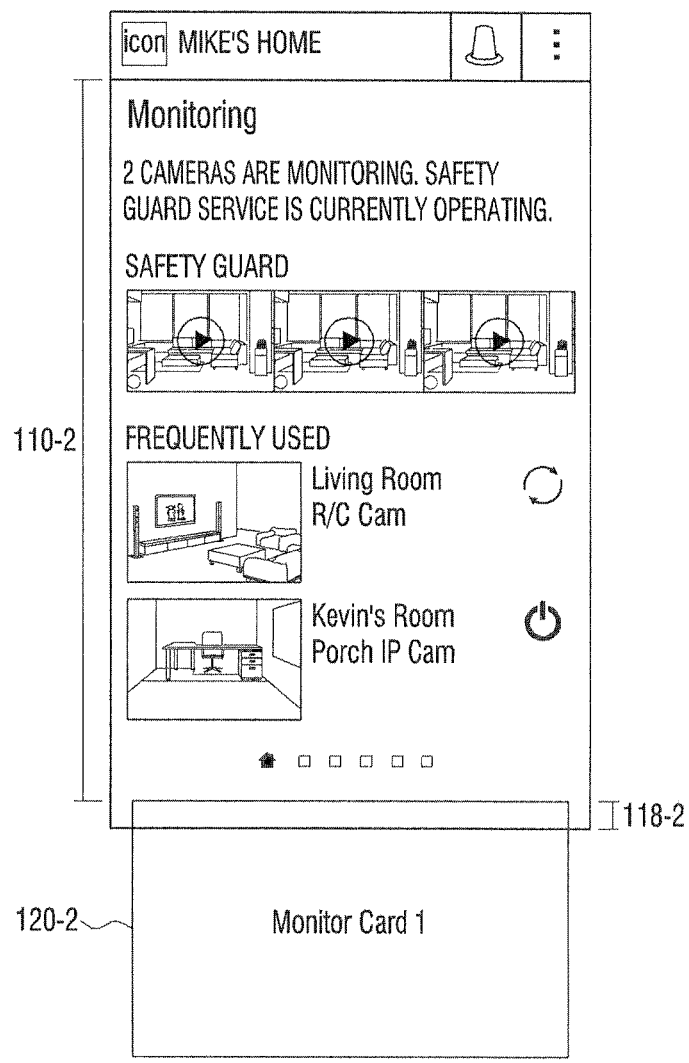
FIGS. 18, 19, 20, 21, 22, 23, 24 and 25 illustrate an example first service page according to various non-limiting example embodiments.

FIG. 18 illustrates a monitoring service page 100-2 according to an example embodiment.

Referring to FIG. 18, messages having different contents may be provided at an upper end of a monitoring service summary area 110-2 of the monitoring service page 100-2 according to current monitoring states. For example, information about the number of monitoring cameras that are currently operating, positions of the monitoring cameras, a name of a room where an intruder is sensed, or the like may be displayed in message form at the upper end of the monitoring service summary area 110-2.

According to an example embodiment, the monitoring service page 100-2 may provide an intruder sensing service. Hereinafter, this function will be referred to as a safety guard service. If a moving object is sensed or an outer forceful intrusion is sensed in the absence of a user, the safety guard service may provide an automatic recording service through a camera installed at a sensed position. This will be described in more detail later with reference to FIG. 19.

Also, a lower end of the monitoring service summary area 110-2 includes an area that displays information about a frequently used camera(s). This will be described in more detail later with reference to FIG. 20.

Figure 19:
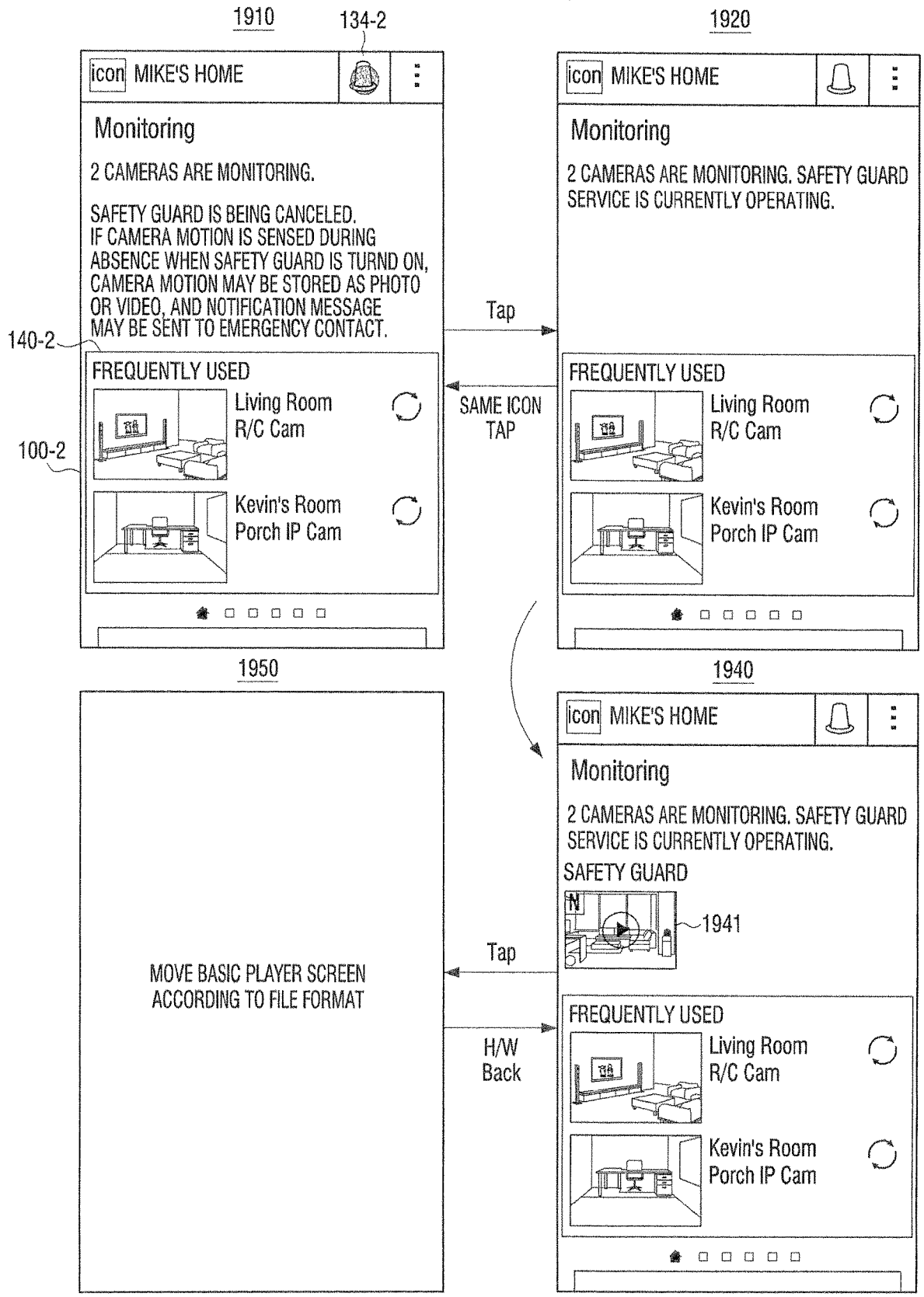

The monitoring service page 100-2 also includes a first function area 120-2 of a monitoring service connected to the lower end of the monitoring service summary area 110-2. When the monitoring service summary area 110-2 is displayed on the front surface of the display unit 220, only a cue area 118-2 of a function area of the monitoring service, which indicates that the function area exists below, is displayed on the display unit 220 as shown in FIG. 19. The first function area 120-2 of the monitoring service may be displayed above the monitoring service summary area 110-2 according to a user manipulation for dragging the cue area 118-2 of the function area of the monitoring onto the monitoring service summary area 110-2. In this case, if other function areas exist under the first function area 120-2 of the monitoring service, the other function areas may be moved upwards together with the first function area 120-2 of the monitoring service.

A function area of the monitoring service may provide data captured by a device included in the home network. For example, a play menu of data, which is captured and stored by a CCTV installed in a room, may be provided in other function areas of respective rooms, and real-time captured data may be provided. In this case, menus for image recording and screen capturing may be provided in the function area.

Also, the function area may provide a menu for controlling a capturing direction of the CCTV and a menu for controlling a movement of a device that is a moveable device (e.g., a robot cleaner with a camera).

The safety guard function will now be described as an example of a service provided in a service summary area of a monitoring service in more detail with reference to FIG. 19.

Referring to FIG. 19, if the user selects a button 134-2 for executing the safety guard function when the safety guard function is currently canceled, a message displayed at an upper end of a monitoring service summary area may be changed. For example, as shown with 1920 of FIG. 19, a message for indicating that the safety guard service is operating may be displayed at the top. If a monitoring camera senses a motion in the absence of the user, the corresponding camera may perform automatic recording or automatic capturing, and a captured picture or a recorded video may be stored to be displayed at the upper end of the monitoring service page 100-2 (1940). If the user selects a recorded video or a capture screen 1941 displayed at the upper end of the monitoring service page 100-2, the control unit 240 changes a screen into a player screen according to a file format thereof (1950).

Referring to 1910 of FIG. 19, the monitoring service page 100-2 may include a frequently used area 140-2 that displays a frequently used monitoring camera(s).

Figure 20:
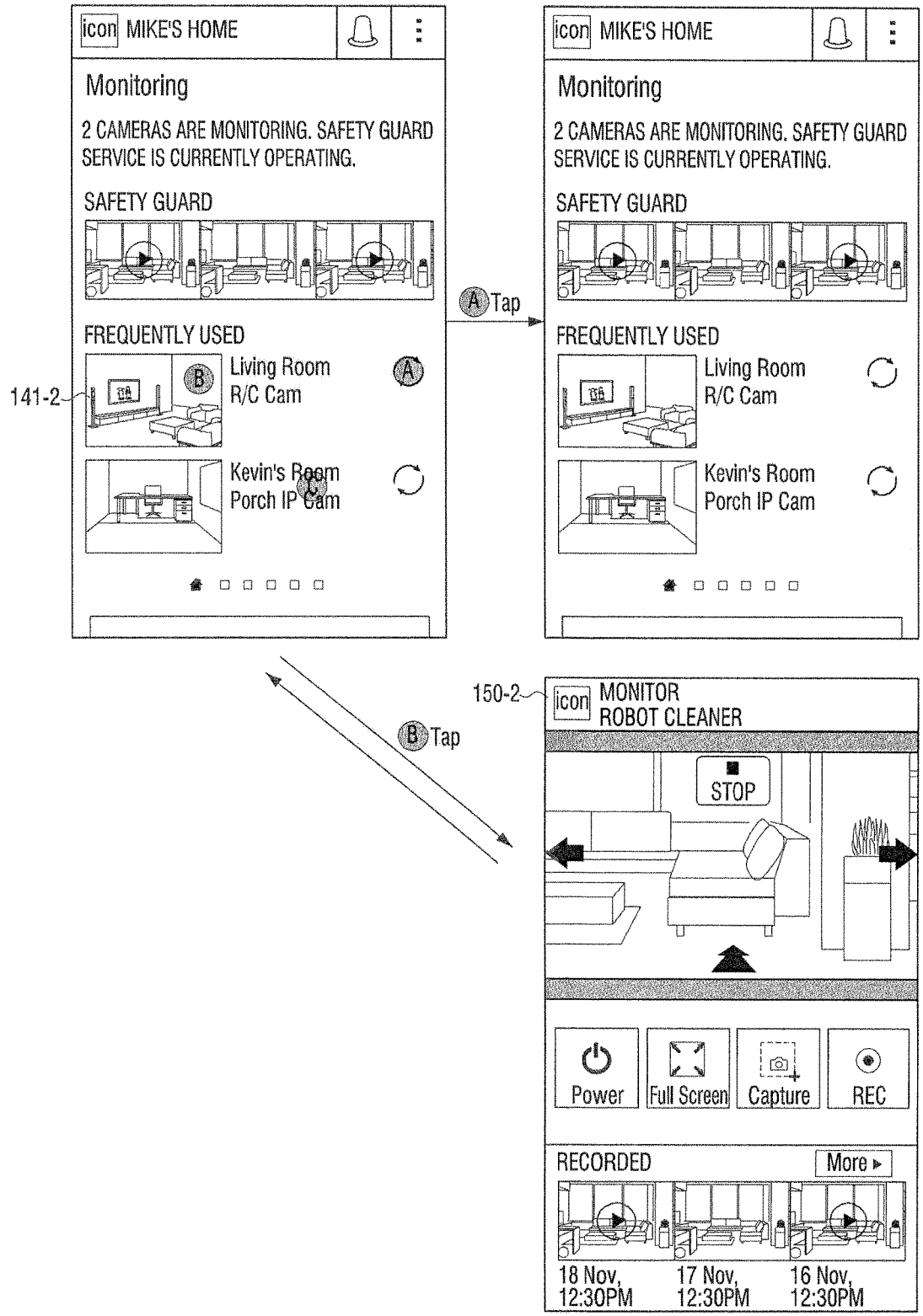

Referring to FIG. 20, if a living room screen 141-2 is selected in the frequently used area 140-2, the living room screen 141-2 may be changed into a detailed monitoring screen 150-2 of a living room and then displayed.

Alternatively, the detailed monitoring screen 150-2 may be immediately changed and displayed in a function area. For example, referring to FIG. 21, if an enlarge menu icon 3 of the first function area 120-2 of the monitoring service is selected among a plurality of function areas of the monitoring service page 100-2, the detailed monitoring screen 150-2 may be displayed on the front surface of the display unit 220.

Figure 21:
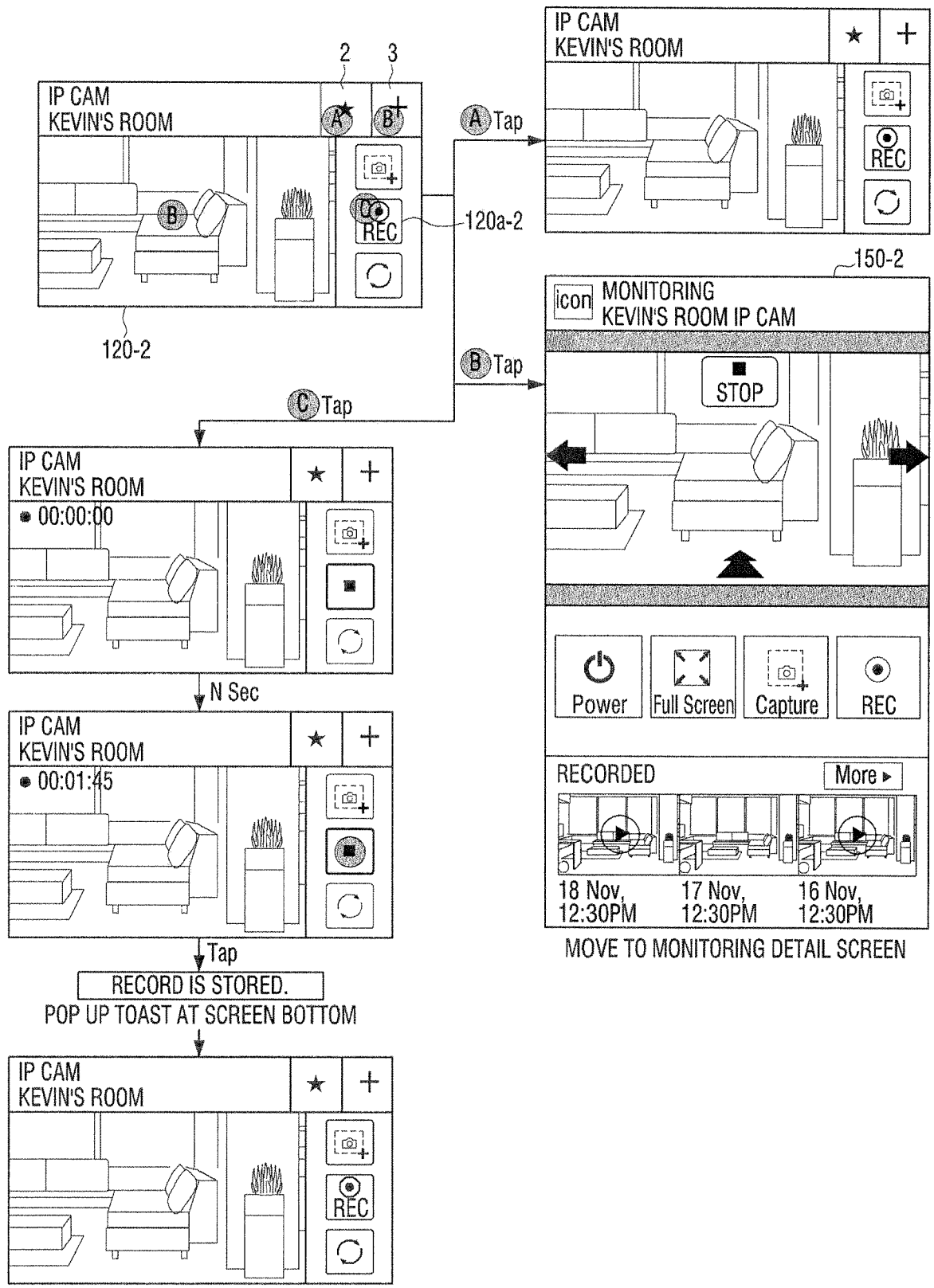

As another example, referring to FIG. 21, if a bookmark menu icon 2 is selected in the first function area 120-2 of the monitoring service, the first function area 120-2 of the monitoring service may be registered in a favorite function area of the main page 100-1. In a method as described above, a function area frequently used by the user may be included in the main page 100-1, and thus the user may easily look for the function area frequently used by the user on the main page 100-1 without accessing an individual service page.

As another example, if a recording button 120*a*-2 is selected in the first function area 120-2 of the monitoring service, a recording function may be performed as shown in FIG. 21.

Figure 22:
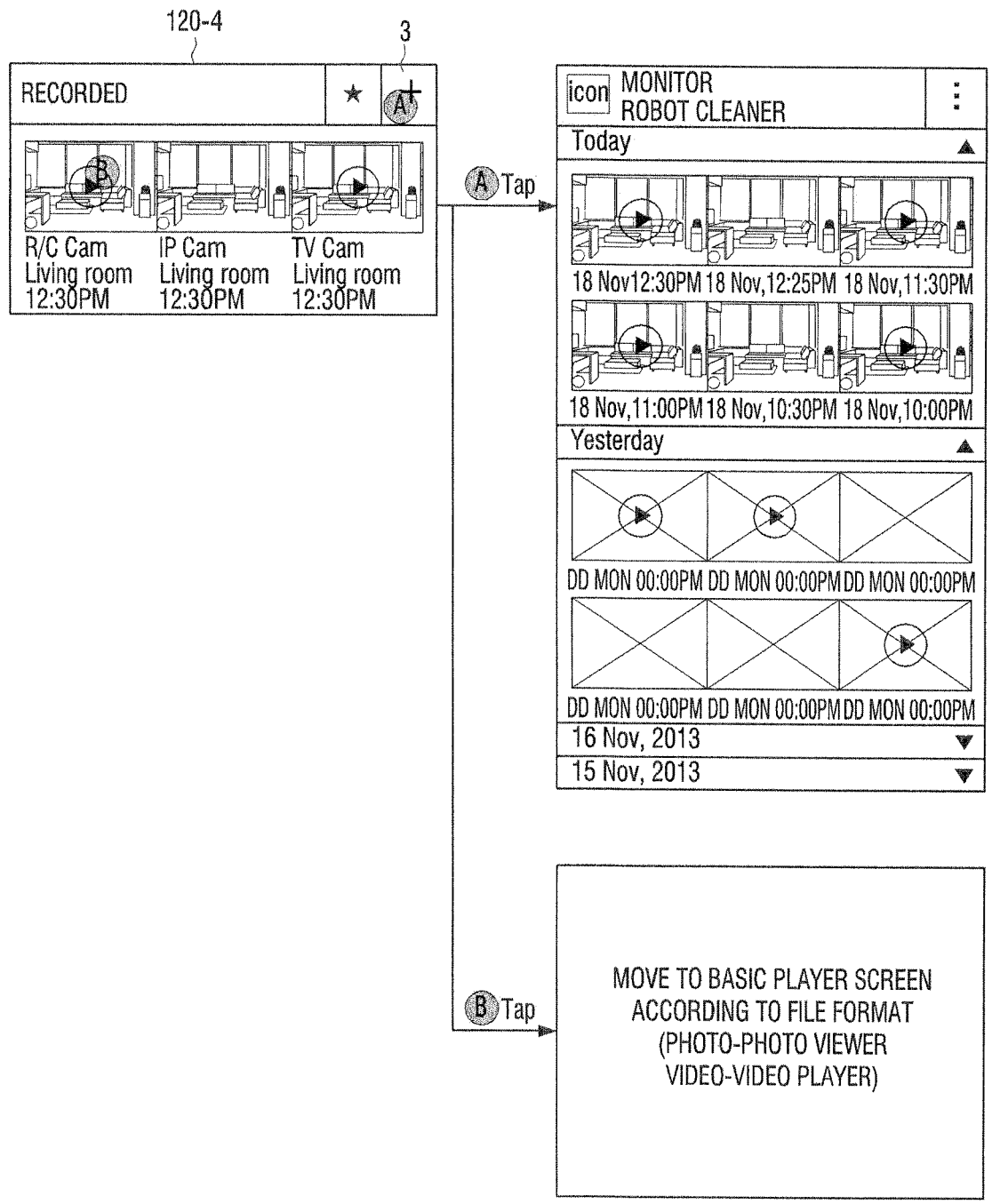

FIG. 22 illustrates another function area of the monitoring service page 100-2. Here, a second function area 120-4 of the monitoring service may provide a recorded file. If an enlarge menu icon 3 of the second function area 120-4 of the monitoring service is selected, the second function area is enlarged and displayed as a detailed function area displaying a list of recorded files arranged in time order. If one of the recorded files is selected, a player screen may be displayed in a file form.

Figure 23:
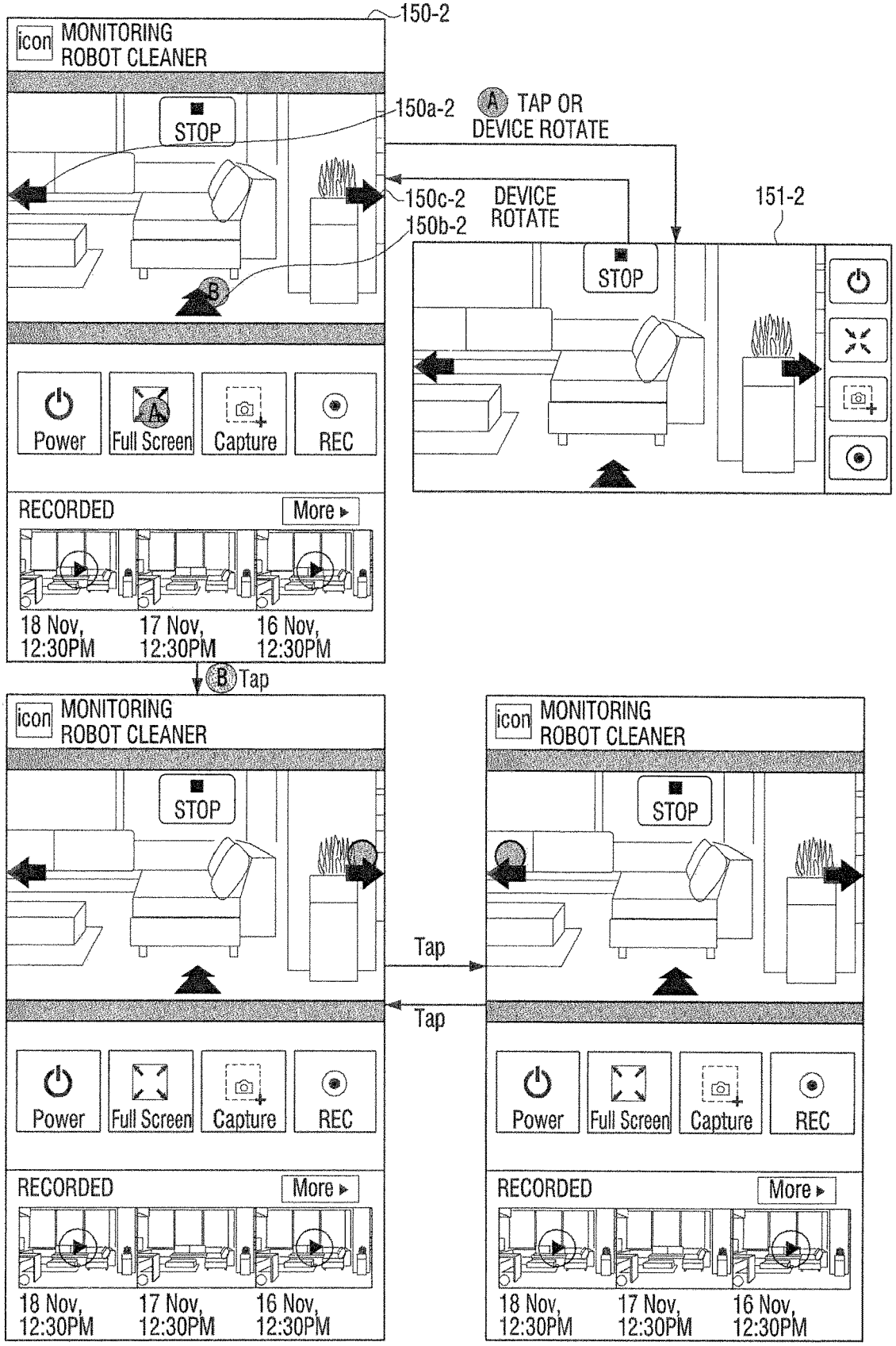

Returning to the display of the detailed monitoring screen 150-2, referring to FIG. 23, if a rotation of the user terminal apparatus 200 is sensed, the detailed monitoring screen 150-2 may occupy the front surface of the display unit 220 to be displayed in a horizontal direction. If one of a plurality of direction keys 150*a*-2, 150*b*-2, and 150*c*-2 is selected on the detailed monitoring screen 150-2, a camera may be moved in a selected direction.

Figure 24:
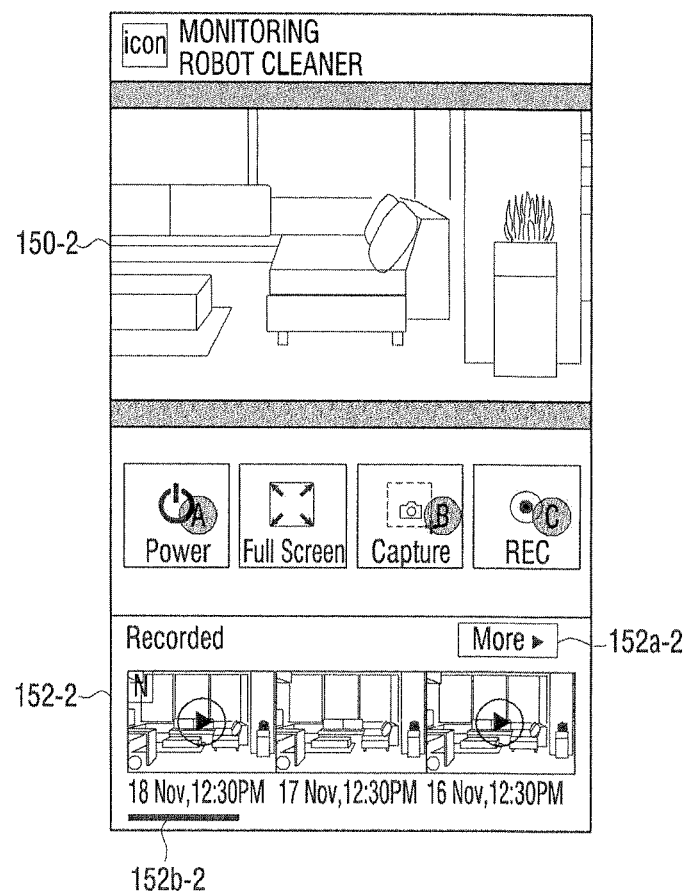

FIG. 24 illustrates a detailed function of the detailed monitoring screen 150-2. As shown in FIG. 24, if a power button A is selected, a command for turning off monitoring is transmitted to a client device, in this case, to a robot cleaner. If a capture button B is selected, a screen that is currently monitored is captured, and the captured screen is added into a recorded file list area 152-2 at a bottom. If a recording button C is selected, recording starts. If recording is completed, a recorded file is added into the recorded file list area 152-2. A scroll bar 152*b*-2 provided in the recorded file list area 152-2 may be moved to check many more recorded files. If a more button 152*a*-2 is selected, a detailed recorded file list screen is output.

Figure 25:
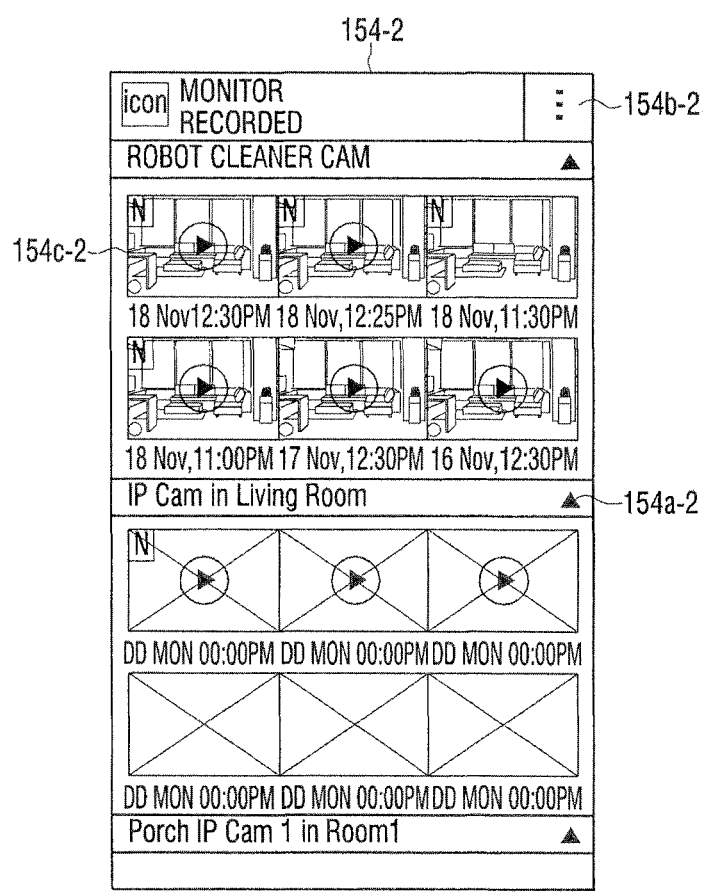

The detailed recorded file list screen 154-2 will be described with reference to FIG. 25. If a fold button 154*a*-2 is selected, an area "IP Cam in Living Room" is closed, and recorded files of an area "Porch IP Cam 1 in Room 1" may come up to be displayed. If a menu button 154*b*-2 is selected, refresh, sort by, and delete menu icons may be displayed in a pop-up window. The user may select the sort by menu icon to sort recorded files according to dates or device names. If the delete menu icon is selected, a check box may be generated in an area of a recorded file icon 154*c*-2, and the user may select the check box corresponding to a recorded file to be deleted and then select a complete button (not shown) to delete a file.

Through the user terminal apparatus 200 providing the monitoring service page as described above, the user may check a situation of a home even from the outside and check an immediate notification provided to the user terminal apparatus 200 to effectively cope with an internal intruder.

<Second Service Page 100-3-Mode>

Hereinafter, among a plurality of service pages, a second service page for differently controlling a plurality of devices included in a home network according to home network modes will be described. Hereinafter, a second service will be referred to as a mode service.

In the mode service, the user may directly select a plurality of modes and select a mode set by the user to control the plurality of devices of the home network. For example, if a particular mode is executed, a plurality of devices associated with the particular mode may be simultaneously turned on. If set values are differently set according to devices when setting a mode, the devices may operate according to the set values when executing the mode. An operation depending on an execution of a mode will be described in more detail according to detailed example embodiments.

According to an example embodiment, a smart home application stored in the storage unit 250 may provide a plurality of modes by default, and examples of default modes may include "Going Away", "Coming Home", "Sleep", "Vacation", etc. Besides the modes provided by default, the user may add one or more new modes.

Figure 26:
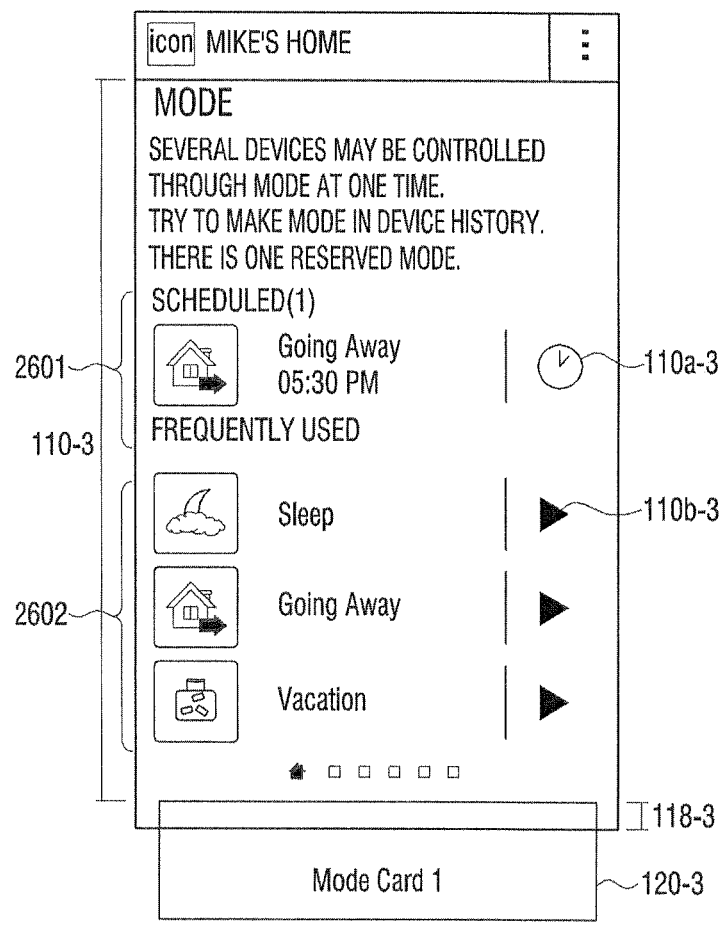

FIG. 26 illustrates a mode service page 100-3 according to an example embodiment.

Referring to FIG. 26, a mode service summary area 110-3 of the mode service page 100-3 may include a scheduled mode area 2601 and a frequently used mode area 2602. If a schedule check button 110*a*-3 is selected in the scheduled mode area 2601, the control unit 240 may display a schedule check pop-up on the display unit 220. If a mode execute button 110*b*-3 is selected, the control unit 240 may perform an execution of a corresponding mode. This will now be described in more detail with reference to FIG. 27.

The mode service page 100-3 includes a first function area 120-3 of a mode service connected to a lower end of a mode service summary area 110-3. When the mode service summary area 110-3 is displayed on the front surface of the display unit 220, only a cue area 118-3 of a function area of the mode service for indicating that a function area exists below is displayed on the display unit 220 as shown in FIG. 26. The first function area 120-3 of the mode service is displayed above the mode service summary area 110-3 according to a user manipulation for dragging the cue area 118-3 of the function area of the mode service into the mode service summary area 110-3. In this case, if other function areas exist under the first function area 120-3 of the mode service, the other function areas are also moved upward together with the first function area 120-3 of the mode service.

Figure 27:
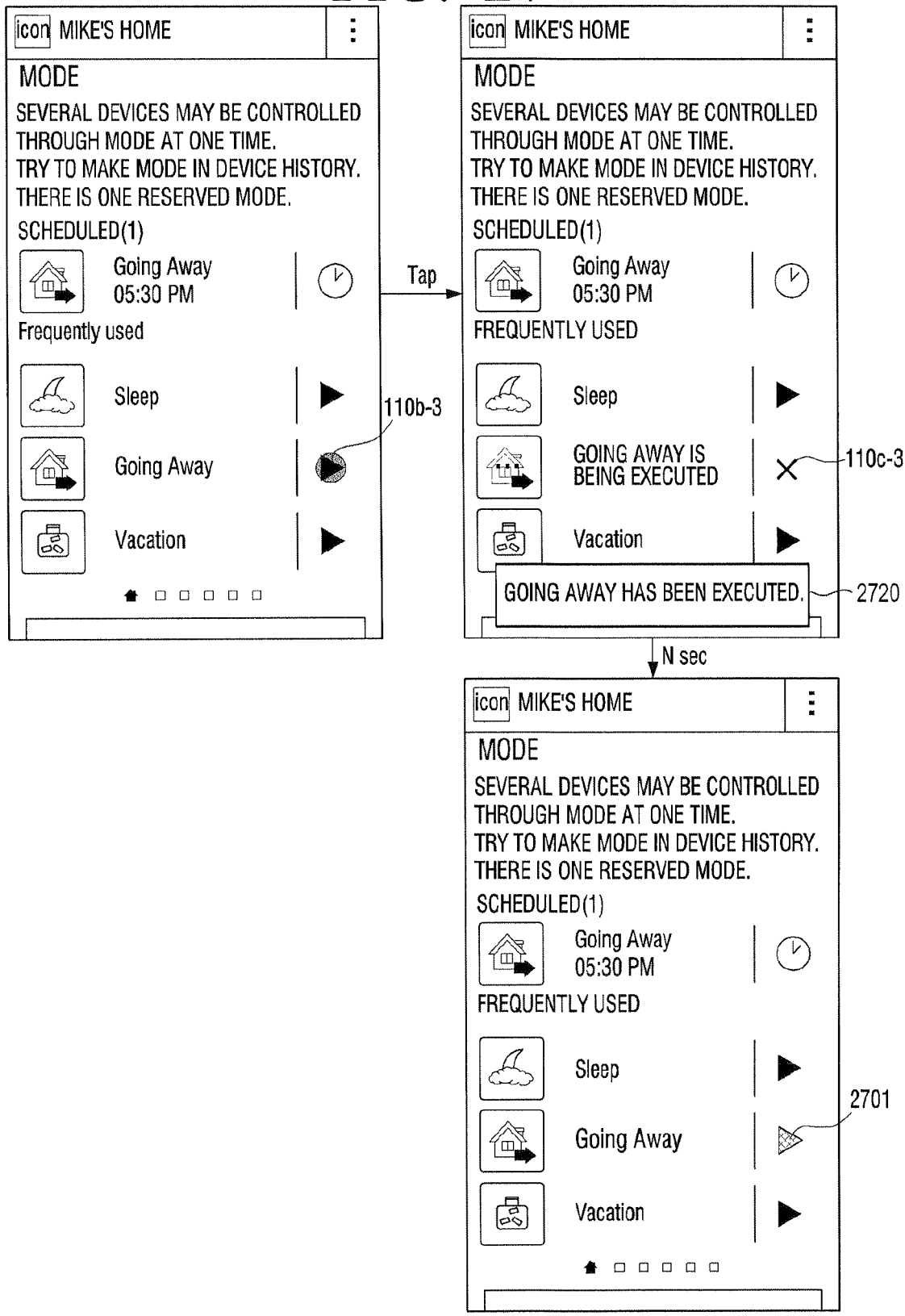

FIG. 27 illustrates a UI for executing a mode provided by the user terminal apparatus 200 according to an example embodiment.

Referring to FIG. 27, for example, if the user selects a "Going Away" mode execute button 110*b*-3 in the mode service summary area 110-3 of the mode service page 100-3, a message for indicating that "Going Away" mode is executed may be displayed at a lower end of the mode service summary area 110-3 (2720). In this case, a selected mode is not immediately executed, and a mode execute cancel button 110c-3 is displayed for a preset time. If the mode execute cancel button 110c-3 is not selected from a preset time N sec, an execution of the selected mode may be completed, and the corresponding mode may be displayed in color, i.e., in a different display state from a display state of another mode. Therefore, the user may check that the mode is being executed. Also, the mode execute button is displayed in an inactivated state (2701).

In detail, if the mode is executed, control states of devices included in the corresponding mode may be changed into set states. For example, when executing the "Going Away" mode, the user may set the "Going Away" mode to turn off all devices except a refrigerator and a boiler in a home.

According to an example embodiment, if a device does not operate according to a set mode when executing a mode, other devices except the device may continuously operate according to the corresponding mode without stopping a whole part of the mode.

Figure 28A:
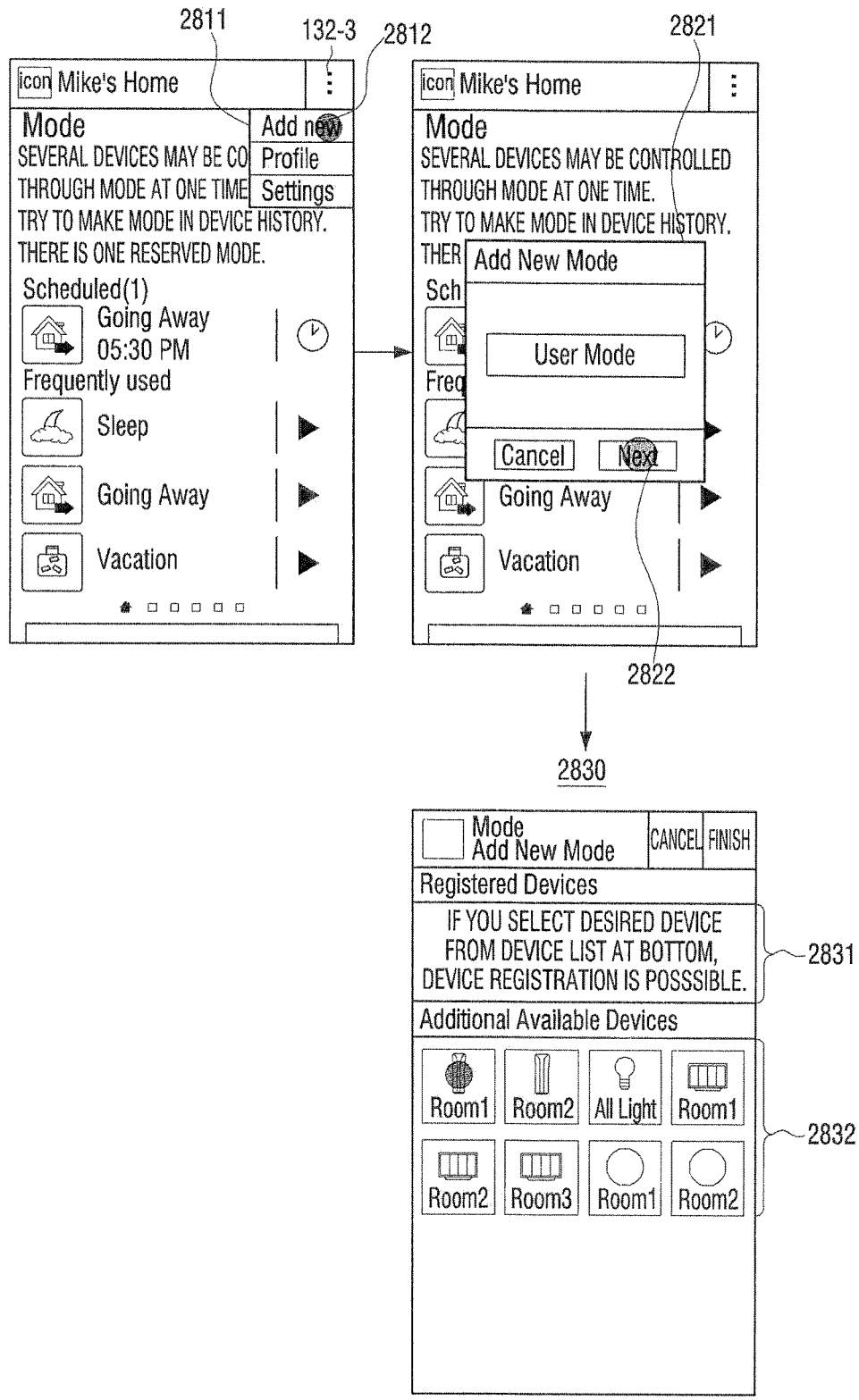

FIGS. 28A and 28B illustrate a UI that is provided by the user terminal apparatus 200 to add a new mode according to an example embodiment.

Referring to FIGS. 28A and 28B, if the user selects a menu button 132-3 on the mode service page 100-2, a menu screen 2811 may be displayed under the menu button 132-3. If the user selects a mode add menu 2812, the control unit 240 may display a window 2821 for receiving a name of a new mode on the display unit 220. If the user inputs a name of a new mode and selects a next button 2822, the control unit 240 changes the menu screen 2811 into a detailed screen 2830 for adding a new mode and displays the detailed screen 2830. The detailed screen 2830 is divided into two areas, a lower area 2832 is an area that displays a device usable in a new mode, and an upper area 2831 is an area that displays a selected device. In this case, an icon corresponding to a device selected in the lower area 2832 is displayed in the upper area 2831 and simultaneously is not displayed in the lower area 2832 anymore. If an icon 2847 of a device is selected in the upper area 2831, the control unit 240 displays a window 2841 for inputting a set value of the device. The user may input a detailed set value through the window 2841 and store the detailed set value (2842). If a finish button 2843 is selected, an addition of a new mode is completed (2860).

Hereinafter, a function area of a mode service page will be described in more detail. The function area of the mode service page may include a mode execute menu for executing one mode, and the control unit 240 may simultaneously control devices included in a group corresponding to the mode execute menu.

Figure 29:
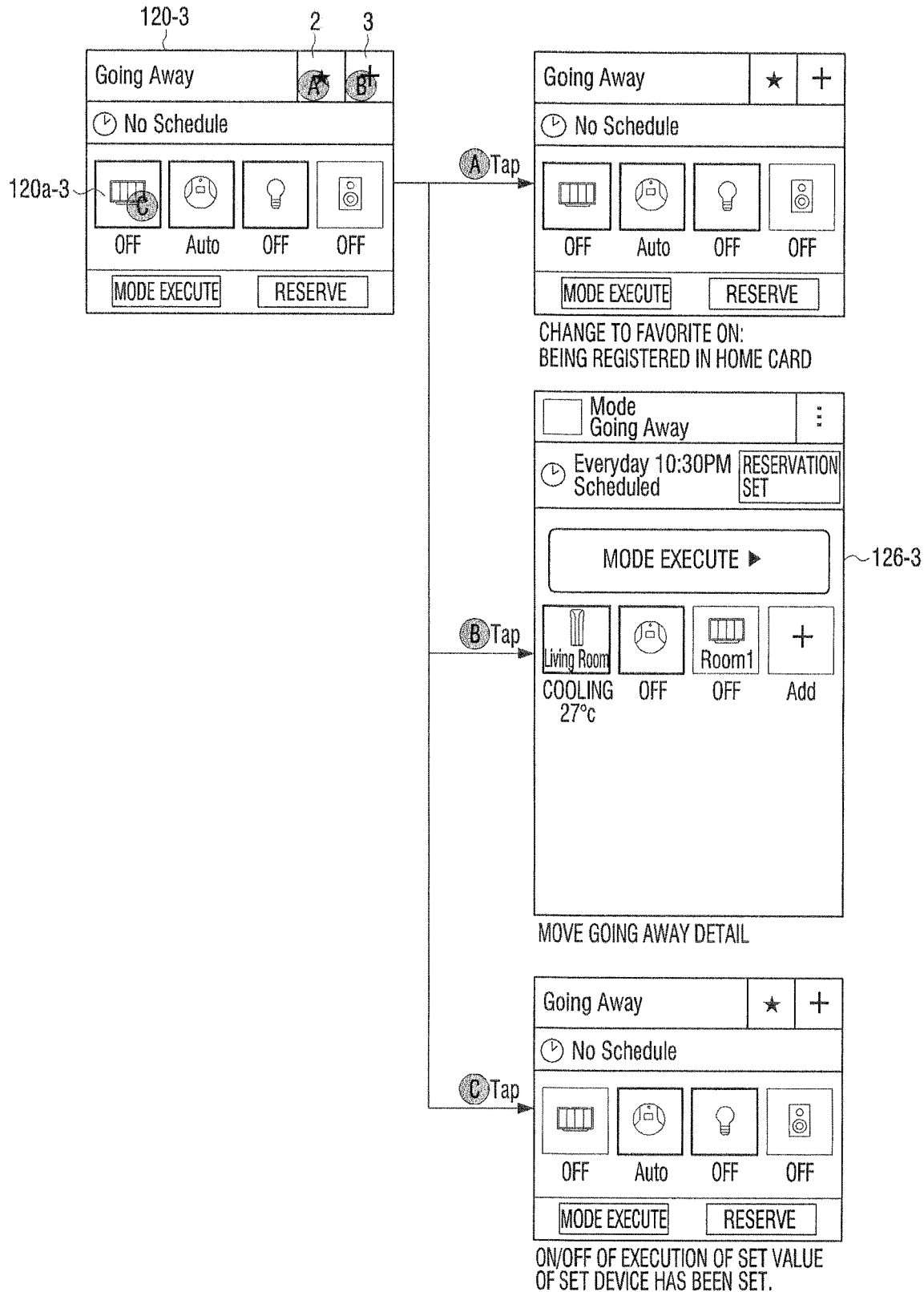

FIG. 29 illustrates a function area of a service mode page according to an example embodiment. In detail, FIG. 29 illustrates one of a plurality of function areas respectively corresponding to modes provided on a mode service page.

Referring to FIG. 29, if a bookmark menu icon 2 is selected in the first function area 120-3 of the mode service, the first function area 120-3 of the mode service is registered in a favorite function area of the main page 100-1. In other words, the first function area 120-3 of the mode service of the mode service page 100-3 may be looked for on the main page 100-1.

Also, referring to FIG. 29, if an enlarge menu icon 3 is selected in the first function area 120-3 of the mode service, the first function area 120-3 of the mode service is enlarged as a first detailed function area 126-3 of the mode service and then displayed on the front surface of the display unit 220.

Also, whether to execute a set value of a set device may be set in the first function area 120-3 of the mode service. For example, referring to FIG. 29, when the "Going Away" mode is executed, a TV is set to be turned off. If the user does not want to turn off the TV, the user may cancel the turning off of the TV.

Figure 30:
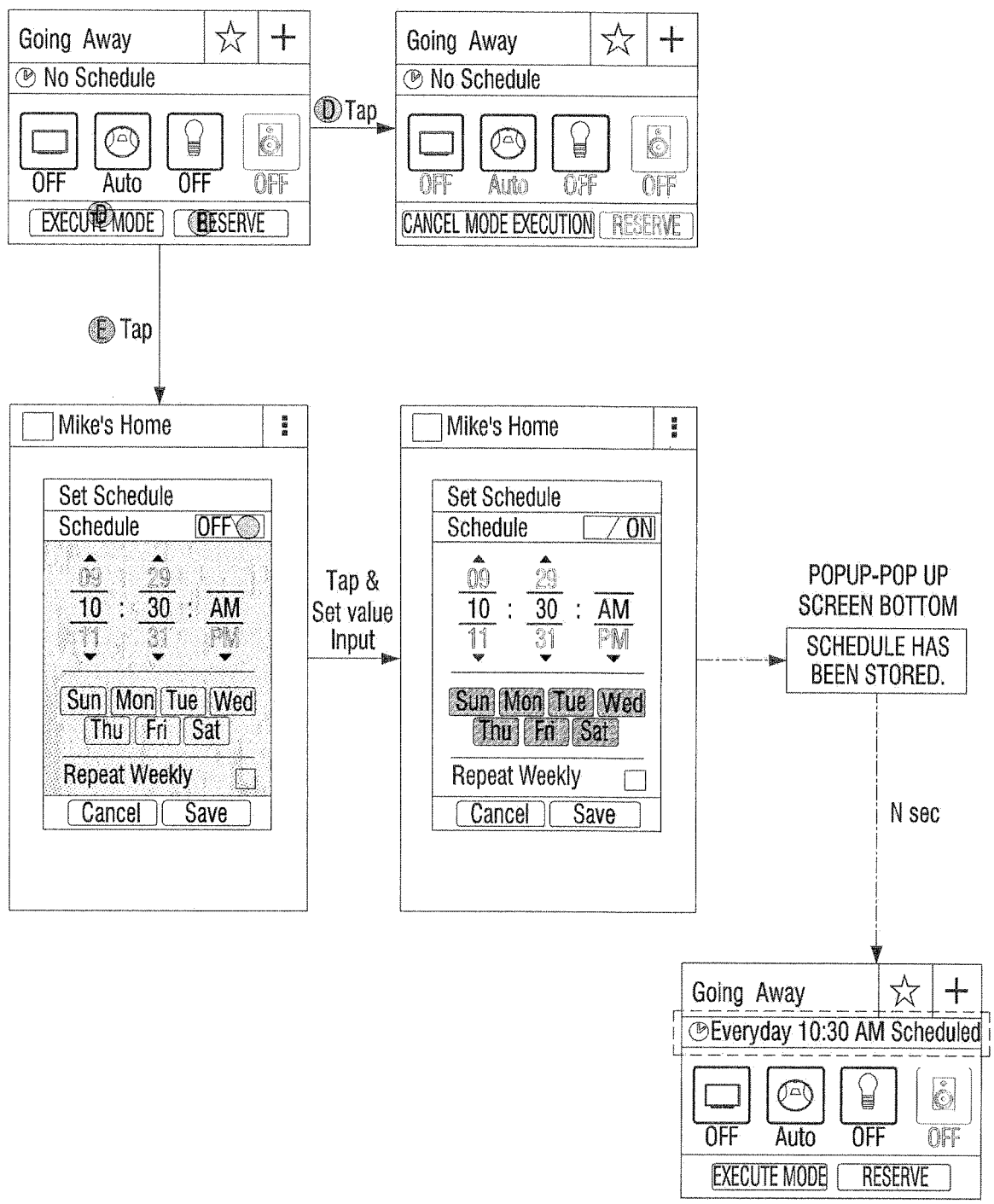

Also, the user may execute the "Going Away" mode in the first function area 120-3 of the mode service. Referring to FIG. 30, if a "Mode Execute" button is selected, the "Mode Execute" button is changed into a "Mode Cancel" button and then displayed for a preset time. If a preset time elapses, the "Going Away" mode is executed. Also, referring to FIG. 30, if a reservation button is selected, a schedule reservation screen pops up and then provided in a turn-off state. Here, if turning-off is canceled, a schedule reservation set value may be input.

FIG. 31 illustrates a UI that is provided by the user terminal apparatus 200 to delete a mode according to an example embodiment. Referring to FIG. 31, if the user selects a menu button 132-3 of the first detailed function area 126-3 of the mode service, a menu option 3121 is displayed under the menu button 132-3 (3120). If the user selects a Mode Delete button 3122 among these, the control unit 240 displays a window 3131 for inputting a final approval of a mode deletion. Here, if the delete approve button 3132 is selected, deleting is completed, and the control unit 240 displays a mode service summary area 110-3.

Returning to the screen 3120 of FIG. 31, if a mode rename button 3123 is selected, a window for inputting a new name of a corresponding mode may be displayed. Also, if a reset button 3124 is selected, the corresponding mode may be reset.

FIG. 32 illustrates a UI that is provided by the user terminal apparatus 200 to set a mode reservation according to an example embodiment. Referring to FIG. 32, if a reservation set button 3211 is selected in the first detailed function area 126-3 of the mode service, the control unit 240 may display a schedule set screen 3221. Thereafter, the user may change mode schedule setting through the schedule set screen 3221. For example, the user may set a date, a time, a mode execution repeated cycle, etc. at which a mode will be automatically executed. If a set store button 3231 is selected after the user completes setting, a message for indicating that a schedule is stored may be displayed at a lower end of the first detailed function area 126-3 of the mode service (3240). For example, if a mode reservation is turned off as shown with 3240 of FIG. 32, the control unit 240 may display "No Schedule" 3241 at an upper end of the first detailed function area 126-3 of the mode service.

Figure 33:
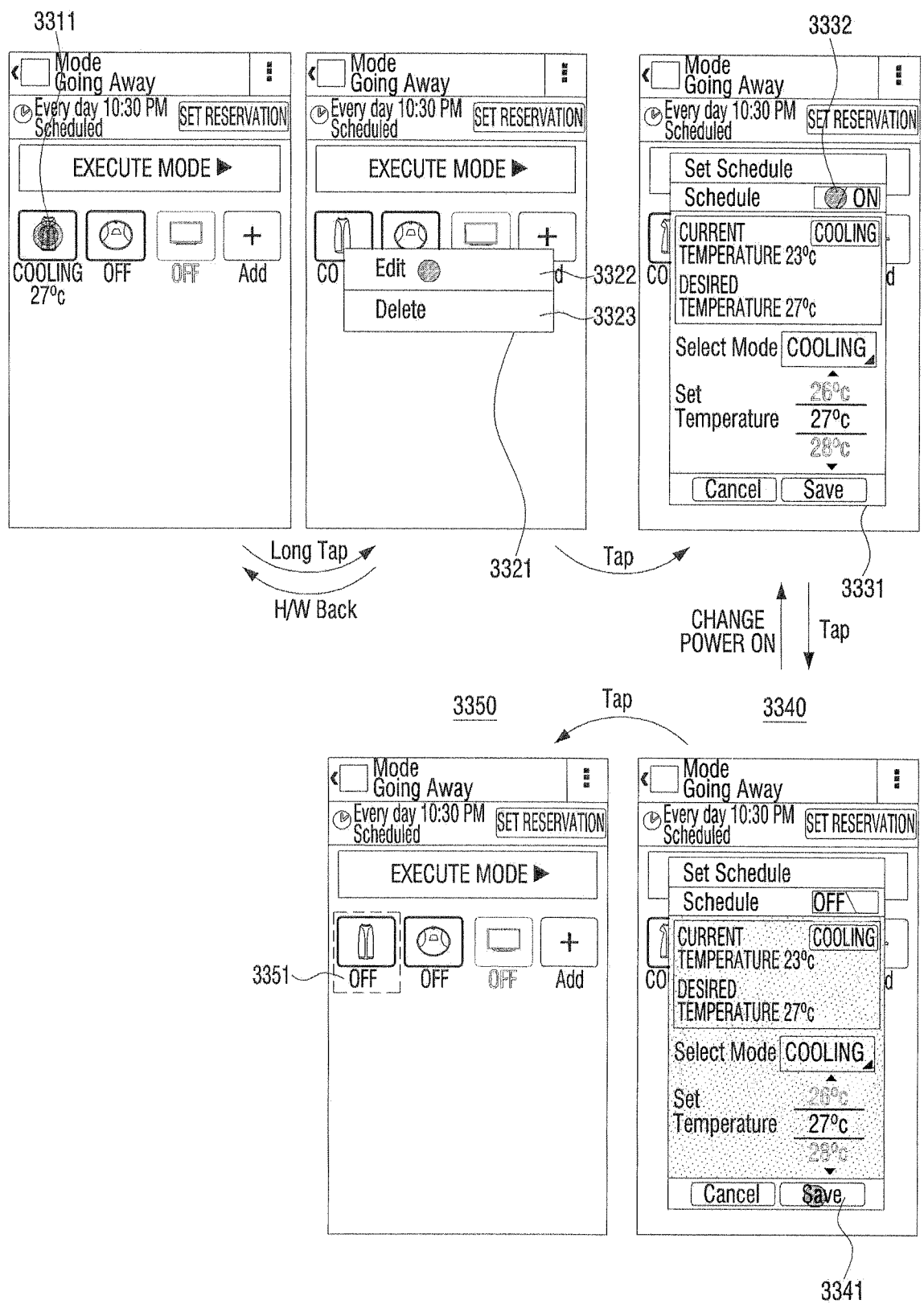

FIG. 33 illustrates a UI for settings of devices included in a mode. Referring to FIG. 33, if the user wants to change a setting of one of devices included in a mode, the user may select an icon 3311 of the device. In this case, the UI may be an operation of long pressing the icon 3311 of the device. If such a user input is sensed, the control unit 240 displays an option menu 3321 of a selected device. The option menu 3321 may include a device edit menu option 3322 and a device delete menu option 3323. Here, if the device edit menu option 3322 is selected, an edit screen 3331 may be displayed. The user may change a set value of the corresponding device on the edit screen 3331. For example, if a schedule on/off button 3332 is selected to turn off a schedule, an edit screen 3340 may be darkened (e.g., grayed) and displayed. Thereafter, if a button 3341 is selected, a screen 3350 to which a set value set by the user is applied is displayed. Referring to 3350 of FIG. 33, a message 3351 for indicating that the schedule is turned off may be displayed under an icon of a corresponding device.

Referring to FIG. 33 again, if a device delete menu option 3323 is selected, a device may be deleted from a corresponding mode.

Figure 34:
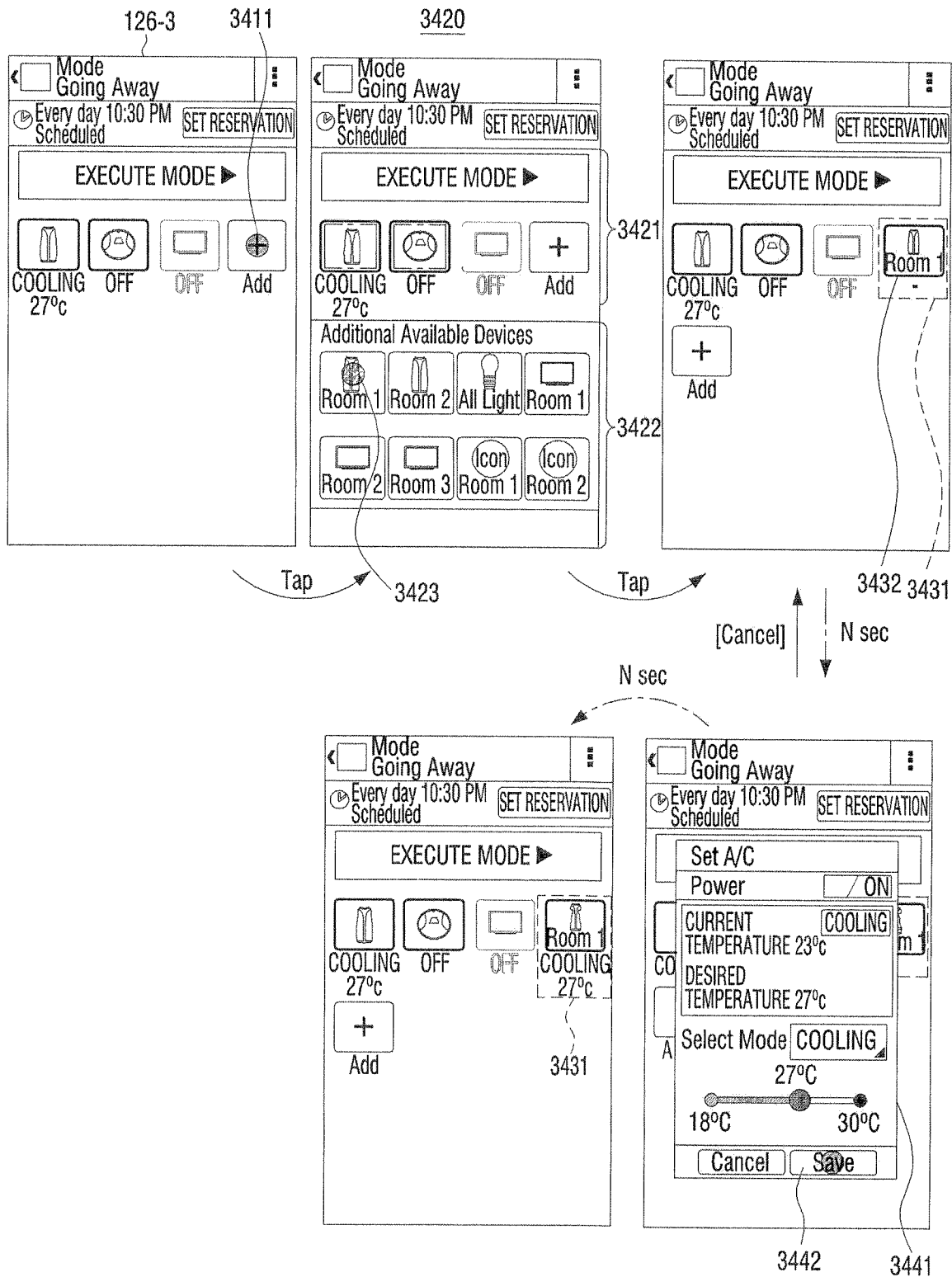

According to another example embodiment, referring to FIG. 34, if an add button 3411 is selected in the first detailed function area 126-3 of the mode service, a screen 3420, which includes a plurality of icons corresponding to a selectable device, is displayed. The screen 3420 includes an upper area 3421 that displays an icon of a device included in a current mode and a lower area 3422 that displays an icon of an addible device. If the user wants to add a device, the user may select an icon 3423 of a device to be added. In this case, an icon corresponding to a selected new device may be replaced and displayed in an area 3431 in which an existing add button is positioned. If the user selects an icon 3432, a screen 3441 for changing a mode set value of a device corresponding to the icon may be displayed. If a store button 3442 is selected after the user completes setting, setting is completed. Thereafter, a message, which is included in the area 3431 displaying the corresponding icon, is changed into set contents.

Through a mode service page as described above, the user may set a plurality of modes according to tastes of the user and execute only one mode to acquire an effect of executions of a plurality of devices without inputting individual settings of the plurality of devices.

<Third Service Page 100-4-Control>

Hereinafter, among a plurality of service pages, a third service page that provides a control menu for respectively controlling operations of a plurality of devices included in a home network will be described. Hereinafter, a third service will be referred to as a control service.

The control service provides a function of checking a state of a device of the home network and a function of turning power on/off.

Figure 35:
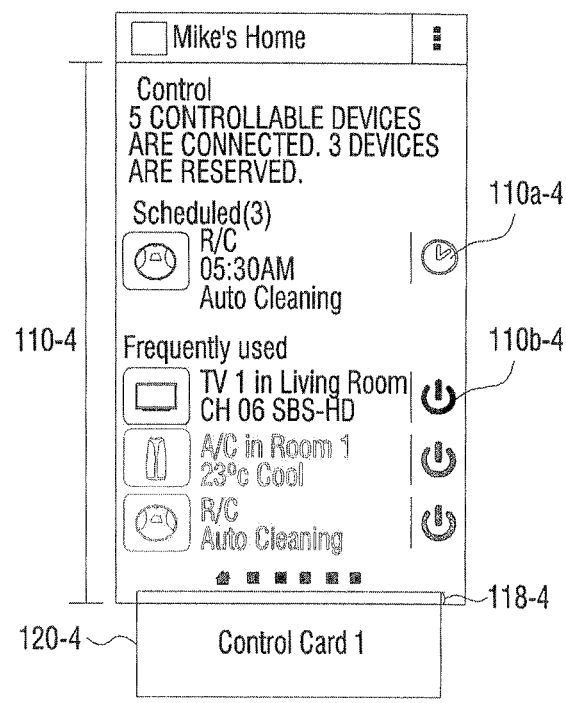

FIG. 35 illustrates a control service page 100-4 according to an example embodiment.

Referring to FIG. 35, a control service summary area 110-4 of the control service page 100-4 includes a scheduled device area and a frequently used device area. If a schedule check button 110a-4 is selected in the scheduled device area, a schedule check pop-up is called. If a device power button 110b-4 is selected, a corresponding device is turned on or off. This will be described in more detail later with reference to FIG. 36.

Also, the control service page 100-4 includes a first function area 120-4 of a control service connected under a control service summary area 110-4. When the control service summary area 110-4 is displayed on the front surface of the display unit 220, only a cue area 118-4 of a function area of the control unit service for indicating that a function area exists below is displayed on the display unit 220 as shown in FIG. 35. The first function area 120-4 of the control service is displayed above the control service summary area 110-4 according to a user manipulation for dragging the cue area 118-4 of the function area of the control service into the control service summary area 110-4. In this case, if other function areas exist under the first function area 120-4 of the control service, the other function areas are also moved upwards together with the first function area 120-4 of the control service.

Figure 36:
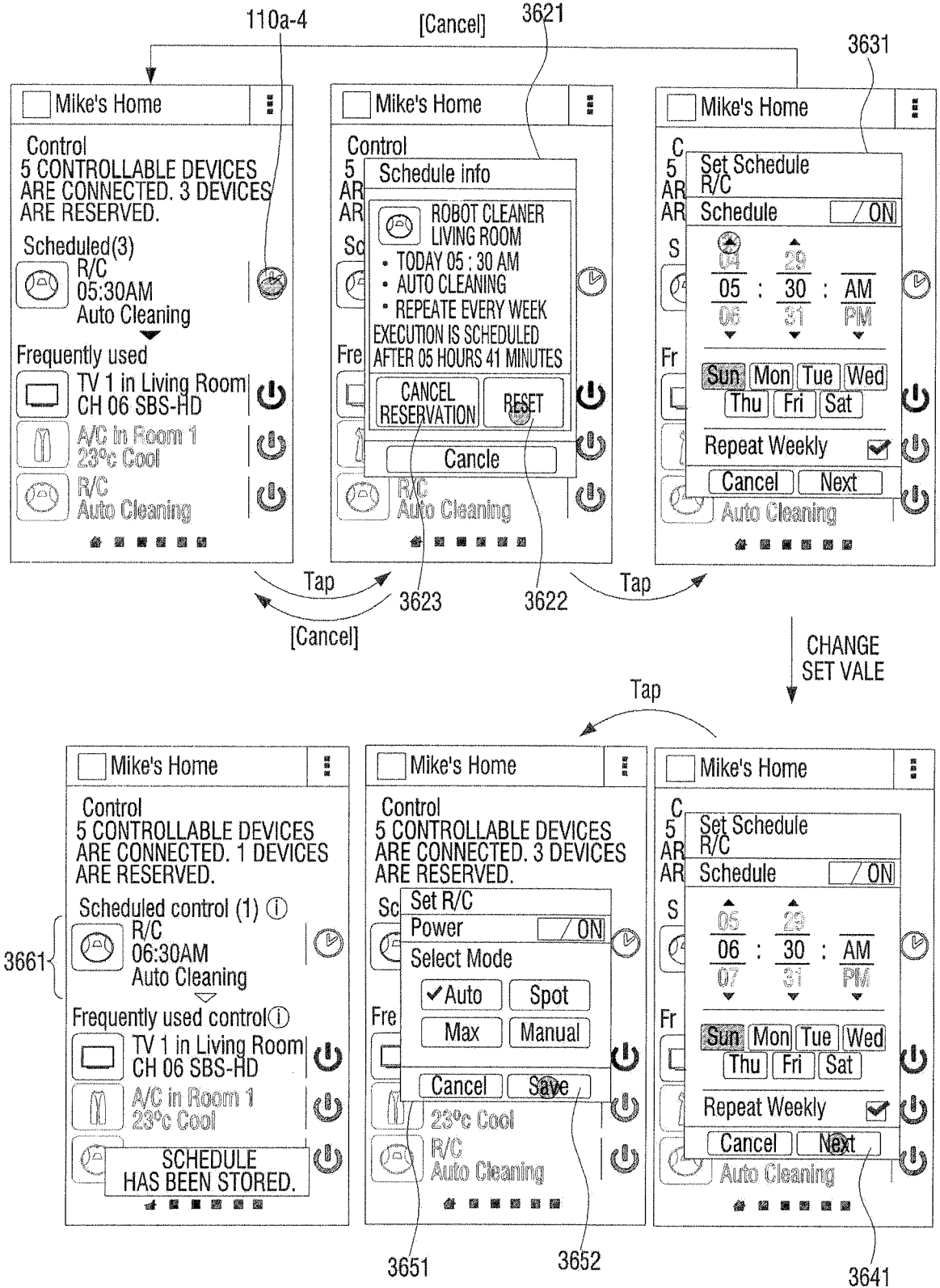

FIG. 36 illustrates editing of a reserved device that is performed on the control service page 100-4 provided by the user terminal apparatus 200 according to an example embodiment.

Referring to FIG. 36, if a schedule check button 110a-4 is selected, a screen 3621 for checking a schedule is displayed. Here, if a reset button 3622 is selected, a screen 3631 for setting operation scheduled date, time, repeated cycle, and the like of a corresponding device is displayed. Here, if a reservation cancel button 3623 is selected, a reservation of the corresponding device may be canceled. If the user selects a next button 3641 after setting is completed, a screen 3651 for setting a mode of a device is displayed. For example, if the device is a robot cleaner, an automatic mode for performing automatic cleaning, a spot mode for cleaning a determined spot, a max mode for maximum intensity cleaning, a manual mode for designating a cleaning place, a cleaning intensity, etc. by the user, or the like may be provided. If a store button 3652 is selected after a mode is set, a message for indicating that a schedule is stored may be displayed at a lower end of the control service summary area 110-4, and a changed setting item may be displayed in an area 3661 displaying a scheduled device.

The control service page 100-4 provides control UI screens for various types of devices. For example control UI screens for a TV, an air conditioner (A/C), a robot cleaner, a washer, a light, an oven, and a plug will now be described.

A function area of a control service page will now be described in more detail. The function area of a control service may include a control menu for controlling a device included in a home network.

Figure 37:
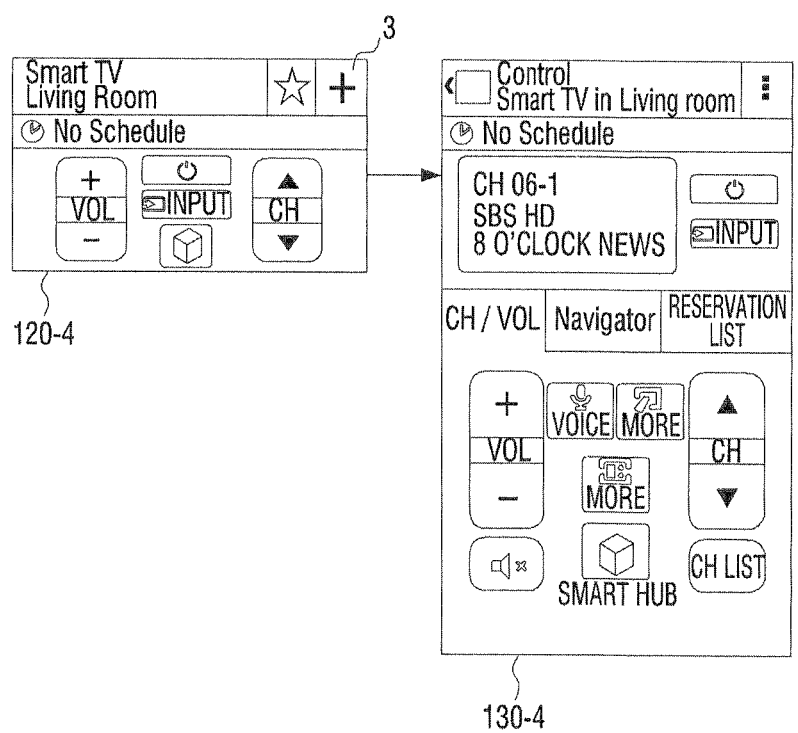

FIG. 37 illustrates a first function area of a control service for controlling a TV according to an example embodiment. Hereinafter, for convenience of description, the first function area 120-4 of the control service will be referred to as a TV control card 120-4, and a first detailed function area 130-4 of the control service will be referred to as a TV detailed control card 130-4.

Referring to FIG. 37, the TV control card 120-4 includes volume control, power, input (external input), home, and channel control buttons. If an enlarge menu icon 3 is selected, a change into the TV detailed control card 130-4 is performed, and the TV detailed control device 130-4 includes more many control buttons than the TV control card 130-4. For example, if a Navigation tab is selected, a navigation touch pad area or the like is provided with reference to FIG. 38. If a reservation list tab is selected, a reservation state of turning on and/or off of a TV may be checked, and a reservation may be added.

FIG. 39 illustrates a second function area of a control service for controlling an A/C according to an example embodiment. Hereafter, for convenience of description, a second function area 121-4 of the control service will be referred to as an A/C control card 121-4, and a second detailed function area 131-4 of the control service will be referred to as an A/C detailed control card 131-4.

Figure 40:
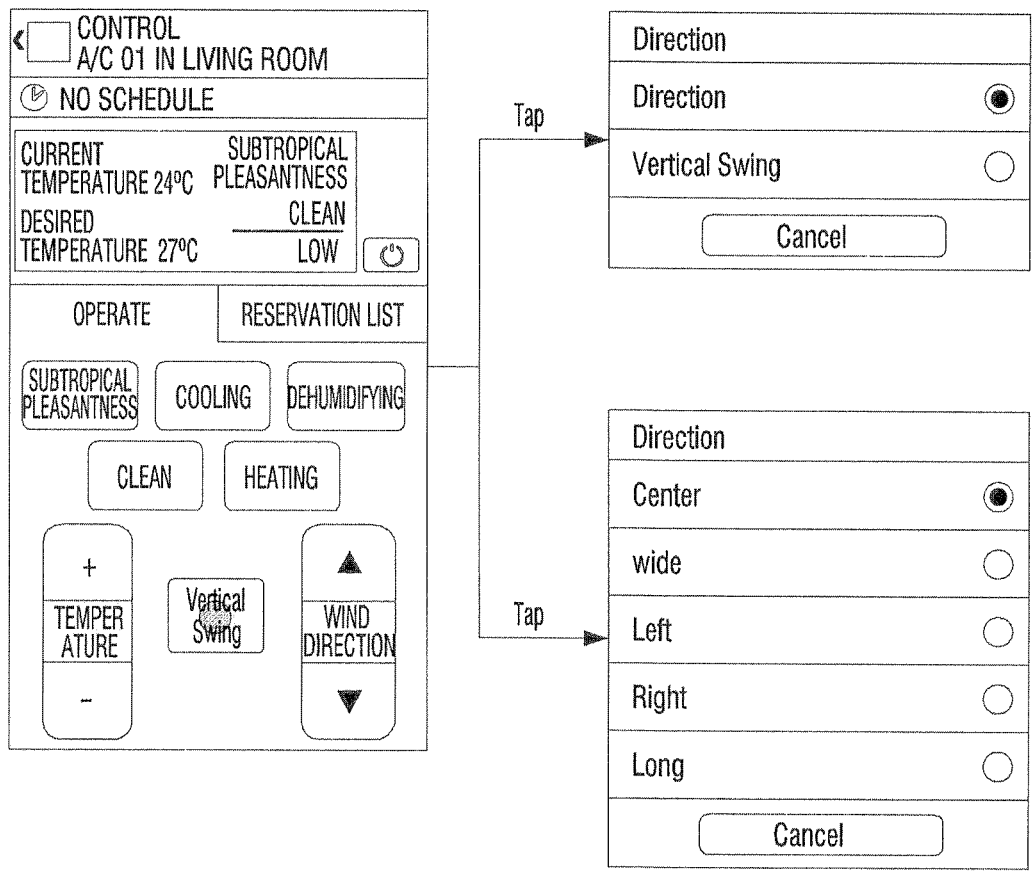

Referring to FIG. 39, the A/C control card 121-4 includes a current temperature area, a temperature control button, and a wind direction control button. Here, if a current temperature reaches a maximum or minimum temperature, + or − button may be inactivated. If the enlarge menu icon 3 is selected, a change into the A/C detailed control card 131-4 is performed, and the A/C detailed control card 131-4 includes more many control buttons than the A/C control card 131-4. For example, if an operating tap is selected, an operation mode, such as subtropical pleasantness, air-conditioning, dehumidifying, cleaning, heating, or the like, may be selected. If a reservation list tap is selected, a reservation state of turning on and/or off an A/C may be checked, and a reservation may be added. If Vertical Swing is selected, a wind direction menu changing according to an operation mode may be displayed as shown in FIG. 40.

Figure 41:
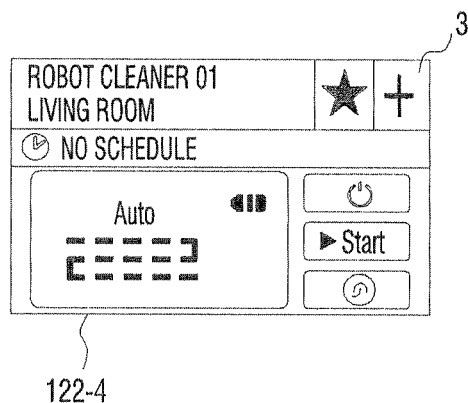

FIG. 41 illustrates a third function area of a control service for controlling a robot cleaner according to an example embodiment. Hereinafter, for convenience of description, a third function area 122-4 of the control service will be referred to as a robot cleaner control card 122-4, and a third detailed function area 132-4 of the control service will be referred to as a robot cleaner detailed control card 132-4.

Referring to FIG. 41, the robot cleaner control card 122-4 includes operation state, power buttons, and the like. If an enlarge menu icon 3 is selected, the robot cleaner control card 122-4 is changed to the robot cleaner detailed control card 132-4, and the robot cleaner detailed control card 132-4 includes more many control buttons than the robot cleaner control card 132-4. For example, if an operate tap is selected, an operation state button, a direction control button, a microphone, a light, a camera button, etc. are provided. For example, if the camera button is selected, an image that is captured through a camera installed in a robot cleaner may be checked.

FIG. 42 illustrates a fourth function area of the control service for controlling a washer according to an example embodiment. Hereinafter, for convenience of description, a fourth function area 123-4 of the control service will be referred to as a washer control card 123-4, and a fourth detailed function area 133-4 of the control service will be referred to as a washer detailed control card 133-4.

Figure 43:
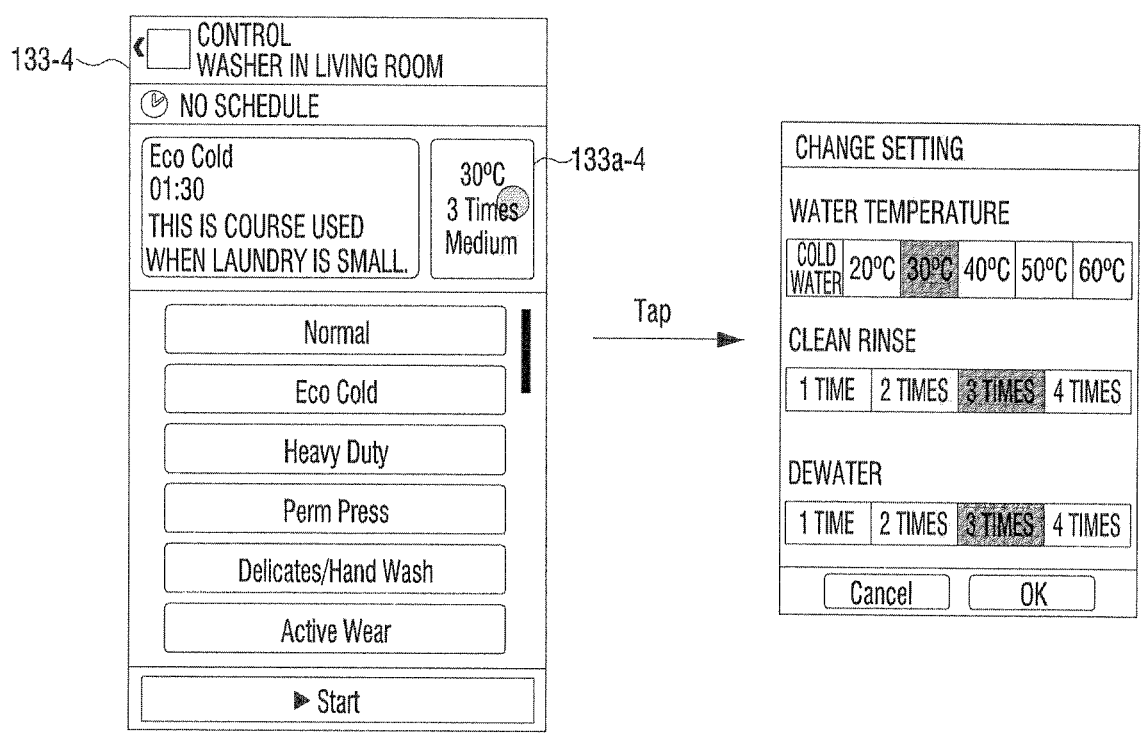

Referring to FIG. 42, the washer control card 123-4 includes an information screen, a state window, a start button, or the like. If an enlarge menu icon 3 is selected, the washer control card 123-4 is changed to the washer detailed control card 133-4, and the washer detailed control card 133-4 includes many more control buttons than the washer control card 133-4. Also, referring to FIG. 43, if a state window 133a-4 is selected, a menu for changing washing elements, such as a water temperature, rinsing, dewatering, etc. is displayed.

Figure 44:
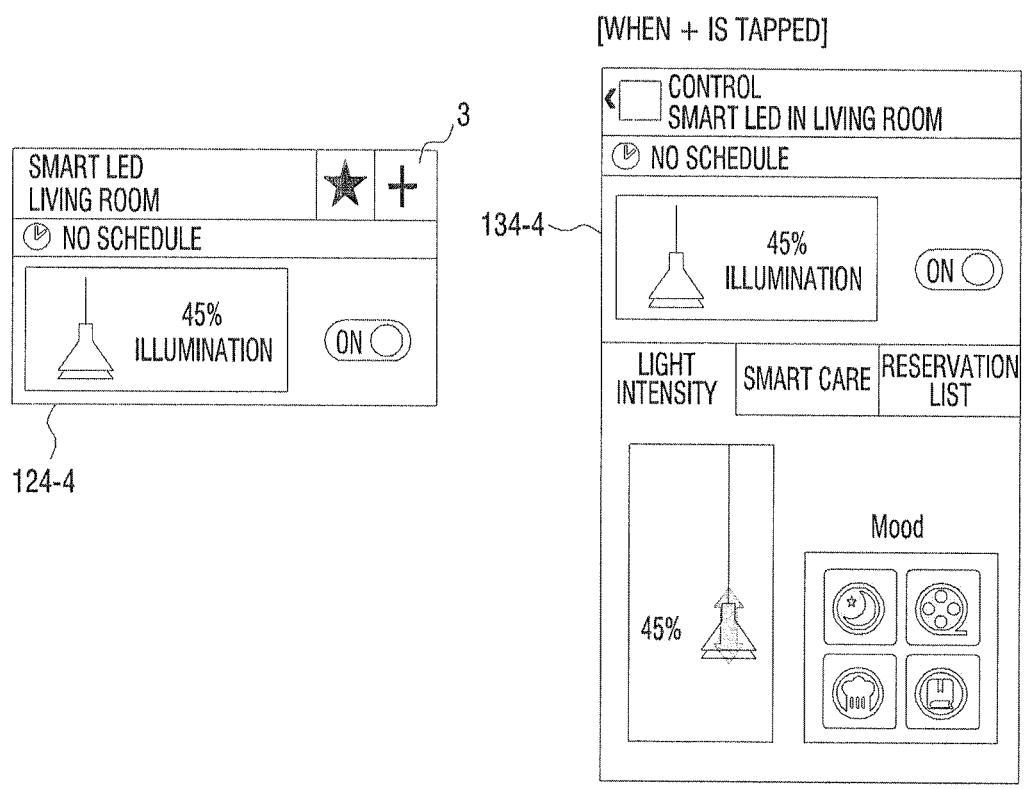

FIG. 44 illustrates a fifth function area of the control service for controlling a light according to an example embodiment. Hereinafter, for convenience of description, a fifth function area 124-4 of the control service will be referred to as a light control card 124-4, and a fifth detailed function area 134-4 of the control service will be referred to as a light detailed control card 134-4.

Figure 45:
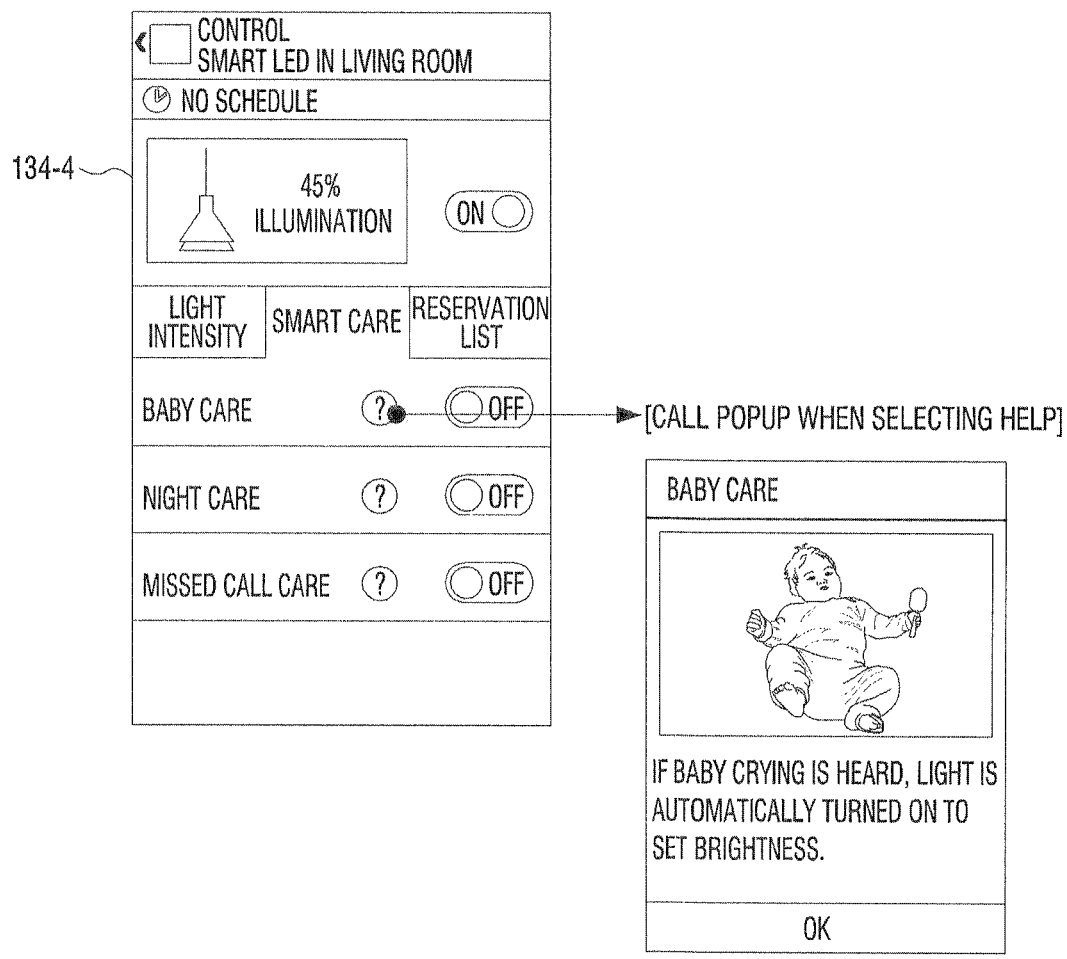

Referring to FIG. 44, the light control card 124-4 includes an information screen, a power button, etc. If an enlarge menu icon 3 is selected, the light control card 124-4 is changed to the light detailed control card 134-4, the light detailed control card 134-4 includes many more control buttons than the light control card 124-4. If a light intensity tab is selected in the light detailed control card 134-4, a light intensity may be controlled. If a particular mood is selected, the light intensity may be automatically controlled according to the corresponding mood. Referring to FIG. 45, if a Smart Care tab is selected in the light detailed control card 134-4, various care modes are provided. For example, if baby crying is sensed in a Baby Care, a designated LED may automatically dim. If a motion of the user terminal apparatus 200 is sensed while asleep in a Night Care, a designated LED may automatically dim. If there is a missed call in the user terminal apparatus 200 in a Missed Call Care, an LED designated after a preset time may automatically flicker so as to enable the user to check the user terminal apparatus 200.

FIG. 46 illustrates a sixth function area of the control service for controlling an oven according to an example embodiment. Hereinafter, for convenience of description, a sixth function area 125-4 of the control service will be referred to as an oven control card 125-4, and a sixth detailed function area 135-4 of the control service will be referred to as an oven detailed control card 135-4.

Referring to FIG. 46, the oven control card 125-4 includes an information screen, a power button, and the like. If an enlarge menu icon 3 is selected, the oven control card 125-4 is changed to the oven detailed control card 135-4, and the oven detailed control card 135-4 includes many more buttons than the oven control card 135-4. If an operate tab is selected in the oven detailed control card 135-4, a plurality of oven function buttons, temperature control and select start button, etc. are provided.

Figure 47:
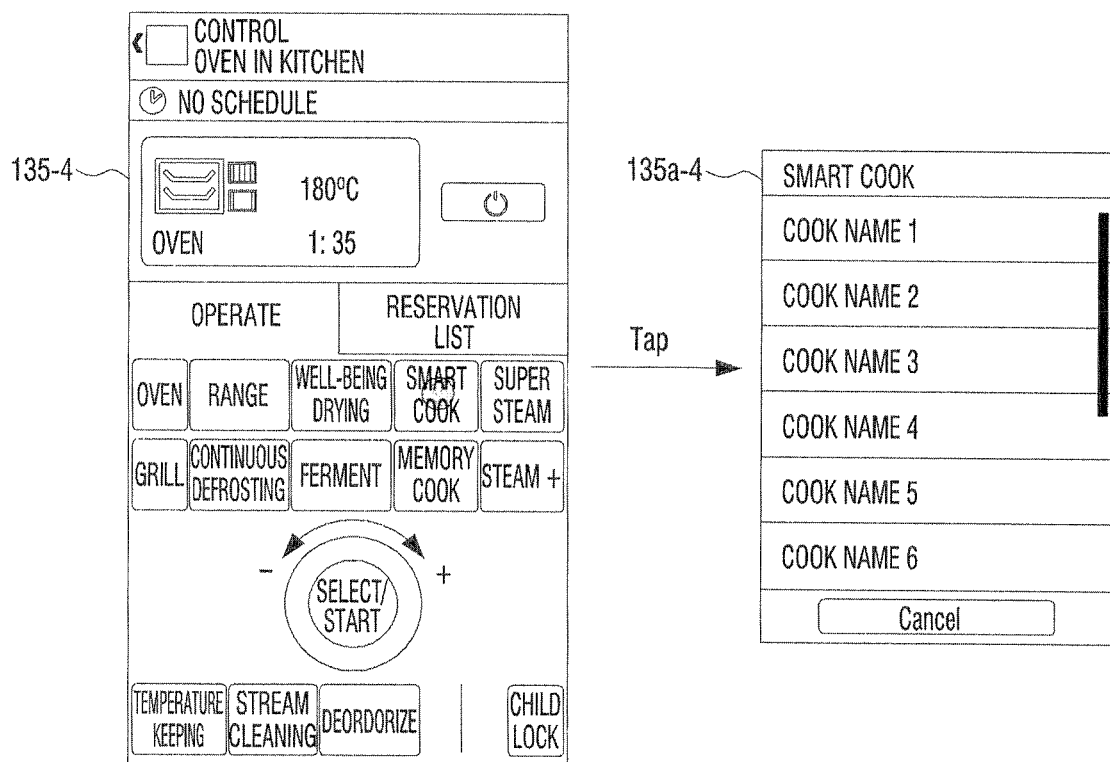

Referring to FIG. 47, if a particular one is selected from a plurality of oven functions in the oven detailed control card 135-4, a list 135a-4 that may be provided by the selected function is displayed.

FIG. 48 illustrates a seventh function area of the control service for controlling a power plug according to an example embodiment. Hereinafter, for convenience of description, a seventh function area 126-4 of the control service will be referred to as a plug control card 126-4, and a seventh detailed function area 136-4 of the control service will be referred to as a plug detailed control card 136-4.

Referring to FIG. 48, the plug control card 126-4 includes an information screen, a power button, and the like. If an enlarge menu icon 3 is selected, the plug control card 126-4 is changed to the plug detailed control card 136-4, and the plug detailed control card 136-4 includes many more control buttons than the plug control card 126-4. The plug detailed control card 136-4 may provide a reservation list of on/off reservations.

Through the user terminal apparatus 200 providing a control service page as described above, the user may easily manipulate devices in a home through only the user terminal apparatus 200.

<Fourth Service Page 100-5-Care Report>

Among a plurality of service pages, a fourth service page that provides controls of devices included in another home network will now be described. Hereinafter, a fourth service will be referred to as a care report service.

The care report service is a service that checks and reports whether an abnormality occurs in a home registered as a care object, based on a device use log of the home.

Figure 49:
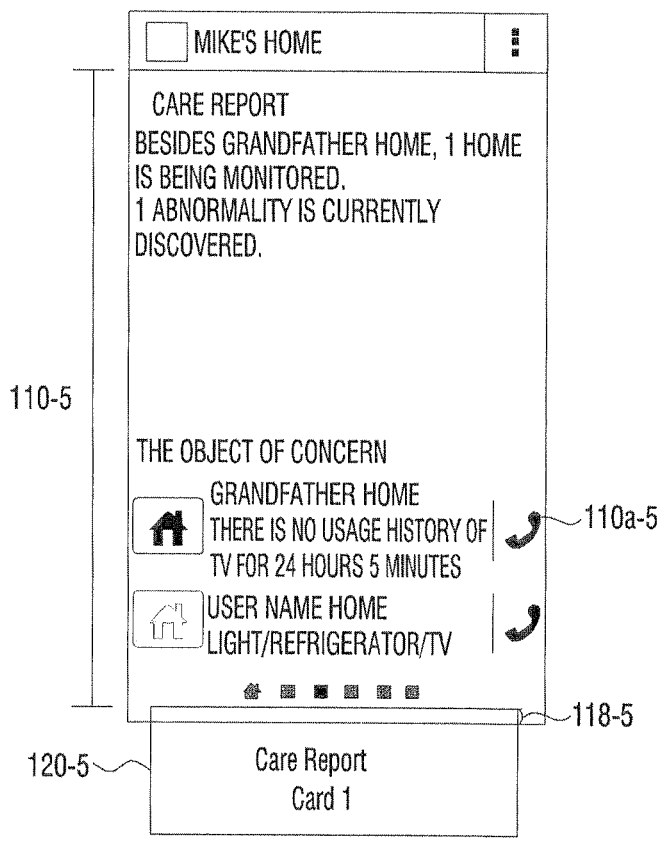

FIG. 49 illustrates a care report service page 100-5 according to an example embodiment.

Referring to FIG. 49, a care report service summary area 110-5 of the care report service page 100-5 provides a message having different contents according to a current monitoring state and includes a recently used device log information area of a home registered as a care object.

If a call button 110a-5 is selected in the recently used device log information area of the home registered as the care object, a call is made to the corresponding home.

Also, the care report service page 100-5 includes a first function area 120-5 of a care report service connected under the care report service summary area 110-5. When the care report service summary area 110-5 is displayed on the front surface of the display unit 220, only a cue area 118-5 of a function area of the care report service for indicating that a function area exists below is displayed on the display unit 220 as shown in FIG. 49. The first function area 120-5 of the care report service is displayed above the care report service summary area 110-5 according to a user manipulation for dragging the cue area 118-5 of the function area of the care report service into the care report service summary area 110-5. In this case, if other function areas exist under the first function area 120-5 of the care report service, the other function areas are moved upwards together with the first function area 120-5 of the care report service.

FIG. 50 illustrates a function area that is provided on a care report service page according to an example embodiment. In detail, FIG. 50 illustrates various states of the first function area 120-5 of the care report service.

Referring to FIG. 50, for example, if an abnormality occurs in a home registered as a care object, and an enlarge menu icon 3 is selected, a first detailed function area 130-5 of the care report service is displayed on the front surface of the display unit 220. Here, if a Call button is selected, a call is made to the home registered as the care object.

Through the user terminal apparatus 200 providing the care service page as described above, the user may be provided with situation information about a home of the user and another home through a user terminal apparatus of the user.

<Fifth Service Page 100-6-Energy>

Among a plurality of service pages, a fifth service page that provides energy usage information about a plurality of devices included in a home network will now be described. Hereinafter, the fifth service will be referred to as an energy service.

The energy service provides a service of measuring and managing detailed energy usage of a device registered in a home network.

Figure 51:
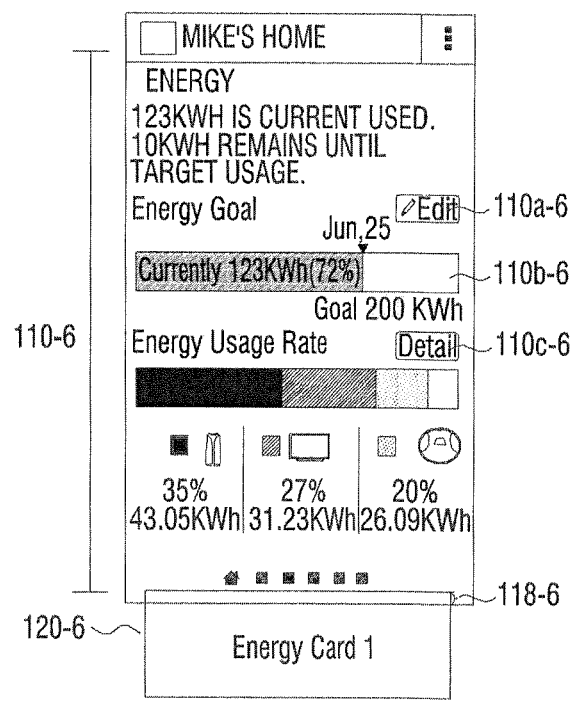
FIGS. 51, 52, 53, 54 and 55 illustrate an example fifth service page according to various non-limiting example embodiments.

FIG. 51 illustrates an energy service page 100-6 according to an example embodiment.

Referring to FIG. 51, an energy service summary area 110-6 of the energy service page 100-6 includes a description message of energy, a bar graph 110b-6 showing energy usage that is currently used and energy usage goal, and an area indicating information about three devices having most energy usage among devices registered in a home network.

Also, the energy service page 100-6 includes a first function area 120-6 of the energy service connected under the energy service summary area 110-6. When the energy service summary area 110-6 is displayed on the front surface of the display unit 220, only a cue area 118-6 of a function area of the energy service for indicating that a function area exists below is displayed on the display unit 220 as shown in FIG. 51. The first function area 120-6 of the energy service is displayed above the energy service summary area 110-6 according to a user manipulation for dragging the cue area 118-6 of the energy service into the energy service summary area 110-6. In this case, if other function areas exist under the first function area 120-6 of the energy service, the other function areas are also moved upwards together with the first function area 120-6 of the energy service.

Figure 52:
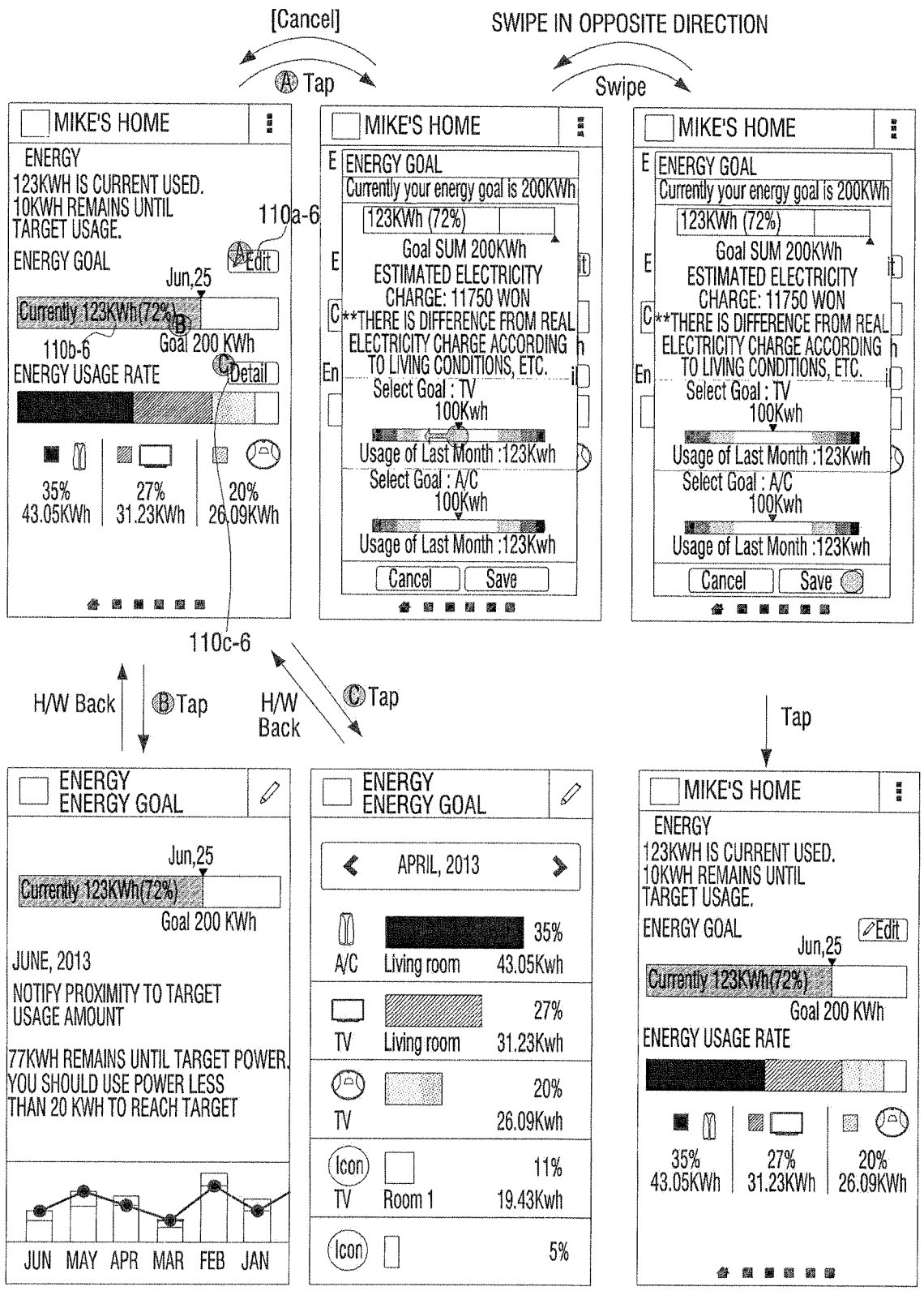

Referring to FIG. 52, if an edit menu 110a-6 provided in the energy service summary area 110-6 is selected, an energy goal value of each device of the home network may be edited. Also, if the bar graph 110b-6 provided in the energy service summary area 110-6 is selected, a screen, which displays energy usage that is currently used and energy usage goal, is output. The user swipes a monthly graph area displayed at a bottom of the screen from side to side to scroll the monthly graph area. Also, if a detail view button 110c-6 provided in the energy service summary area 110-6 is selected, three devices having most energy usage among devices registered in the home network are included so as to display energy usage detail information of other registered devices.

Figure 53:
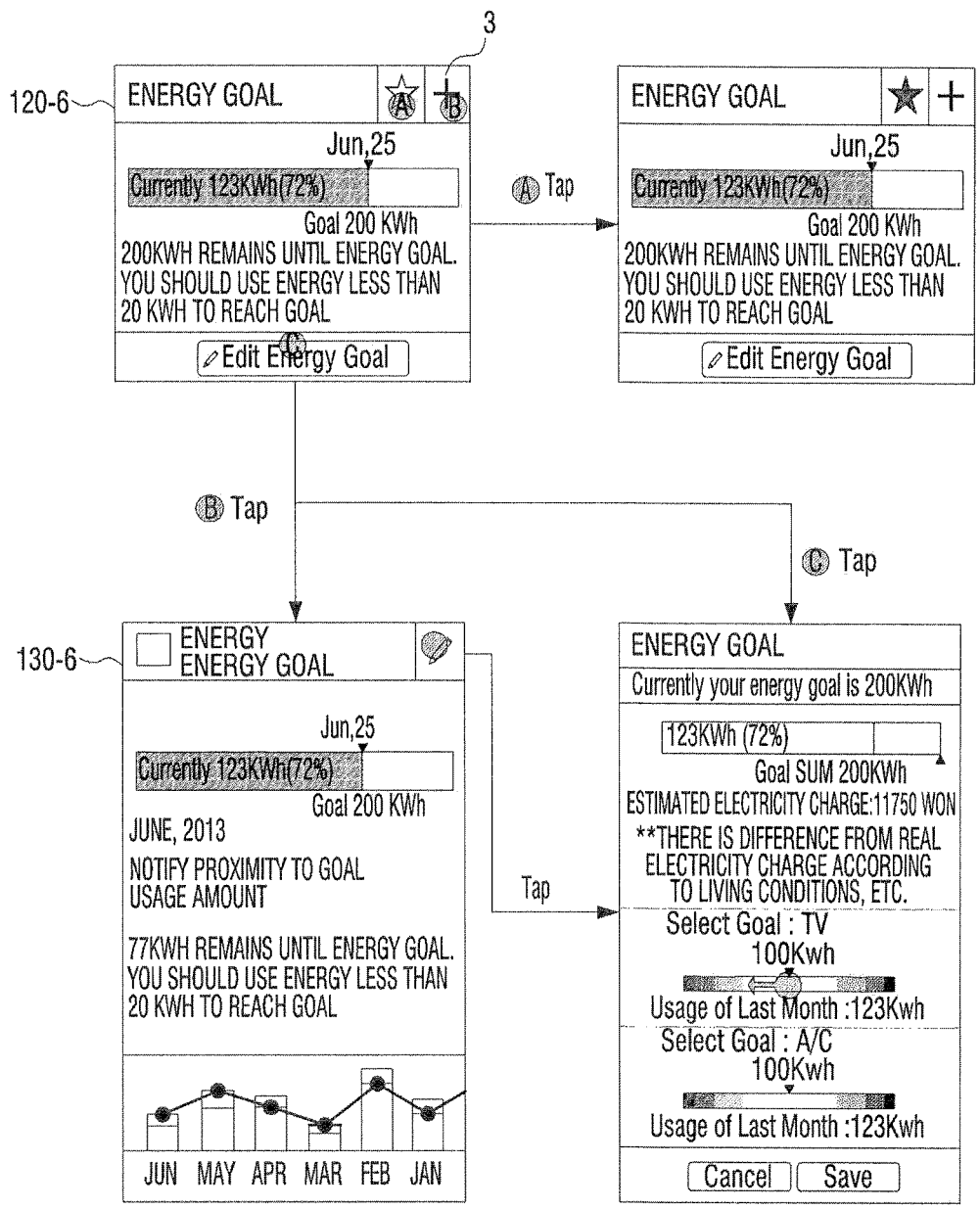
Figure 54:
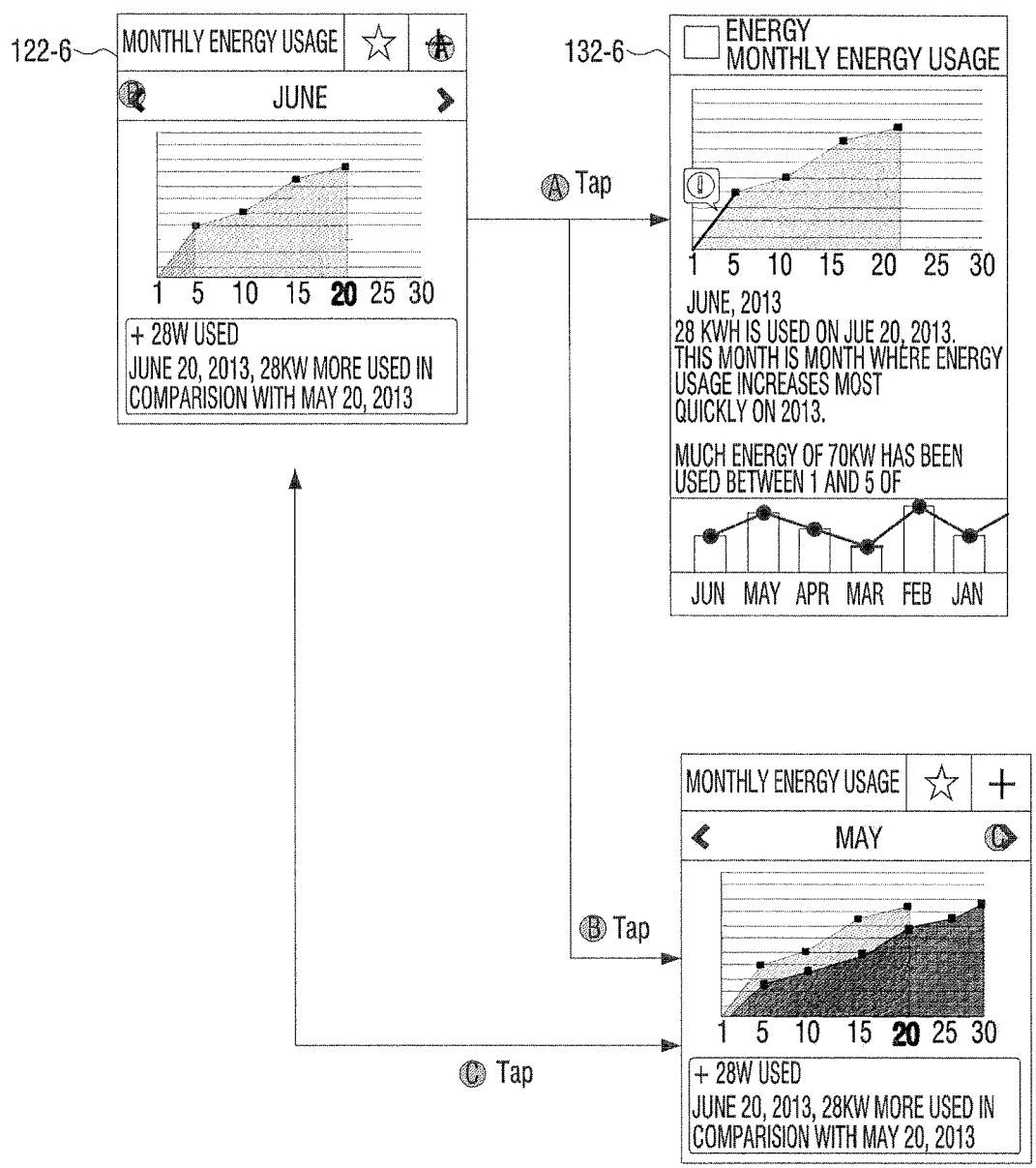
Figure 55:
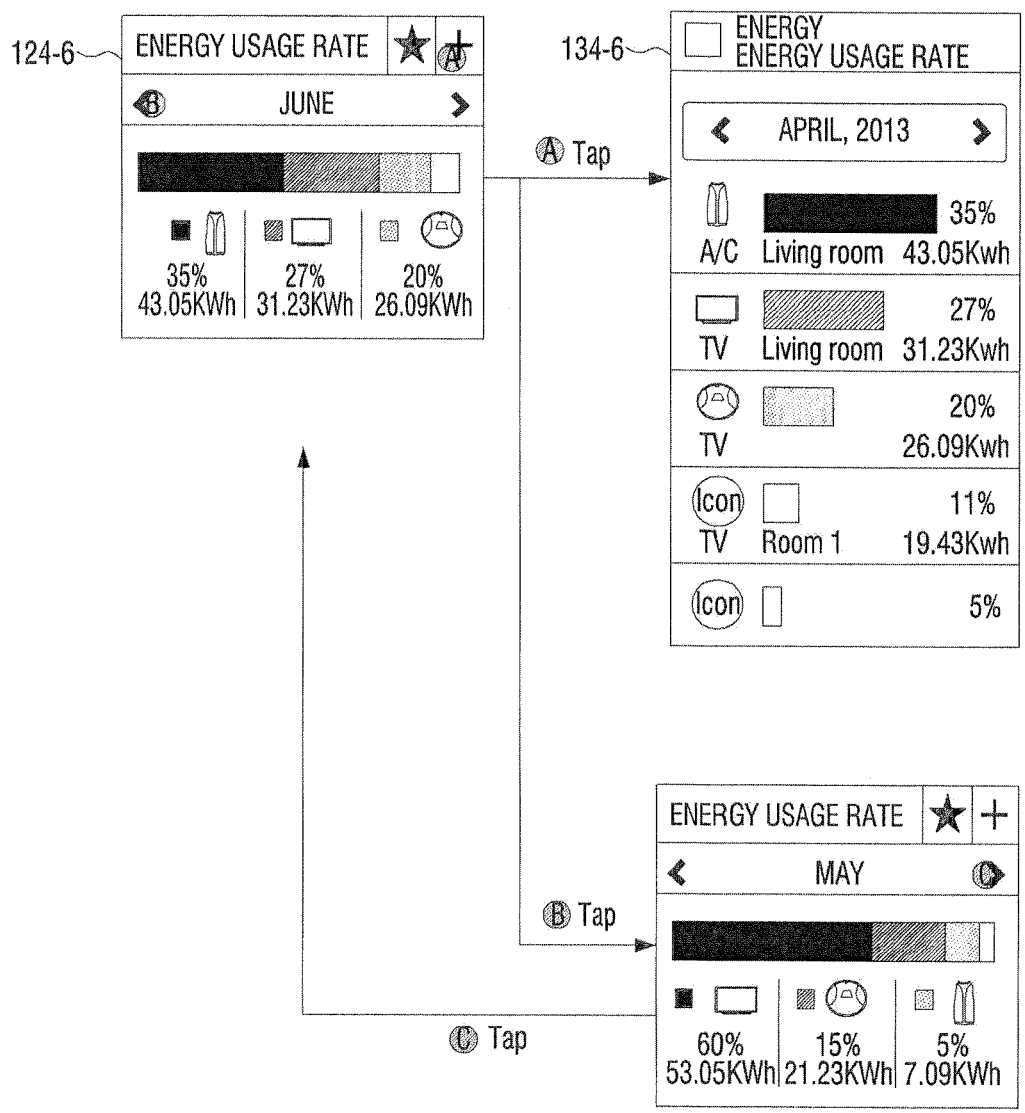

FIGS. 53 through 55 illustrate a function area that is provided on an energy service page according to various example embodiments. The energy service page provides a first function area 120-6 (Energy Goal Card) of the energy service page, a second function area 122-6 (Monthly Energy Usage Card) of the energy service page, and a third function area 124-6 (Energy Usage Rate Card) of the energy service page.

Referring to FIG. 53, if an enlarge menu icon 3 provided in the first function area 120-6 (Energy Goal Card) of the energy service is selected, a first detailed function area 130-6 of the energy service page is displayed as shown in FIG. 53. The first detailed function area 130-6 of the energy service page displays an energy goal value set by the user and information about an amount remaining to the goal value, an excess of the goal value, or the like.

Also, referring to FIG. 54, if an enlarge menu icon 3 provided in the second function area 122-6 (Monthly Energy Usage Card) of the energy service page is selected, a second detailed function area 132-6 of the energy service page is displayed as shown in FIG. 54. The second detailed function area 132-6 of the energy service page displays a monthly energy usage as a broken line graph in the second detailed function area 132-6 of the energy service page and monthly provides detailed information about power consumption. For example, information about a month where energy consumption increases fastest, and a monthly energy consumption difference calculation result may also be provided.

Also, referring to FIG. 55, if an enlarge menu icon 3 provided in the third function area 124-6 (Energy Usage Rate Card) of the energy service page is selected, a third detailed function area 134-6 of the energy service page is displayed as shown in FIG. 55. The third detailed function area 134-6 of the energy service page may provide detailed information about energy consumption of each device and information about monthly energy consumption of each device.

According to the user terminal apparatus 200 providing the energy service page as described above, the user may check an energy usage at one time and set an energy goal value. Therefore, an energy saving effect may increase.

<Sixth Service Page 100-7-Media>

A sixth service page that provides a media service by using a media output device of a plurality of devices included in a home network will now be described. Hereinafter, a sixth service will be referred to as a media service. The media service refers to a service through which recently played content and recently updated content may be checked and played.

Figure 56:
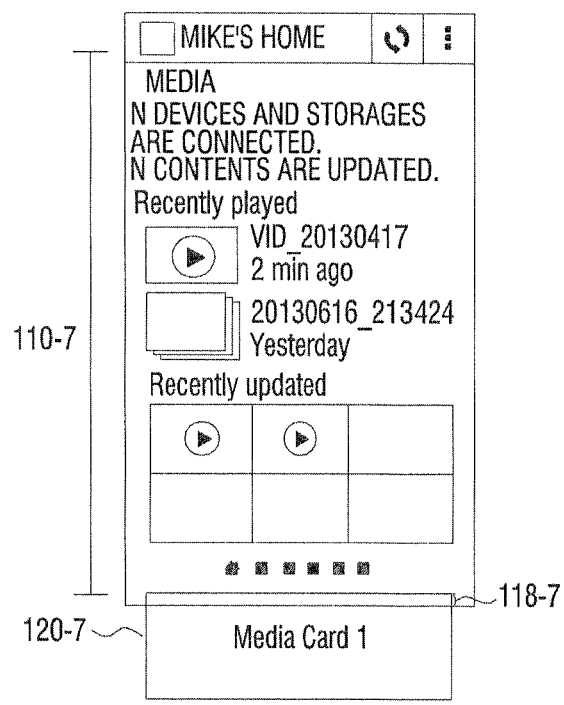

FIG. 56 illustrates a media service page 100-7 according to an example embodiment.

Referring to FIG. 56, a media service summary area 110-7 of the media service page 100-7 includes a recently played content information area and a recently updated file information area.

The media service page 100-7 also includes a first function area 120-7 of the media service connected under the media service summary area 110-7. When the media service summary area 110-7 is displayed on the front surface of the display unit 220, only a cue area 118-7 of a function area of the media service for indicating that a function area exists below is displayed on the display unit 220 as shown in FIG. 56. The first function area 120-7 of the media service is displayed above the media service summary area 110-7 according to a user manipulation for dragging the cue area 118-7 of the function area of the energy service into the media service summary area 110-7. In this case, if other function areas exist under the first function area 120-7 of the media service, the other function areas are also moved upwards together with the first function area 120-7 of the media service.

According to an example embodiment, the user may select a play method of a content displayed in the media service summary area 110-7. Referring to FIG. 57, if an operation of long pressing a content icon 5711 by the user is sensed, the control unit 240 may display a playable device list 110*a*-7. Also, the user may select one of playable devices according to an operation of dragging a movable content icon 5712. With reference to 5730 of FIG. 57, a device of the user may be selected as a device for playing content among the device (My Phone) of the user, a TV in a living room, a device (Den's) of another user, and a TV in a bedroom. With reference to 5740 of FIG. 57, the user may select the device (Den's) of the other user, not the device of the user. In this case, the device of the other user may be a user terminal apparatus of the other user registered in the home network. Thereafter, a message 5751 indicating that a corresponding content is played in the selected device of the other user may be displayed.

A function area of the media service page 100-7 may include a menu for managing a file stored in at least one of a plurality of devices included in the home network. In detail, FIG. 58 illustrates function areas that may be provided on the media service page 100-7.

Figure 58:
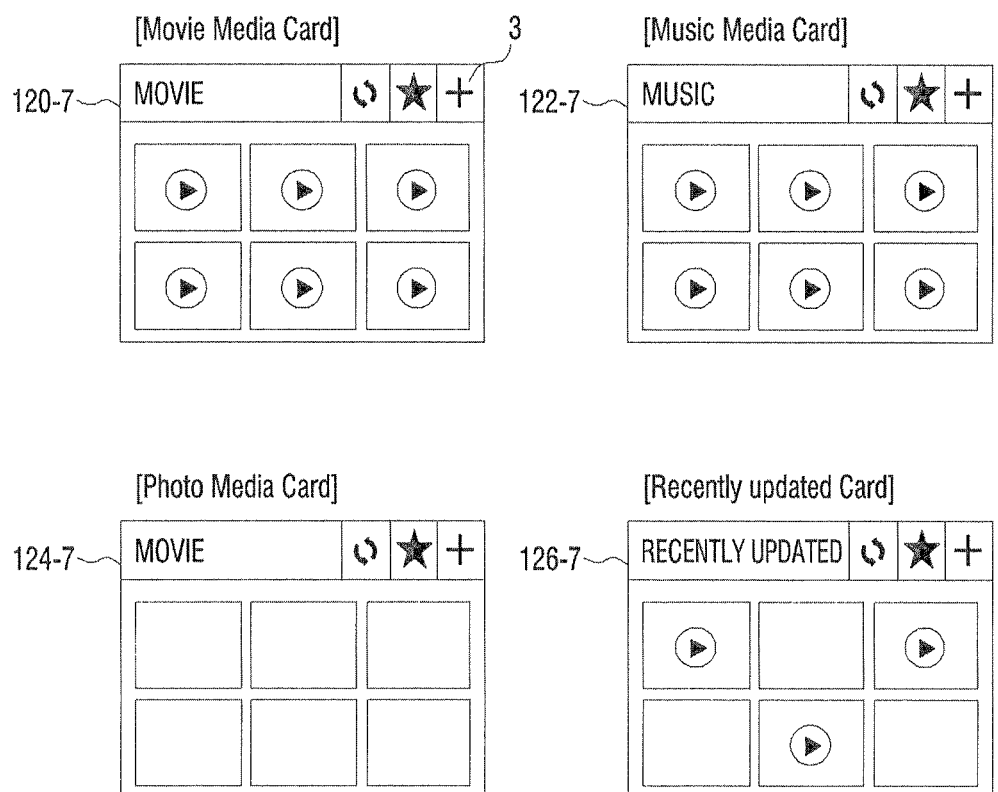

Referring to FIG. 58, a first function area 120-7 of the media service, a second function area 122-7 of the media service, a third function area 124-7 of the media service, and a fourth area 126-7 of the media service are illustrated. Respective function areas relate to "Movie", "Music", "Photo", and "Recently updated". If an enlarge menu icon 3 provided in each function area is selected, a corresponding detailed function area is displayed on the front surface of the display unit 220.

Figure 59:
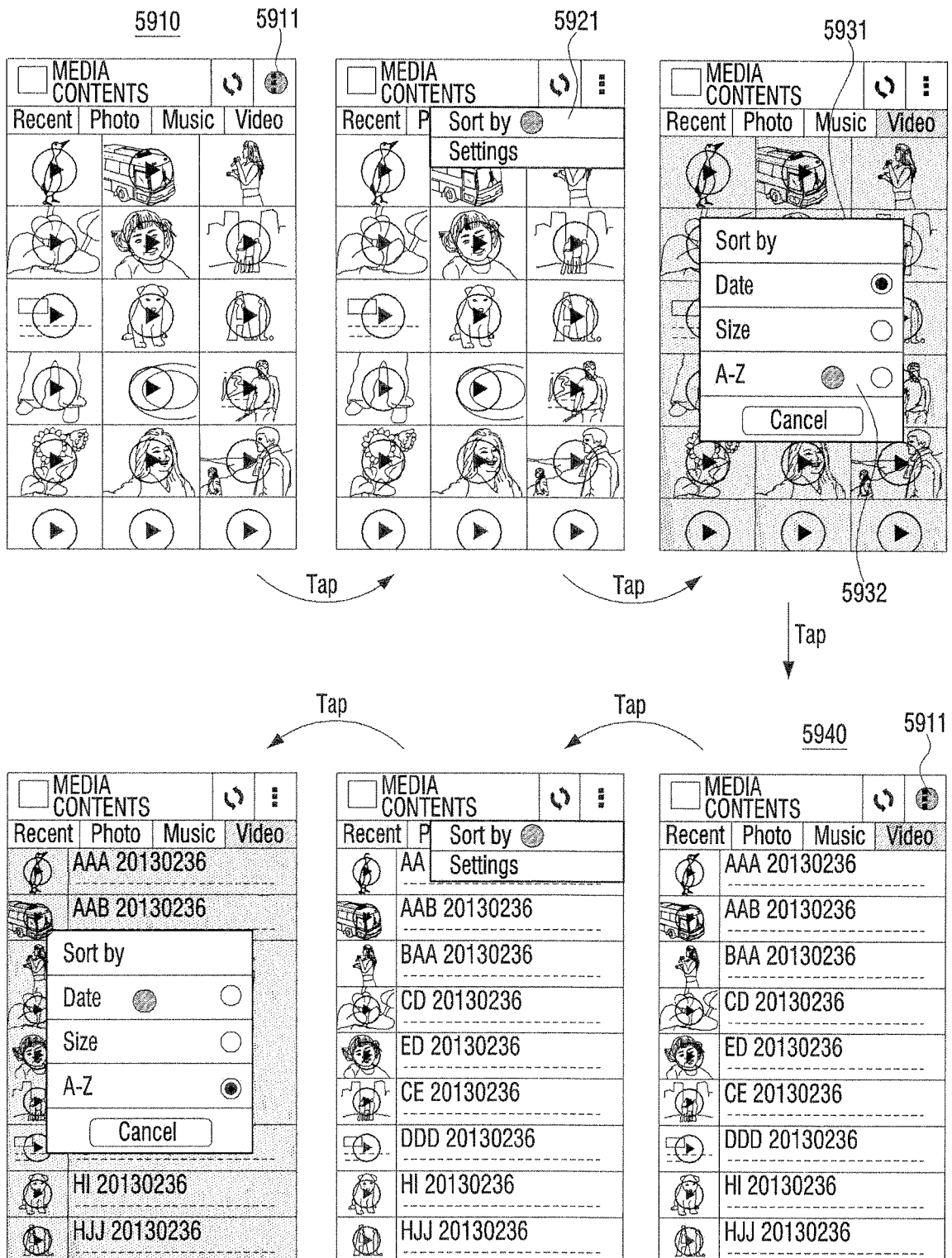

FIG. 59 illustrates a detailed function area provided from a media service. Contents may be arranged and displayed in thumbnail form or in list form in the detailed function area as shown with 5910 of FIG. 59. If a menu button 5911 is selected to select an option menu, an arrange menu icon 5921 may be displayed under the menu button 5911. If the user selects the arrange menu icon 5921, a screen 5931 for inputting an arrangement standard may be displayed. Contents may be arranged in order of date, size, alphabet, or the like. For example, if an alphabetic order arrangement is selected (5932), contents may be arranged in alphabetic order as shown with 5940 of FIG. 59. The user may re-select the menu button 5911 to change the arrangement standard.

According to the media service page as described above, the user may easily manage stored contents and play the stored contents by using other devices connected to the home network.

A plurality of service pages that are provided from a home network service will now be described. Hereafter, various types of setting screens of a home network service will be described.

Figure 60:
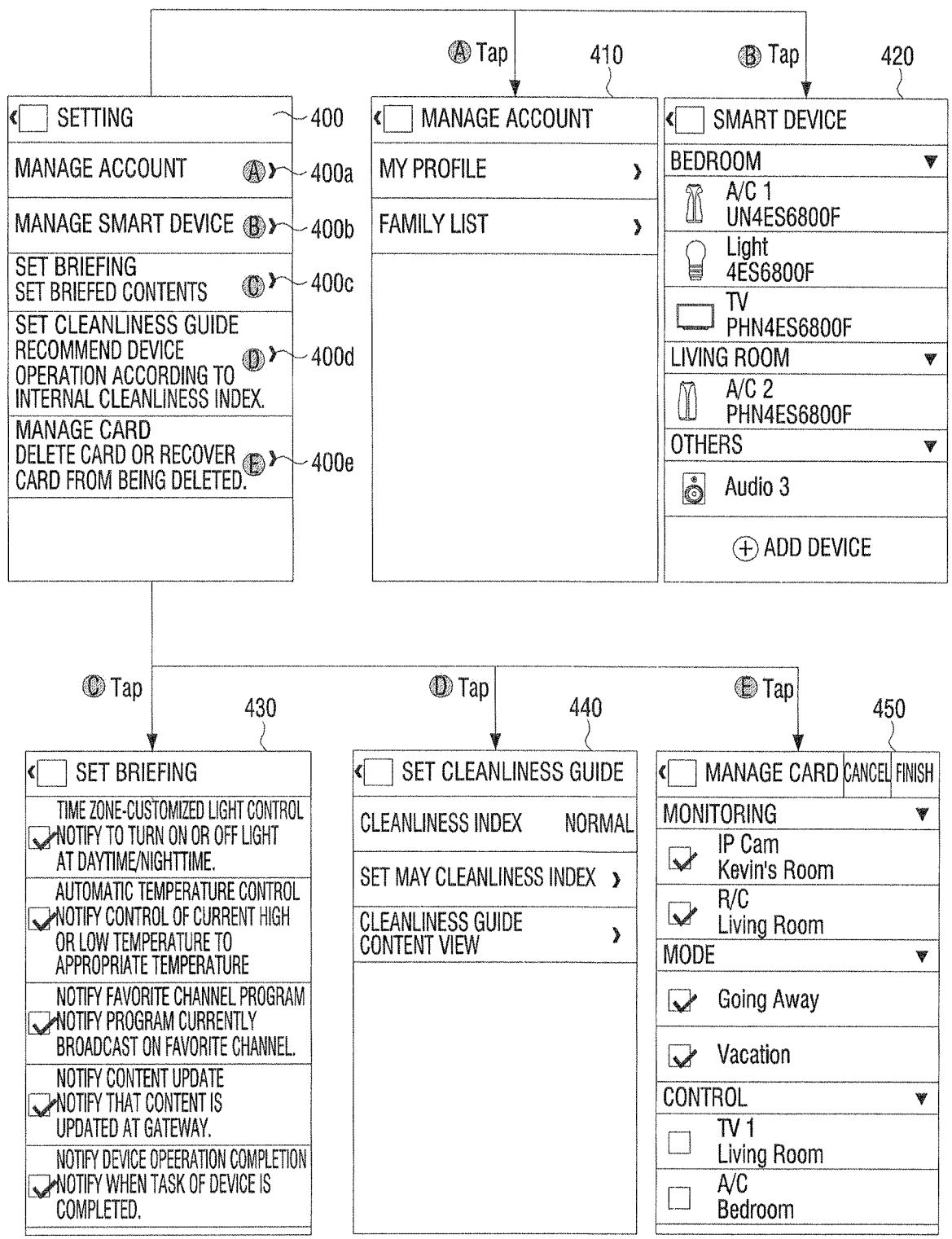

Referring to FIG. 60, a setting UI screen 400 includes account management, device management, briefing setting, cleanliness guide setting, and card management menus.

Figure 61:
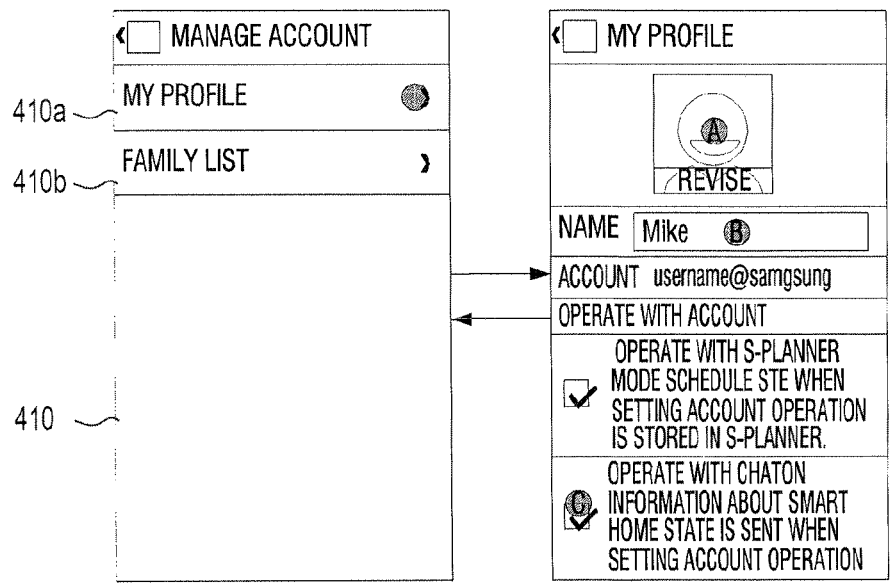
Figure 62:
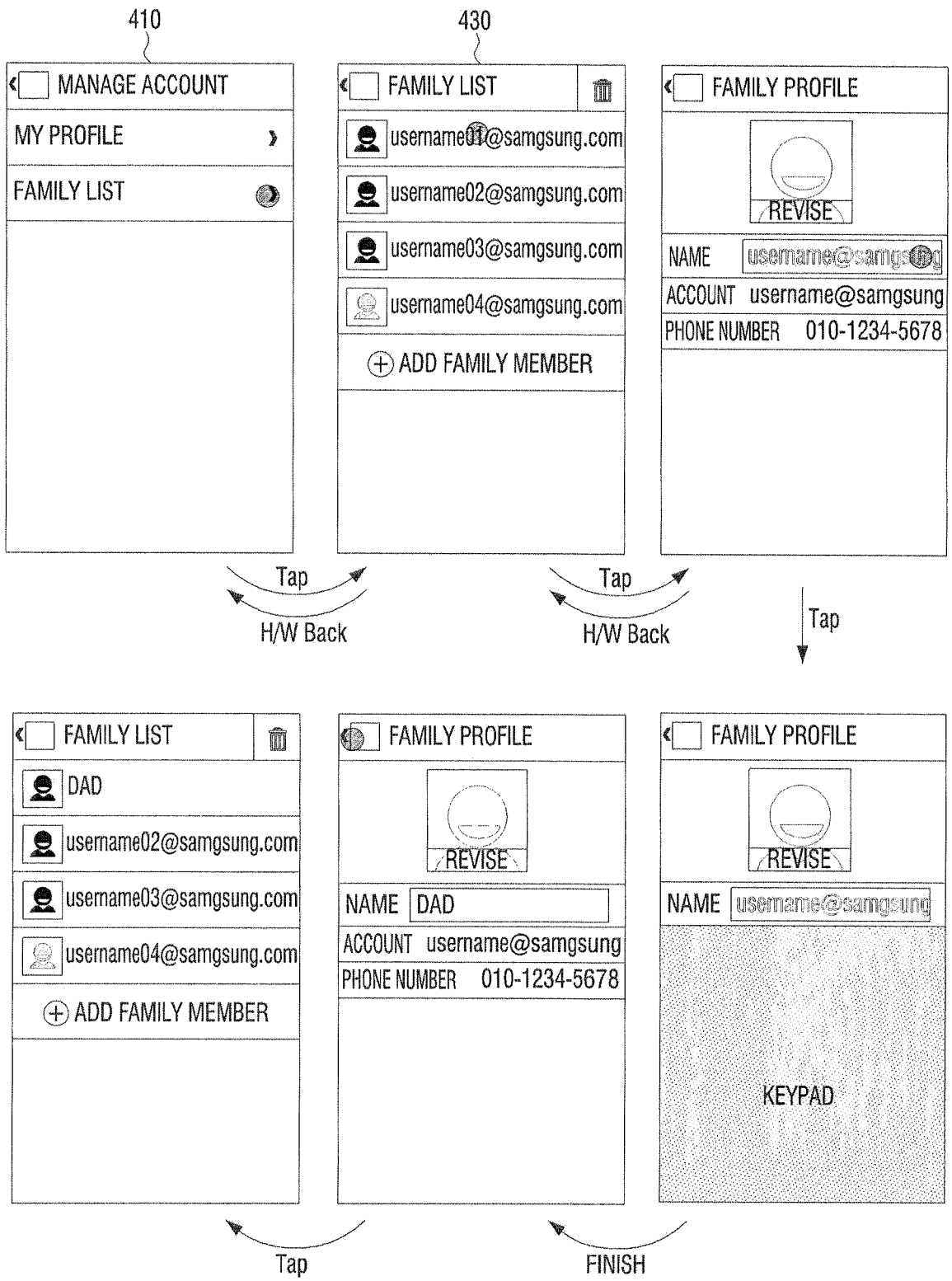

Here, if an account manage menu 400*a* is selected, an account management UI screen 410 is displayed. As shown in FIG. 61, if a My Profile menu option 410*a* is selected on the account management UI screen 420, a screen for setting representative photo, name, etc. of my account is output. If a family list menu option 410*b* is selected on the account management UI screen 410, a registered family member list 430 is provided with reference to FIG. 62. The user may set a name, a representative photo, etc. of each of registered family members and add or delete a family member as shown in FIG. 62.

Figure 63:
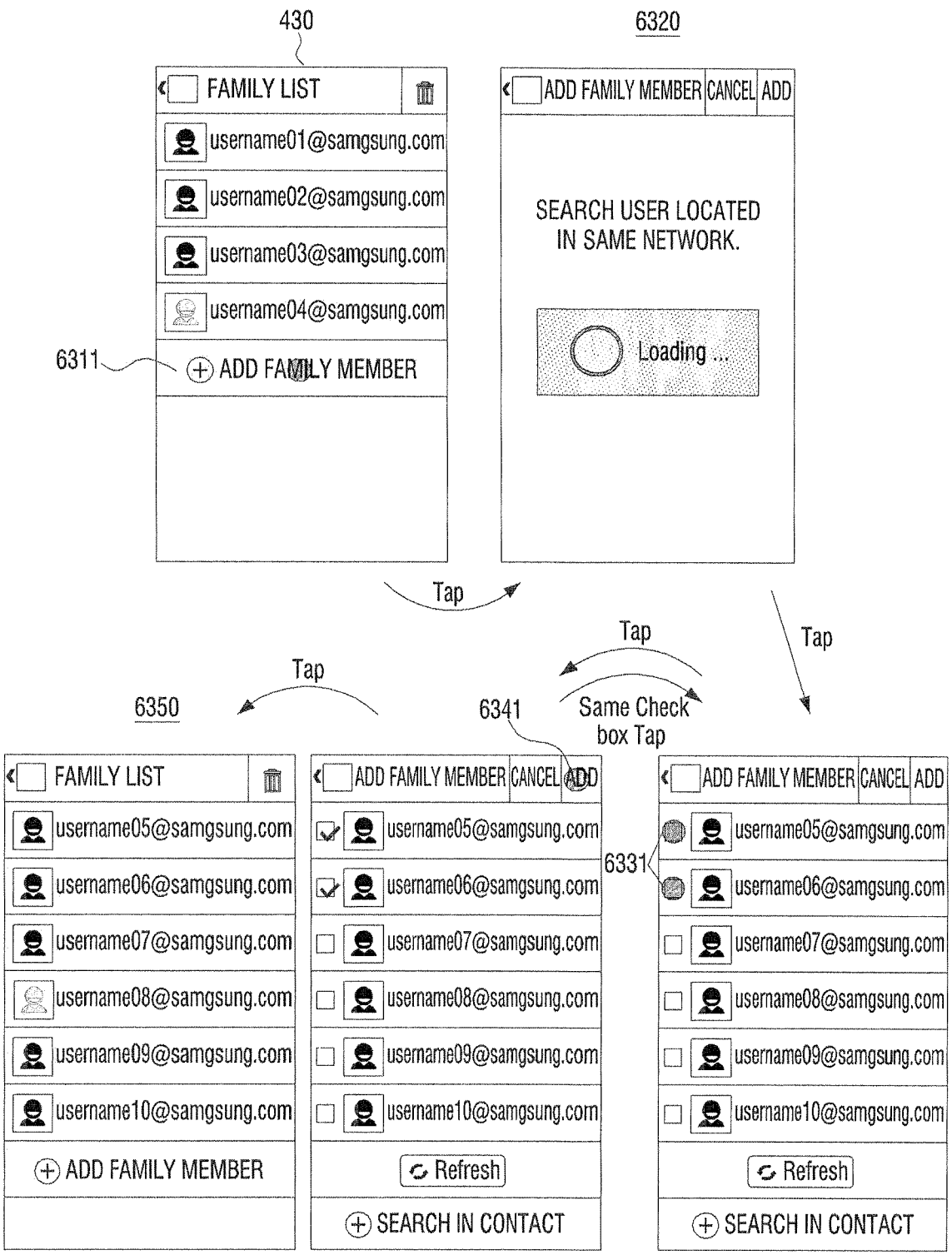

FIG. 63 illustrates adding of family members into the registered family member list 430. Referring to FIG. 63, if a device add menu 6311 is selected on the registered family member list 430, the control unit 240 searches for a user located in the same network and displays that the user is being searched (6320). Thereafter, if a check box provided in a list is selected (6331), and an add button 6341 for completing adding is selected after a family list searched by the user is displayed, a selected member may be added into the registered family member list 430 as shown with 6350 of FIG. 63. According to another example embodiment, adding of a family member may be performed through a contact list stored in the storage unit 250 of the user terminal apparatus 200.

Figure 64:
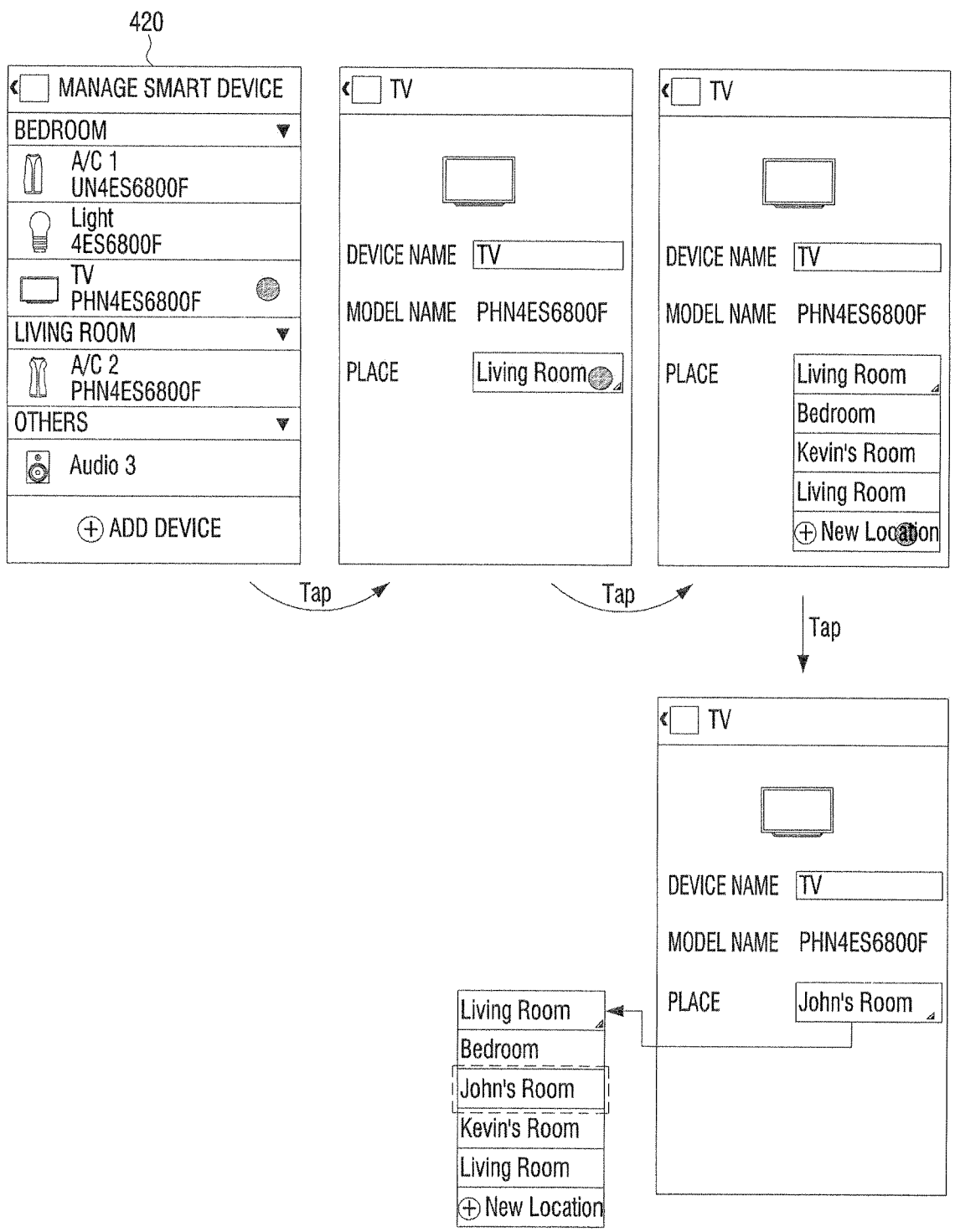

Referring to FIG. 60 again, if a device manage menu 400*b* is selected, a device management UI screen 420 is displayed. As shown in FIG. 64, the user may set names of devices registered in the home network and locations of the devices on the device management UI screen 420. Also, as shown in FIG. 65, if "device add" is selected in the device manage menu 400*b*, a list of searched devices and a list of unsearched devices are provided in the network. The user may select a device that is to be added into a provided list.

Figure 66:
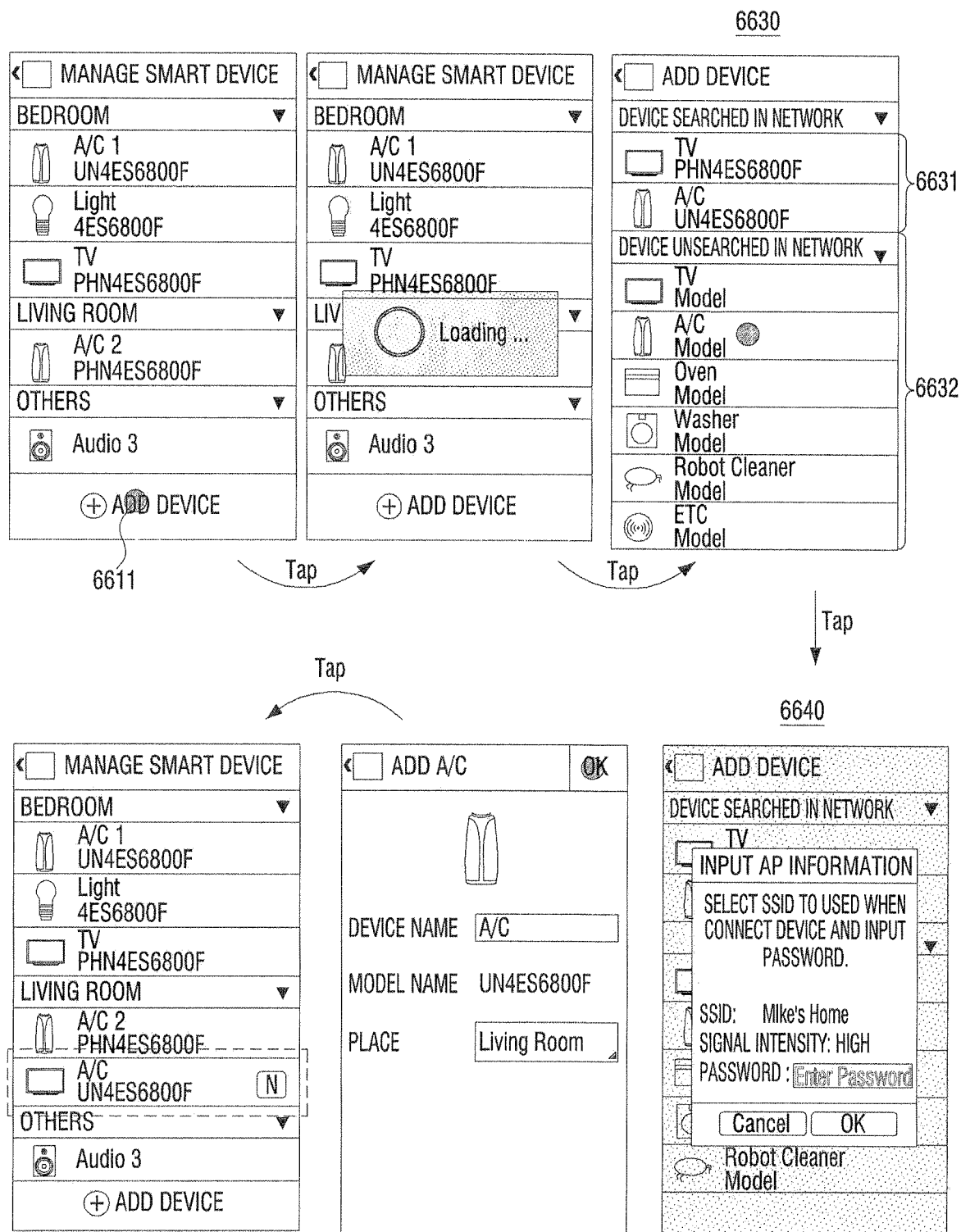

Also, as shown in FIG. 66, an unsearched device may be added in the network. Referring to FIG. 66, if a device add menu 6611 is selected, a screen 6630, which provides adding of devices and includes an area 6631 displaying a searched device in the network and an area 6632 displaying an unsearched device in the network, may be displayed. The user may input Access Point (AP) information, etc. about devices unsearched in the network to register the devices in the home network system 500 (6640).

Figure 67:
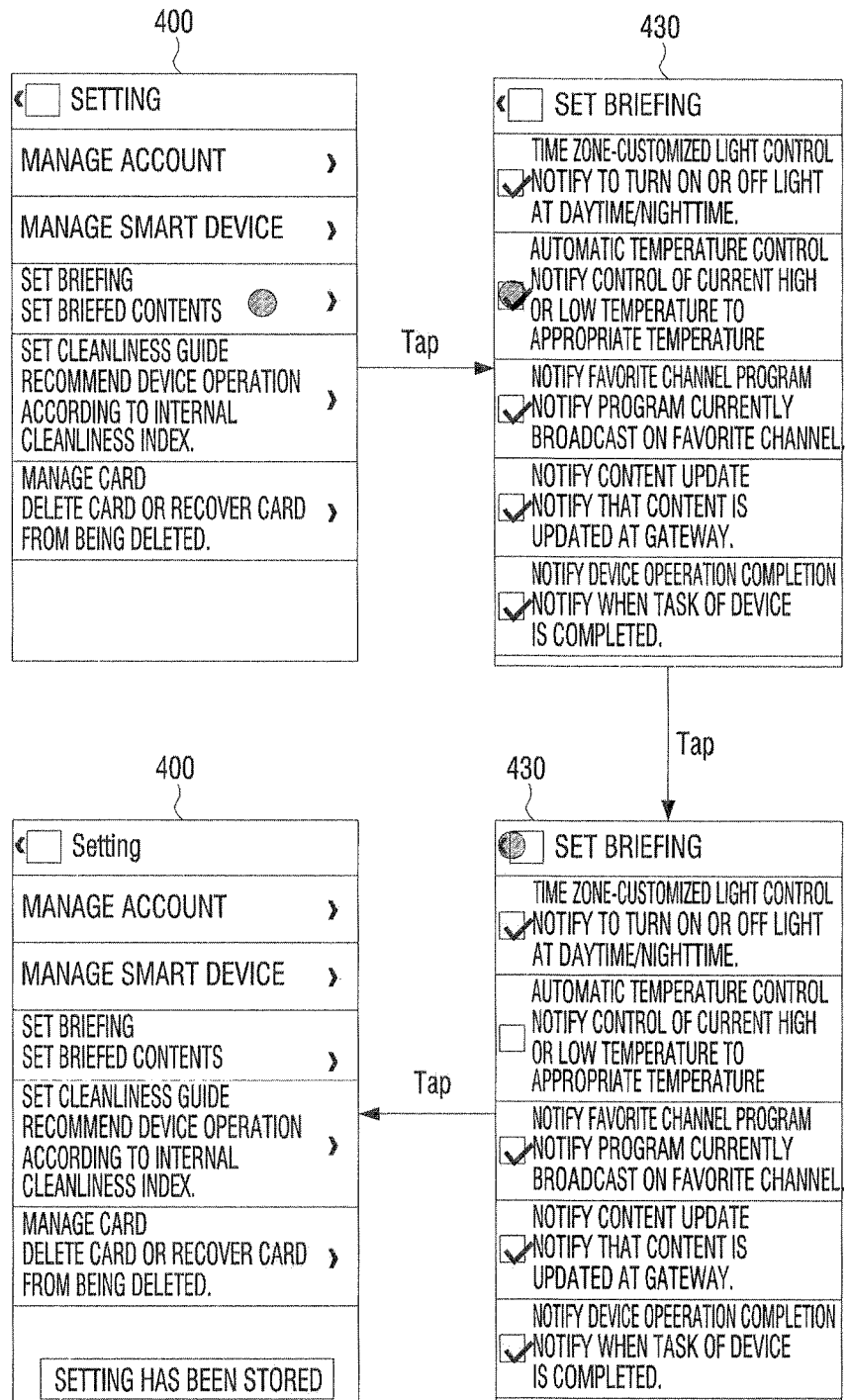

Referring to FIG. 60 again, if briefing setting 400*c* is selected, a briefing setting UI screen 430 is displayed. Referring to FIG. 67, various types of notifications that may be displayed in a briefing area 112-1 provided in the information display area 110-1 of the home network of the main page 100-1 may be set on the briefing setting UI screen 430. For example, if selecting of "automatic temperature control" is canceled on the briefing setting UI screen 430, a notification about a temperature is not displayed in the briefing area 112-1 (refer to FIG. 15) of the main page 100-1 anymore.

Figure 68:
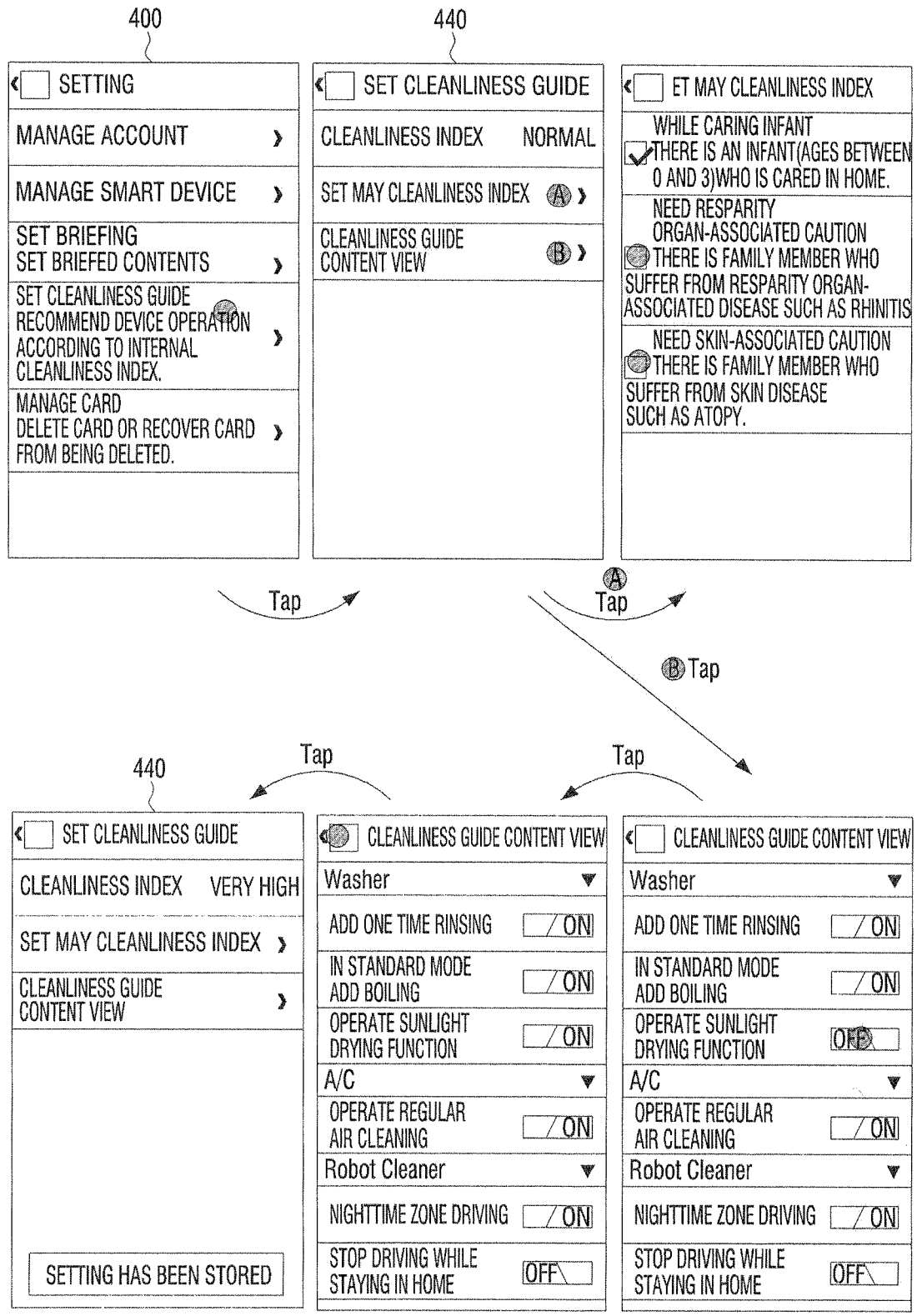

Referring to FIG. 60 again, if cleanliness guide setting 400*d* is selected, a cleanliness guide setting UI screen 440 is displayed. Referring to FIG. 68, the user may set a cleanliness index or see cleanliness guide contents on the cleanliness guide setting UI screen 440.

Figure 69:
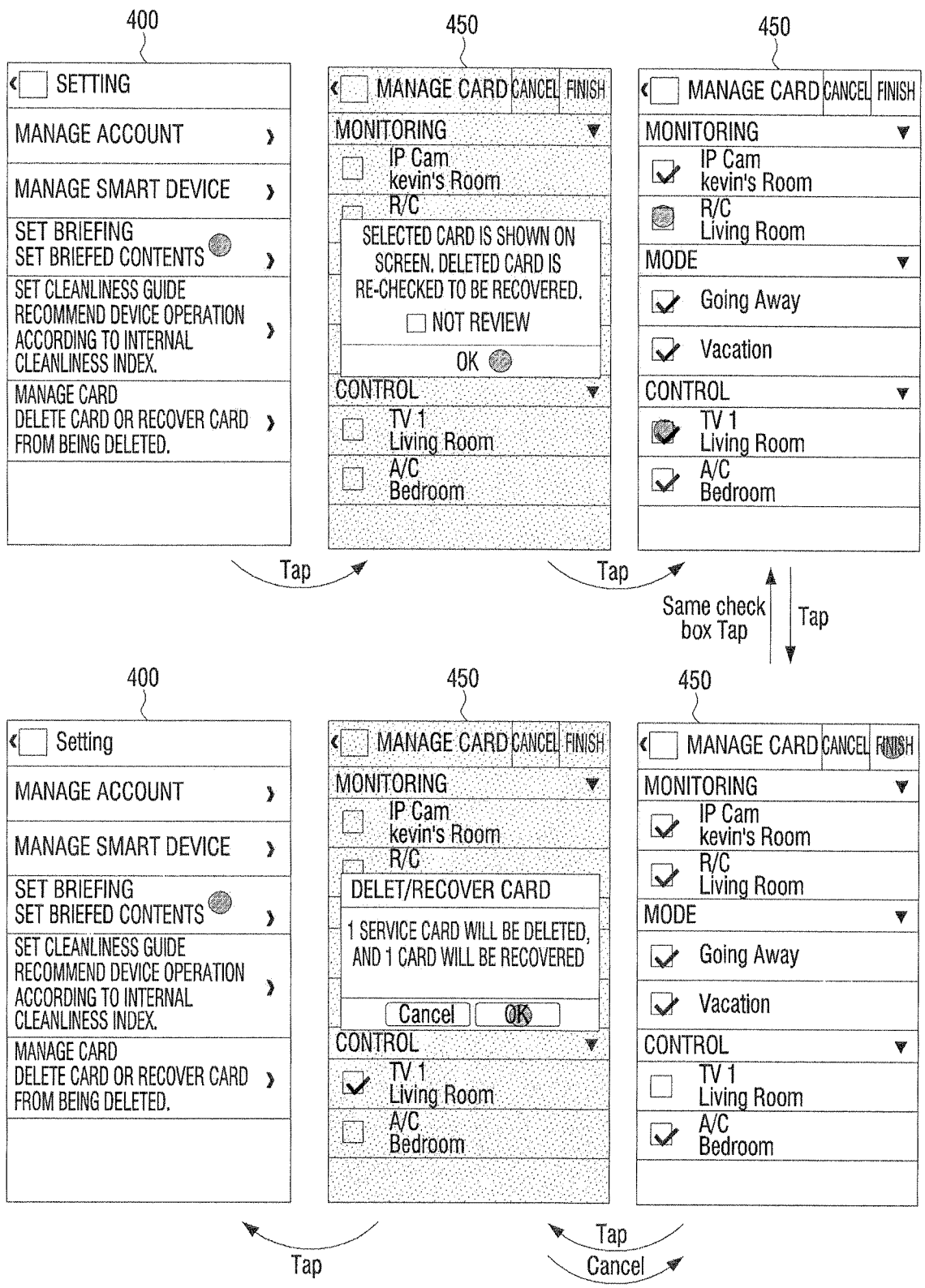

Referring to FIG. 60 again, if a manage card (function area) 400*e* is selected, a card management UI screen 440 is displayed. As shown in FIG. 69, the user may delete a function area (card) included in a plurality of service pages 100-2, 100-3, 100-4, 100-5, 100-6, and 100-7 or restore a deleted function area (card) through the card management UI screen 440.

A home network management service as described may be provided through various types of UI screens. The home network management service will now be described with reference to FIGS. 70 through 72.

Figure 70:
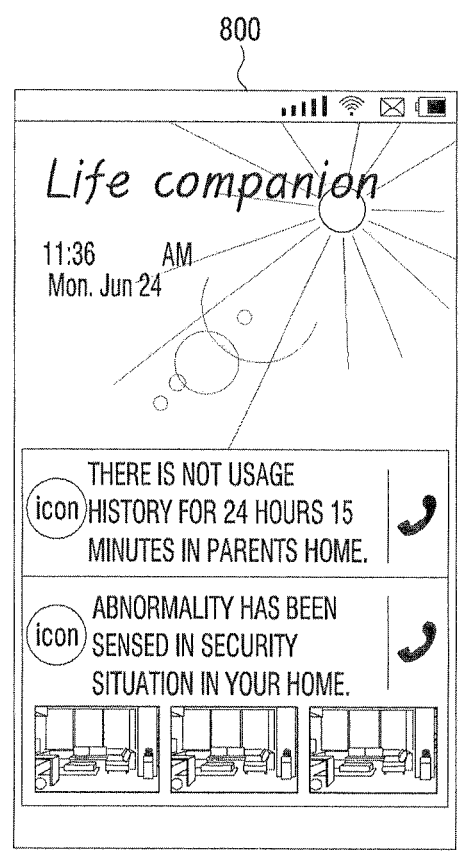

FIG. 70 illustrates a home network management service that is provided on a lock screen 800 of the user terminal apparatus 200 according to an example embodiment of the present invention. The lock screen 800 is a screen that is first displayed when the user terminal apparatus 200 is turned on. A user authentication process may be performed on the lock screen, and only if an authentication is performed, the user may use various functions of the user terminal apparatus 200.

Referring to FIG. 70, the lock screen 800 of the user terminal apparatus 200 includes brief information of the home network management service. In other words, the user may be simply provided with important information about the home network without executing a home network application. For example, as shown in FIG. 70, a notification provided from a care service or a monitoring service may be provided on the lock screen 800.

Figure 71:
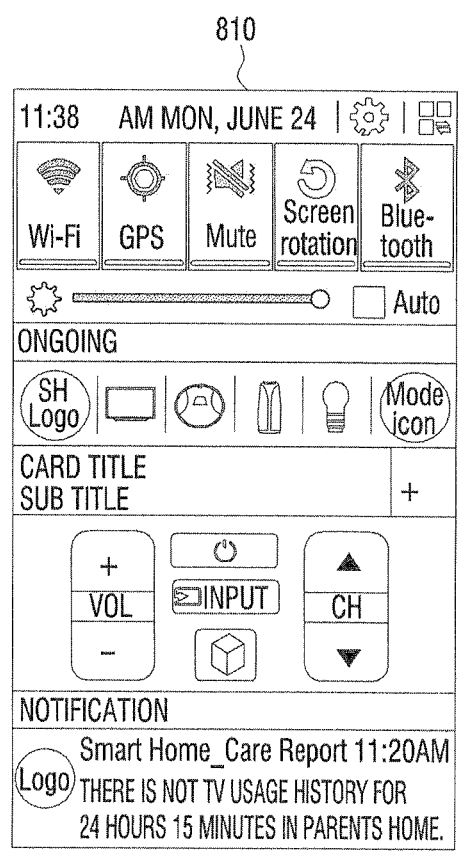

FIG. 71 illustrates a home network management service that is provided on a quick panel of the user terminal apparatus 200 according to an example embodiment. The quick panel refers to a screen that is displayed by an operation of touching and dragging down one of a plurality of edges by the user when a basic background screen of the user terminal apparatus 200 is displayed. The quick panel may display brief state information and the like of the user terminal apparatus 200.

Referring to FIG. 71, the quick panel may display at least one of function areas or main notification information included in the plurality of service pages 100-2, 100-3, 100-4, 100-5, 100-6, and 100-7.

Figure 72:
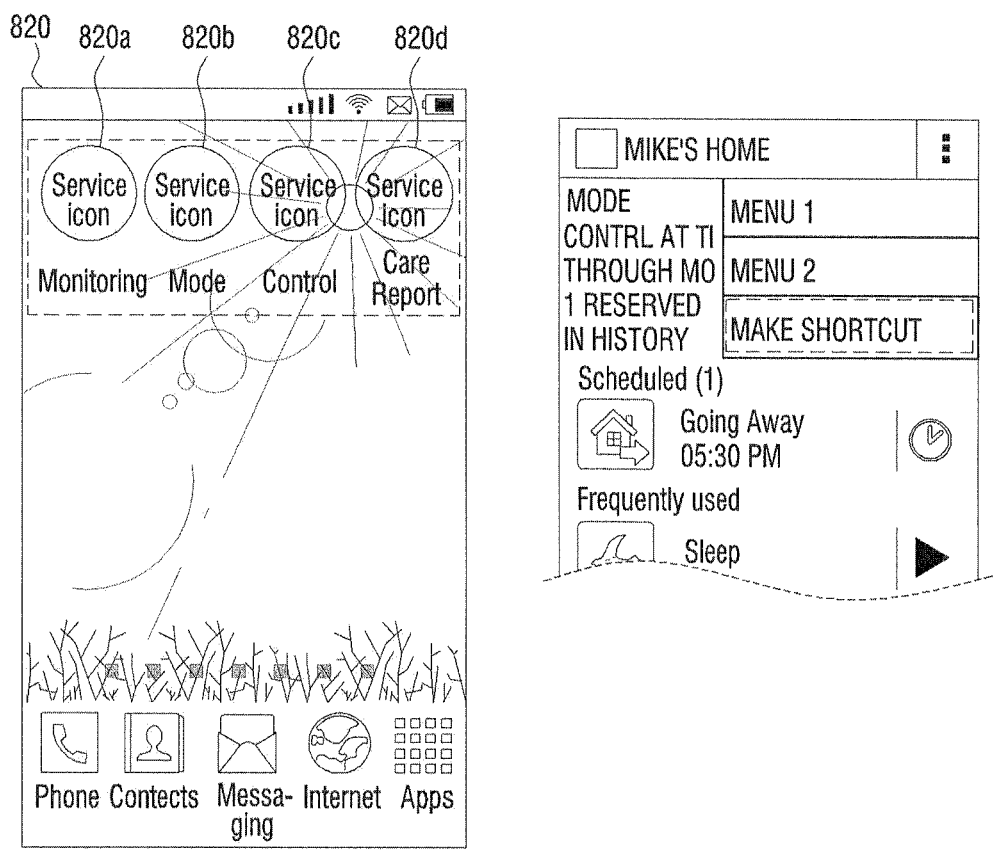

FIG. 72 illustrates a widget of the user terminal apparatus 200 according to an example embodiment. The widget is an object for a service shortcut that is provided on a basic background screen of the user terminal apparatus 200.

Referring to FIG. 72, a plurality of widgets 820*a*, 820*b*, 820*c*, and 820*d* are to be connected to a corresponding service page. As shown in FIG. 72, widgets may be selected and registered in option menus provided on the plurality of service pages 100-2, 100-3, 100-4, 100-5, 100-6, and 100-7.

As shown in FIG. 73, the present widget may apply layouts of function areas provided on the plurality of service pages 100-2, 100-3, 100-4, 100-5, 100-6, and 100-7.

According to various example embodiments as described above, the user may use various services provided from a home network service. A method of managing a home network of a user terminal apparatus according to an example embodiment will now be described in detail by using a flowchart.

Figure 74:
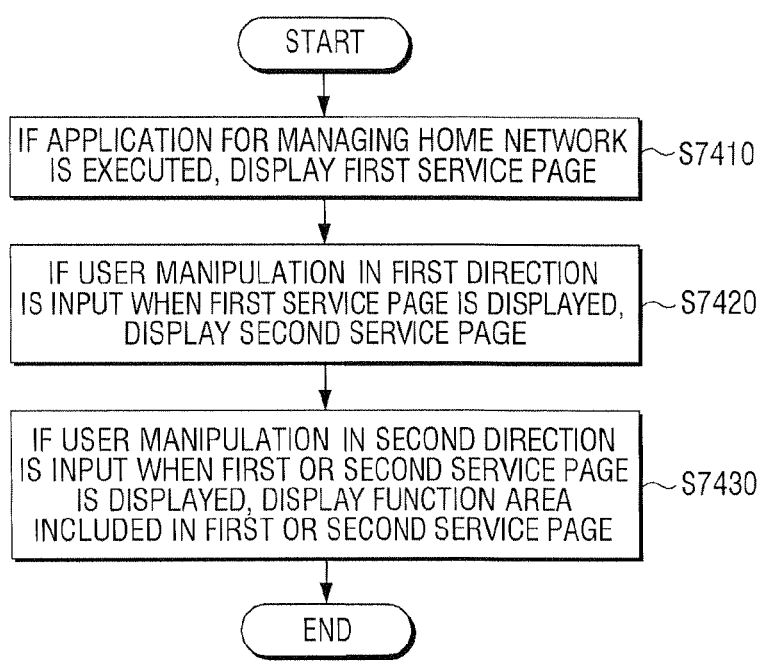
FIG. 74 is a flowchart of an example method of managing a home network of a user terminal apparatus according to a non-limiting example embodiment.

FIG. 74 illustrates a method of managing a home network of a user terminal apparatus according to an example embodiment. Referring to FIG. 74, if an application for managing a home network is executed, the control unit 240 displays a first service page of a plurality of service pages in operation S7410. The plurality of service pages are pages for providing a plurality of home network management services that may be provided by using the plurality of devices. Here, the first service page is a page that is first displayed when executing an application, i.e., may be a main page or a recently searched service. In detail, if there is a service page that is used by a user just before, and the application is re-executed, the service page that is used just before may be displayed.

If a user manipulation in a first direction is input when the first service page is displayed, the control unit 240 displays a second service page connected to the first service page in operation S7420. The second page is one of a plurality of service pages described above, for example, a service page that provides a monitoring service of each room, a mode service, a control service of a client device of the home network, etc. An order of arranging a plurality of services may depend on setting of the user, and a service page may be added and deleted according to user setting.

If a user manipulation in a second direction is input when the first service page or the second service page is displayed, the control unit 240 may display a function area included in the first service page or the second service page in operation S7430.

A service page and a function area as described above have been described in detail in the above-described various example embodiments, and thus their repeated descriptions are omitted.

In a plurality of example embodiments as described above, a UI screen including a plurality of services may be selectively displayed according to a user manipulation. In this case, map information may be provided so as to enable the user to intuitively check a structure of a whole page at one time. The map information refers to information that reduces the whole page, displays the reduced whole page, and indicates a location of a page that is currently being searched by the user within the whole page.

Figure 75:
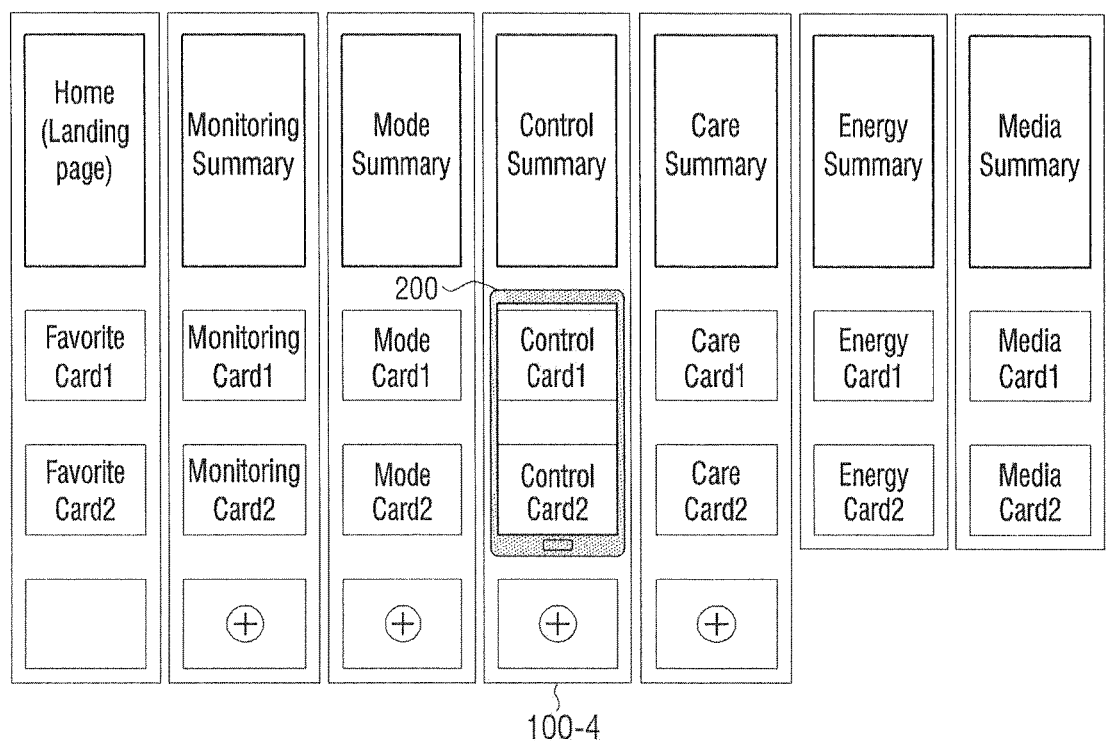
FIGS. 75 and 76 illustrate map information that is provided by an example user terminal apparatus according to a non-limiting example embodiment.
Figure 76:
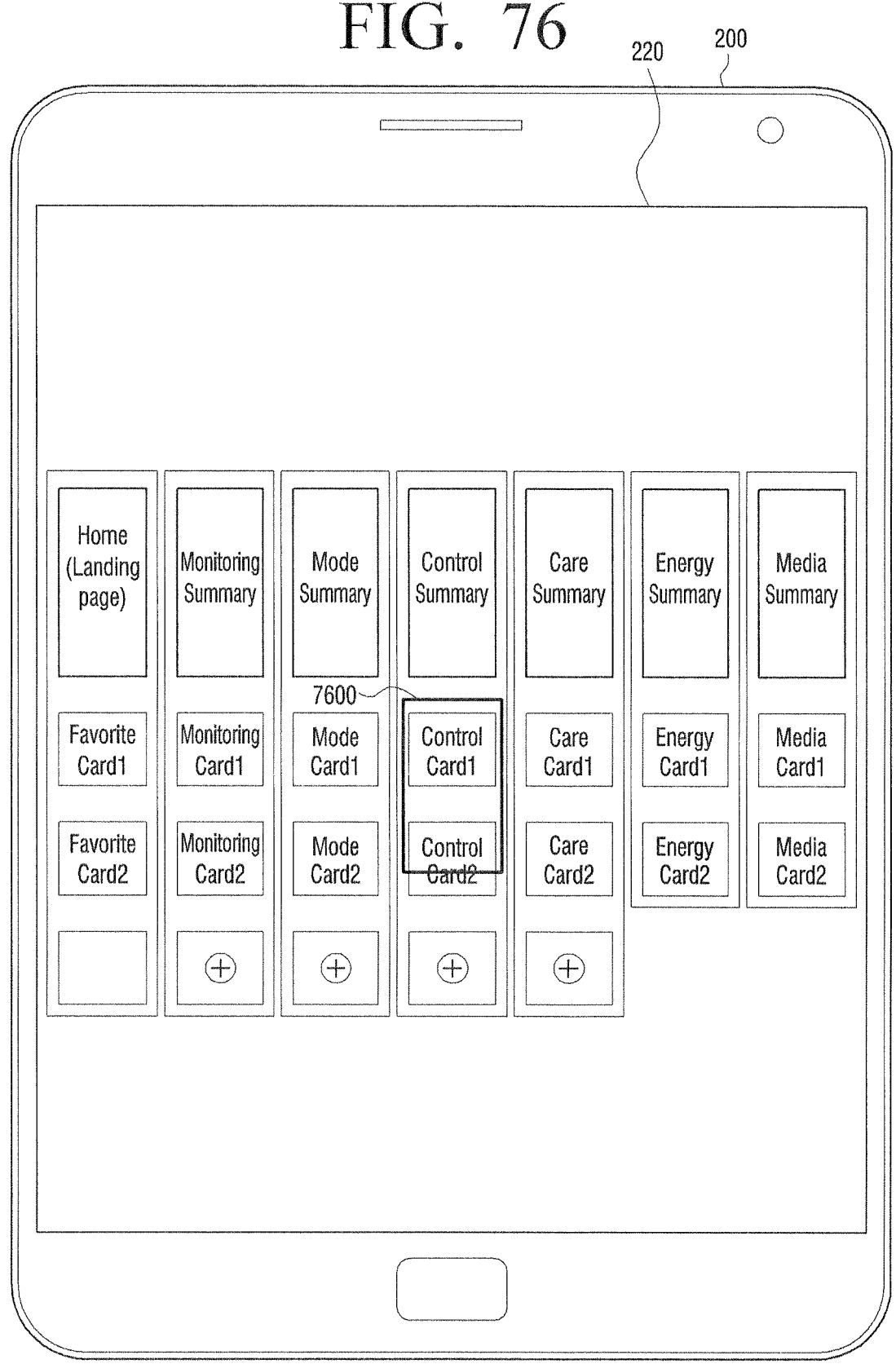

FIGS. 75 and 76 illustrate map information that is provided by a user terminal apparatus according to an example embodiment.

According to the present example embodiment, the user terminal apparatus 200 may provide location information of a particular area of a service page that is currently being searched by the user.

FIG. 75 illustrates a part of the control service page 100-4 that is currently being searched by the user within a UI screen including a total of seven service pages. In detail, the part of the control service page 100-4 is displayed on the display unit 220 of the user terminal apparatus 200.

In this state, if a particular user manipulation is input, a structure of a whole UI screen is reduced and then is all displayed within the display unit 220 as shown in FIG. 76. Also, a graphic object 7600 that informs the user of a location of an area that is currently being searched within the whole UI screen is displayed together. The user may intuitively know that a current page is a function area (control card 1) of a control service page, with seeing the map information. Thereafter, if the user deletes the map information, the control unit 240 displays the function area (control card 1) of the control service page. In this state, if the user performs flicking or dragging to the left, the control unit 240 displays a mode service page. If the user performs flicking or dragging to the right, the control unit 240 displays a care service page.

A user manipulation for displaying the map information may be set by an arbitrary manipulation for calling the map information. For example, if the user terminal apparatus 200 rotates in a horizontal direction when the user searches for a service page with gripping the user terminal apparatus 200 in a vertical direction, map information displaying a location of an area that the user is searching for may be displayed as shown in FIG. 75. Alternatively, even if an operation of moving or swinging the user terminal apparatus 200 at a preset speed or the like is sensed, the map information may be displayed. Alternatively, even if a menu for moving to the map information is selected when the user searches for a service page, the map information may be displayed. Whether to display the map information may be selectively performed according to an option setting state of the user.

In the above-described example embodiments, an arrangement direction of a service page is different from an arrangement direction of a function area, but the arrangement directions may be variously changed and set.

In detail, according to another example embodiment, a service page may be configured so as to have a different structure from that shown in FIG. 1. This will be described in detail with reference to FIG. 77.

Figure 77:
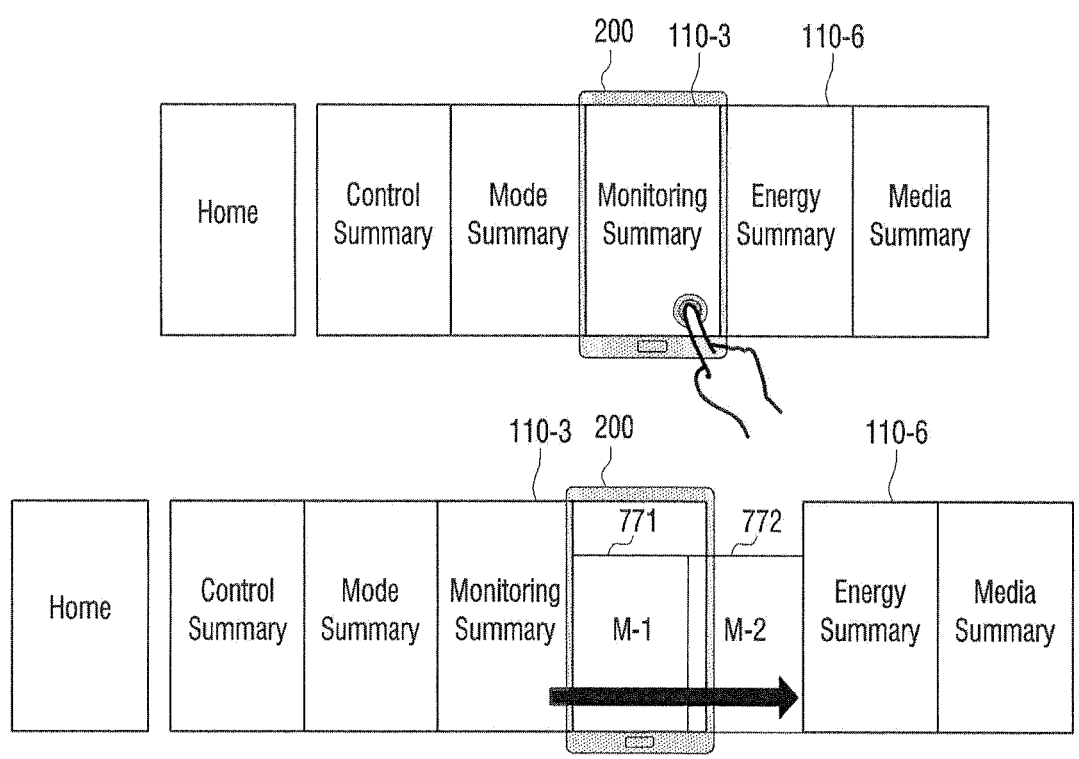
FIG. 77 illustrates a method of operating an example user terminal apparatus according to another non-limiting example embodiment.

FIG. 77 illustrates an operation of a user terminal apparatus according to another example embodiment. The present example embodiment may be easily understood in comparison of FIG. 77 with FIG. 11.

In the above-described various example embodiments, function areas of service pages (favorite function areas in case of main page) are connected under service summary areas. According to the present example embodiment, function areas are arranged in the same directions as those of service summary areas. Therefore, since a function area is equal to a page that is arranged in one direction, the function area will be hereinafter referred to as a function area page.

Referring to FIG. 77, for example, if a particular user manipulation is input when a service summary area 110-3 of a monitoring service page is displayed, a first function area page of a monitoring page may be generated on a side of a service summary area 110-3 and replace the service summary area 110-3 to be displayed on the display unit 220. Here, if the display unit 220 is realized as a touch screen, the particular user manipulation may be set to various types of manipulations, such as a pinch to zoom (in or out) for simultaneously dragging two fingers, a double touch, etc. but is not limited thereto.

When a first function area 771 is displayed, a second function area page 772 is displayed according to a user manipulation, such as turning over of a page to a side. Only two function area pages are illustrated in FIG. 77, but one function area page or two or more function area pages may be included as described with reference to FIG. 1.

If a user manipulation for performing flicking or dragging in a direction where the pages are arranged when the second function area page 772 is displayed, a summary area 110-6 of an energy service page may be displayed.

If a manipulation, such as a pinch to zoom or the like, is input when the first function area page 771 or the second function area page 772 is displayed, the first function area page 771 or the second function area page 772 may return to a summary area 110-3 of a monitoring service page. In this case, an animation through which the first function area page 771 or the second function area page 772 disappears or is reduced may be added.

If a user manipulation, such as flicking or dragging of the summary area 119-3 of the monitoring service page to the side, is input when the first function area page 771 or the second function area page 772 is closed, the summary area 110-6 of the energy service page may be displayed.

As in the present example embodiment, if a user manipulation of a function area is input, an operation corresponding to the input manipulation may be performed. A detailed example embodiment is equal to the example embodiments described with reference to FIGS. 1 through 74, and thus repeated descriptions thereof are omitted.

The user terminal apparatus 200 may be realized as various types. In the above-described example embodiments, the user terminal apparatus 200 is realized as a smart phone, but may be realized, for example, as a TV.

Figure 78:
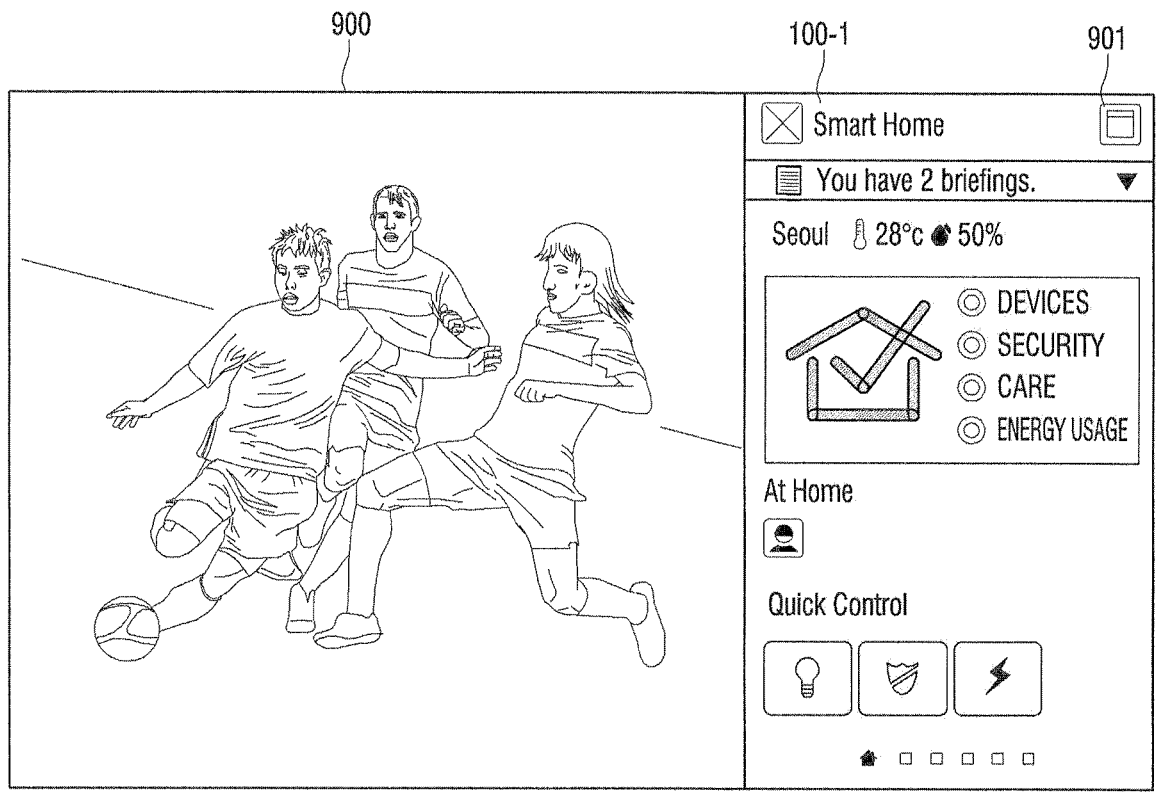
FIGS. 78, 79, 80 and 81 illustrate an example user terminal apparatus that is realized as a TV according to another non-limiting example embodiment.

FIG. 78 illustrates the main page 100-1 if a user terminal apparatus is realized as a TV.

Referring to FIG. 78, the main page 100-1 may be displayed on a side of a display unit 900 of the TV. The user may select various menus of the main page 100-1 by using an input unit such a remote control unit.

If a user manipulation for flicking a touch pad of the remote control unit from side to side is input when the main page 100-1 is displayed, a plurality of service pages may be simultaneously displayed.

Figure 79:
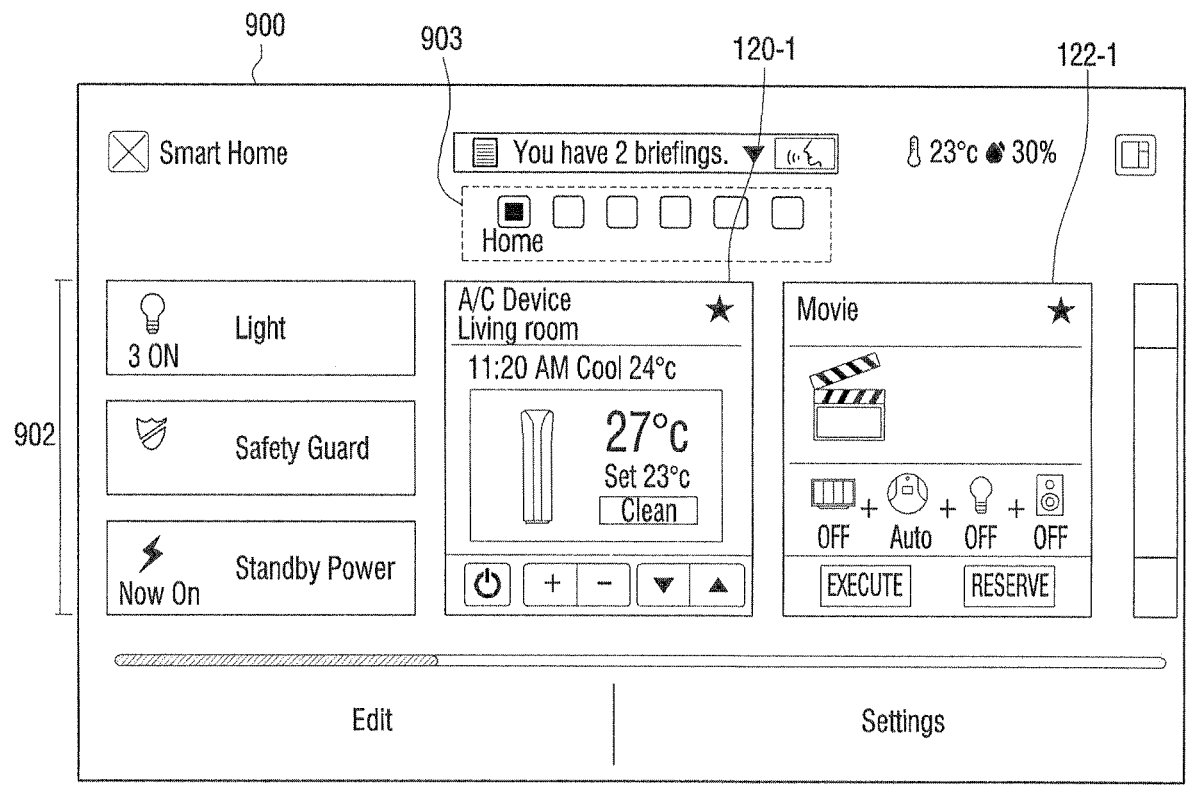

If the user terminal apparatus is realized as the TV, a limitation on a size of a display unit is smaller than if the user terminal apparatus is realized as a smartphone or the like. Therefore, if a full screen change menu 901 of the main page 100-1 is selected, a plurality of favorite function areas 120-1 and 122-1 may be horizontally arranged and displayed as shown in FIG. 79. In this case, the user may navigate favorite function areas from side to side by using a direction key of the remote control unit.

Figure 80:
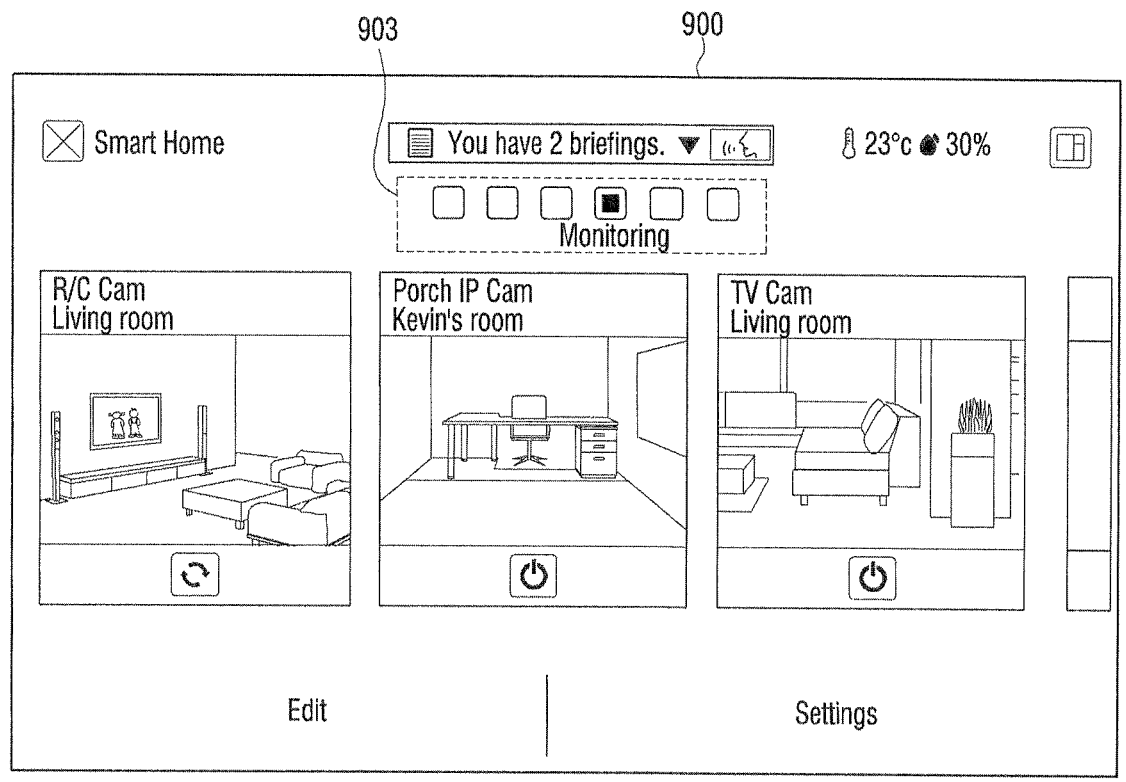

Referring to FIG. 79, situation information 902 inside a home may be displayed along with the plurality of favorite function areas 120-1 and 122-1. Differently from if the user terminal apparatus is realized as a smartphone or the like, if a user manipulation of a category area 903 is input, a change into a screen displaying a function area of another service may be performed. For example, FIG. 80 illustrates a screen that displays a function area of a monitoring service. Through the category area 903, the user may check whether a currently displayed screen is a service of which category.

In the previous example embodiment, if a change between service pages or a call of a function area is performed according to a user manipulation in a first or second direction, a similar manipulation may be performed through a touch pad provided in a remote control unit in the case of a TV. Alternatively, up, down, left, and right direction keys of the remote control unit may be used.

Figure 81:
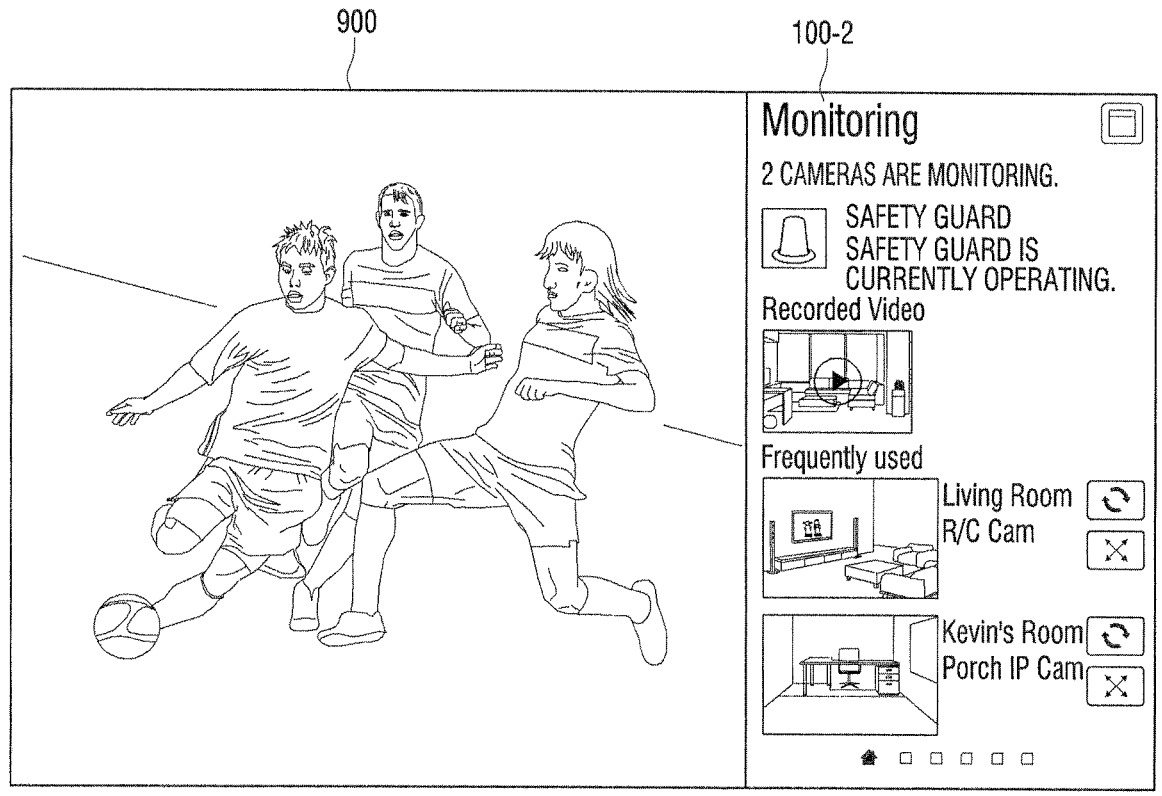

Even if the user terminal apparatus is realized as the TV, a plurality of service pages may be displayed as described with reference to FIGS. 1 through 73, and as an example, a monitoring service page 100-2 is illustrated in FIG. 81.

Even if a UI for managing a home network is realized as a TV, a principle of configuring various types of screens described above with reference to FIGS. 1 through 73 may be applied, and thus more repeated descriptions are omitted. Changes in some of layouts caused by an increase in a size of a display unit 900 may be sufficiently understood through FIGS. 78 through 81, and modified example embodiments associated with a user manipulation performed through a remote control unit or the like will be apparent to those skilled in the art.

A user terminal apparatus according to various example embodiments as described above may provide various types of UIs for managing a home network. The various types of UIs may be designed according to characteristics of provided services and characteristics of provided information. Therefore, a user may easily use a home network service through only a simple operation. In particular, the user terminal apparatus may flexibly change a UI for managing a home network according to environment changes in the home network or a manipulation of the user. Therefore, the user may be provided with an integrated home network management service appropriate for a lifestyle or a taste of the user.

A method of managing a home network by using various types of UI screens, which are arranged on a plurality of axes and have different attributes, has been described in detail in the above-described various example embodiments, but the above-described various example embodiments are not limited to a home network management. For example, a user terminal apparatus that may provide a plurality of services and a plurality of functions may provide UI screens having types as described above so as to enable the user to easily select the services and the functions. Alternatively, even in various environments for managing a plurality of devices (e.g., a printer, a scanner, a copier, a multi-function peripheral, etc.) connected through a network, a UI screen may be variously designed to be efficiently managed according to the above-described method. In other words, contents described in the above-described various example embodiments may be applied to display a UI screen in a home network system, various types of apparatuses, or a system.

A method of managing a home network of a user terminal apparatus, a method of displaying a UI screen, etc. according to the above-described example embodiments may be stored on a non-transitory readable medium. The non-transitory readable medium may be mounted and used on various types of apparatuses.

The non-transitory readable medium is readable by devices and includes compact disks (CDs), digital video disks (DVDs), hard disks, Blu-ray disks, universal serial buses (USBs), memory cards, and read-only memory (ROM).

The foregoing example embodiments and advantages are merely illustrative and should not be construed as limiting. The teachings described herein can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A user terminal apparatus comprising:
a communicator configured to communicate with a plurality of devices;
a display; and
a processor configured to:
control the display to display a first user interface (UI) comprising a favorite function area; and
based on a user manipulation in a first direction being input to the first UI, control the display to display one of a plurality of second UIs, the plurality of second UIs comprising a plurality of function areas for controlling at least one device from among the plurality of devices,
wherein the favorite function area comprises a function area among the plurality of function areas included in the plurality of second UIs.

2. The user terminal apparatus of claim 1, wherein the processor is configured to, based on one of the plurality of second UIs being selected, control the display to display a function area subordinate to the selected second UI.

3. The user terminal apparatus of claim 1, wherein the processor is configured to, based on a user manipulation in a second direction being input to the first UI, control the display to display the favorite function area included in the first UI.

4. The user terminal apparatus of claim 3, wherein the first direction corresponds to a horizontal direction, and the second direction corresponds to a vertical direction, and
wherein the processor is configured to control the display to sequentially display the plurality of second UIs page by page in response to a flick or drag manipulation being input in the horizontal direction and display a function area included in a currently displayed second UI in response to a flick or drag manipulation being input in the vertical direction.

5. The user terminal apparatus of claim 1, wherein, based on a communication with a new device being established through the communicator, the processor is configured to add a new UI comprising a new function area to the plurality of the second UIs.

6. The user terminal apparatus of claim 1, wherein the plurality of second UIs comprises at least one of a control service page providing a control menu for respectively controlling operations of the plurality of devices, an energy service page for providing energy usage information of the plurality of devices, a monitoring service page for providing a monitoring service by using a photographing apparatus included among the plurality of devices, a media service page for providing a media service by using a media output device included among the plurality of devices, or a mode service page for differently controlling the plurality of devices according to a home network mode.

7. The user terminal apparatus of claim 6, wherein a function area of the control service page comprises the control menu, a function area of the energy service page comprises periodical energy usage information of the plurality of devices, a function area of the monitoring service page comprises data captured by one of the plurality of devices, a function area of the media service page comprises a menu for managing a file stored in at least one of the plurality of devices, a function area of the mode service page comprises a mode execution menu for executing one mode, and
wherein the processor is configured to, in response to the mode execution menu being selected, control devices comprised in a group corresponding to the mode execution menu at one time.

8. The user terminal apparatus of claim 1, wherein the plurality of second UIs comprises service summary areas, respectively, and
wherein the processor is configured to, in response to a service summary area of one second UI being displayed and a user manipulation in the second direction being performed, control moving and displaying at least one function area connected to the service summary area onto the service summary area.

9. The user terminal apparatus of claim 8, wherein the processor is configured to, in response to the at least one function area being displayed on the display and an enlarge menu icon of one function area being selected, control enlarging the one function area to a detailed function area and control displaying the detailed function area in a whole area of the display.

10. The user terminal apparatus of claim 8, wherein the processor is configured to, in response to the at least one function area being displayed on the display and a pinch gesture being input, control reducing the at least one function area to corresponding objects and control displaying the corresponding objects and, in response to one of the objects being selected, control changing the selected object to a function area and control displaying the function area.

11. The user terminal apparatus of claim 1, further comprising:
a sensor configured to sense aspects of an orientation of the user terminal apparatus,
wherein the processor is configured to display the first UI according to a first layout in response to the display being oriented in a vertical direction and display the first UI according to a second layout in response to the display being oriented in a horizontal direction.

12. The user terminal apparatus of claim 11, wherein the first layout is a layout in which an information display area and the favorite function area are connected in an axis direction based on the information display area for a home network, and the second layout is a layout that includes a plurality of state information areas indicating state information of respective rooms comprised in an environment managed by the home network.

13. The user terminal apparatus of claim 1, wherein the processor is configured to, receive a bookmark input for the plurality of function areas included in the plurality of second UIs and add, to the favorite function area, the bookmarked function area.

14. A method for controlling a plurality of devices by a user terminal apparatus, the method comprising:
displaying a first user interface (UI) comprising a favorite function area; and
based on a user manipulation in a first direction being input to the first UI, displaying one of a plurality of second UIs, the plurality of second UIs comprising a plurality of function areas for controlling at least one device from among the plurality of devices,
wherein the favorite function area comprises a function area among the plurality of function areas included in the plurality of second UIs.

15. The method of claim 14, further comprising:
based on one of the plurality of second UIs being selected, displaying a function area subordinate to the selected second UI.

16. The method of claim 14, further comprising:
based on a user manipulation in a second direction being input to the first UI, displaying the favorite function area included in the first UI.

17. The method of claim 14, wherein the first direction corresponds to a horizontal direction, and the second direction corresponds to a vertical direction.

18. The method of claim 14, further comprising:
based on a communication with a new device being established, adding a new UI comprising a new function area to the plurality of the second UIs.

19. The method of claim 14, further comprising:
receiving a bookmark input for the plurality of function areas included in the plurality of second UIs; and
adding, to the favorite function area, the bookmarked function area.

* * * * *